United States Patent
Ohta et al.

(10) Patent No.: US 7,554,736 B2
(45) Date of Patent: Jun. 30, 2009

(54) OBJECTIVE LENS AND OPTICAL PICKUP APPARATUS

(75) Inventors: Tatsuo Ohta, Otsuki (JP); Takashi Nozaki, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 628 days.

(21) Appl. No.: 11/092,808

(22) Filed: Mar. 30, 2005

(65) Prior Publication Data

US 2005/0219683 A1    Oct. 6, 2005

(30) Foreign Application Priority Data

Apr. 2, 2004    (JP)    ............................. 2004-109917

(51) Int. Cl.
*G02B 1/10*    (2006.01)
(52) U.S. Cl. ........................................ 359/581; 359/359
(58) Field of Classification Search .................. 359/355, 359/359, 580, 581
See application file for complete search history.

(56) References Cited

U.S. PATENT DOCUMENTS

| | | | | |
|---|---|---|---|---|
| 5,106,920 A | * | 4/1992 | Murakami et al. | 525/326.1 |
| 6,819,498 B1 | * | 11/2004 | Watanabe et al. | 359/656 |
| 6,964,806 B1 | * | 11/2005 | Tazaki | 428/195.1 |
| 2004/0242824 A1 | * | 12/2004 | Miyaki et al. | 526/282 |

* cited by examiner

*Primary Examiner*—Alessandro Amari
(74) *Attorney, Agent, or Firm*—Finnegan, Henderson, Farabow, Garrett & Dunner, L.L.P.

(57) ABSTRACT

An objective lens for converging a monochromatic light flux having a specific wavelength in a range of 350 to 450 nm on an optical information recording medium while the objective lens is placed facing the optical information recording medium, the objective lens containing a lens body made of a polymer resin having an alicyclic structure; and an antireflection film including one or more layers provided on a surface of the lens body facing to the optical information recording medium, wherein a refractive index of the antireflection film for a light flux having a wavelength of 405 nm is less than 1.7.

20 Claims, 5 Drawing Sheets

OBJECTIVE LENS AND OPTICAL PICKUP APPARATUS

This application is based on Japanese Patent Application No. 2004-109917 filed on Apr. 2, 2004 in Japanese Patent Office, the entire content of which is hereby incorporated by reference.

TECHNICAL FIELD

The present invention relates to an objective lens converging a monochromatic light flux having a wavelength of 350 to 450 nm on an optical information recording medium and an optical pickup apparatus equipped with the objective lens.

BACKGROUND

In recent years, various sizes of optical elements have been manufactured and put into market, for example, from large size optical elements utilized as such as a telescope lens and a microscope lens to small size optical elements, for example, pickup lenses of such as CD (Compact Disc) and DVD (Digital Video Disc). Specifically, development of an optical pickup lens (an objective lens) applicable to at least one of BD (Blue-ray Disc), CD and DVD has been actively carried out in accordance with a proposal of a standard on BD or AOD (Advanced Optical Disc). On these optical elements, a functional layer depending on applications is generally formed to obtain a specific property determined by a combination of the function of the layer and a wavelength range of light irradiated to the functional layer.

For example, in Patent Document 1, disclosed is an optical element on which an antireflection layer is formed, and the antireflection layer works on a transmitting light of an ultraviolet region. On this optical element, a film of a high refractive index material (12) prepared from neodymium fluoride is formed directly on a synthetic quartz substrate (11) and a film of a low refractive index material (13) prepared from aluminum fluoride is formed directly on the high refractive index film. In Patent Document 1, it has been proved that the optical element exhibited a sufficient antireflective function (refer to paragraph Nos. 0016-0019, FIGS. 1 and 2). Herein, the above high refractive index material refers to a material having a refractive index of 1.7 or more, and the low refractive index material refers to a material having a refractive index of 1.55 or less.

Since ultraviolet light has a short wavelength and large energy of light, a technique to provide a film exhibiting a different refractive index on the surface of a lens body, as disclosed in Patent Document 1, is useful to obtain an antireflective function. However, an objective lens having a high refractive index antireflection film on a lens body made of a resin tends to have a problem in that the lens surface facing to an optical information recording medium is deformed due to a local heat generated at the surface and subsequently conveyed to the lens body, the local heat being generated when the antireflection film absorbs the energy of light at the surface facing to the optical information recording medium side surface. Further, when the generated local heat is conveyed to the lens body, due to the difference in thermal expansion coefficients of the antireflection film and the lens body, the abrasion resistance of the antireflection film may be reduced. However, when the antireflection film is not provided on the lens body, the transmittance of light decreases and the practicality of the objective lens as an optical element may be reduced.

(Patent Document 1) Japanese Patent Publication Open to Public Inspection (hereafter referred to as JP-A) No. 8-179103.

SUMMARY OF THE INVENTION

An object of the present invention is to provide an objective lens and an optical pickup apparatus in which deformation of the lens surface due to generated heat is avoided while keeping a high transmittance of short wavelength light in the range of 350 to 450 nm.

One of the aspects of the present invention is an objective lens for converging a monochromatic light flux having a specific wavelength in a range of 350 to 450 nm on an optical information recording medium while the objective lens is placed facing the optical information recording medium, the objective lens containing a lens body made of a polymer resin having an alicyclic structure, and an antireflection film including one or more layers provided on a surface of the lens body facing to the optical information recording medium, wherein a refractive index of the antireflection film for a light flux having a wavelength of 405 nm is less than 1.7.

DESCRIPTION OF THE PREFERRED EMBODIMENTS

Figure 1:
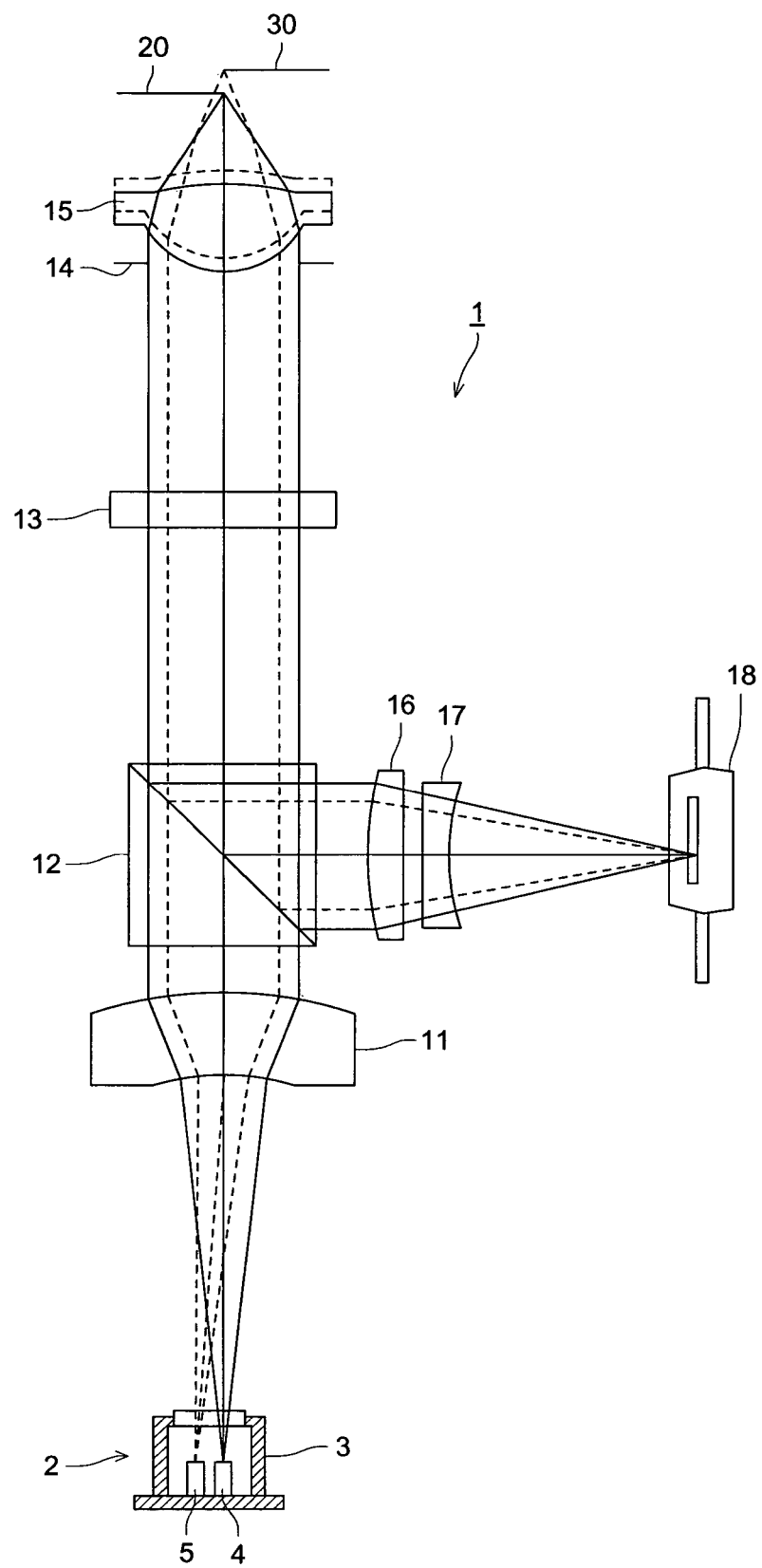
FIG. 1 is a schematic cross-section view of the optical pickup apparatus.

The above object of the present invention is achieved by the following structures.
(1) An objective lens for converging a monochromatic light flux having a specific wavelength in a range of 350 to 450 nm on an optical information recording medium while the objective lens is placed facing the optical information recording medium, the objective lens containing:
  a lens body made of a polymer resin having an alicyclic structure; and
  an antireflection film including one or more layers provided on a surface of the lens body facing to the optical information recording medium,
  wherein a refractive index of the antireflection film for a light flux having a wavelength of 405 nm is less than 1.7.
(2) The objective lens of Item (1), wherein the antireflective layer contains no layer having the refractive index of 1.7 or more.
(3) The objective lens of Item (1) or Item (2), wherein the antireflection film contains materials-selected from the group consisting of silicon oxide, magnesium fluoride, aluminum fluoride, yttrium fluoride, lead fluoride, cerium fluoride, neodymium fluoride, lanthanum fluoride, aluminum oxide and a mixture thereof.
(4) The objective lens of any one of Items (1) to (3), wherein the antireflection film contains a material selected from the group consisting of:
  silicon oxide, magnesium fluoride, aluminum fluoride, yttrium fluoride and a mixture thereof;
  lead fluoride, cerium fluoride, neodymium fluoride, lanthanum fluoride, aluminum oxide and a mixture thereof; and
  a mixture of silicon oxide and aluminum oxide.
(5) The objective lens of Item (1), wherein the antireflection film contains a material selected from the group consisting of silicon oxide, magnesium fluoride, a mixture of silicon oxide and magnesium fluoride, and a mixture of silicon oxide and aluminum oxide, provided that the antireflection film satisfies Formula (61):

$$(74(2m+1)-20)\,(nm) \leq D_1 \leq (74(2m+1)+20)\,(nm) \quad \text{Formula (61)}$$

where, in Formula (61), $D_1$ represents a thickness of the antireflection film on an optical axis, and m represents an integer of 0 to 6.

(6) The objective lens of Item (5), wherein the antireflection film satisfies Formula (62):

$$(74-20)\,(nm) \leq D_1 \leq (74+20)\,(nm). \quad \text{Formula (62)}$$

(7) The objective lens of Item (1), wherein the antireflection film contains:

a first layer made of aluminum oxide, the first layer satisfying:

$$45\,nm \leq d_1 \leq 90\,nm,$$

where $d_1$ represents a thickness of the first layer;

a second layer made of silicon oxide, magnesium fluoride, a mixture of silicon oxide and aluminum oxide, or a mixture of silicon oxide and magnesium fluoride, the second layer satisfying:

$$60\,nm \leq d_2 \leq 90\,nm,$$

where $d_2$ represents a thickness of the second layer.

(8) The objective lens of Item (7), wherein a layer containing the low refractive index material is provided between the lens body and the first layer.

(9) The objective lens of Item (1), wherein the antireflection film contains:

a first layer made of an intermediate refractive index material, a thickness of the first layer $d_1$ satisfying:

$$80\,nm \leq d_1 \leq 120\,nm,$$

a second layer made of a low refractive index material, a thickness of the second layer $d_2$ satisfying:

$$35\,nm \leq d_2 \leq 65\,nm,$$

a third layer made of the intermediate refractive index material, a thickness of the third layer $d_3$ satisfying:

$$140\,nm \leq d_3 \leq 180\,nm,$$

a fourth layer made of the low refractive index material, a thickness of the fourth layer $d_4$ satisfying:

$$70\,nm \leq d_4 \leq 105\,nm,$$

wherein:

the low refractive index material contains silicon oxide, magnesium fluoride, a mixture of silicon oxide and aluminum oxide, or a mixture of silicon oxide and magnesium fluoride; and the intermediate refractive index material contains aluminum oxide or a material containing aluminum oxide as a main component.

(10) The objective lens of Item (9), wherein a layer containing the low refractive index material is provided between the lens body and the first layer.

(11) The objective lens of Item (1), wherein the antireflection film contains:

a first layer made of a low refractive index material, a thickness of the first layer $d_1$ satisfying:

$$70\,nm \leq d_1 \leq 100\,nm,$$

a second layer made of an intermediate refractive index material, a thickness of the second layer $d_2$ satisfying:

$$15\,nm \leq d_2 \leq 40\,nm,$$

a third layer made of the low refractive index material, a thickness of the third layer $d_3$ satisfying:

$$75\,nm \leq d_3 \leq 90\,nm,$$

a fourth layer made of the intermediate refractive index material, a thickness of the fourth layer $d_4$ satisfying:

$$55\,nm \leq d_4 \leq 75\,nm,$$

a fifth layer made of a low refractive index material, a thickness of the fifth layer $d_5$ satisfying:

$$3\,nm \leq d_5 \leq 20\,nm,$$

a sixth layer made of an intermediate refractive index material, a thickness of the sixth layer $d_6$ satisfying:

$$70\,nm \leq d_6 \leq 95\,nm,$$

a seventh layer made of the low refractive index material, a thickness of the seventh layer $d_7$ satisfying:

$$95\,nm \leq d_7 \leq 120\,nm,$$

wherein:

the low refractive index material contains silicon oxide, magnesium fluoride, a mixture of silicon oxide and aluminum oxide, or a mixture of silicon oxide and magnesium fluoride; and the intermediate refractive index material contains aluminum oxide or a material containing aluminum oxide as a main component.

(12) The objective lens of any one of Items (1) to (11), wherein the polymer resin forming the lens body contains an alicyclic hydrocarbon copolymer having a weight average molecular weight (Mw) of 1,000 to 1,000,000, wherein the copolymer contains:

repeat unit (a) having a alicyclic structure represented by Formula (1); and repeat unit (b) having a chain structure represented by Formula (2) or Formula (3), provided that:

a total weight of repeat units (a) and repeat units (b) is 90% by weight or more; and a total weight of repeat units (b) is 1% by weight or more and less than 10% by weight,

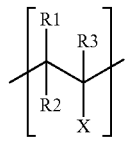

Formula (1)

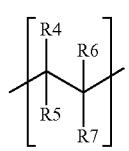

Formula (2)

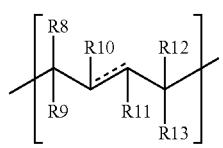

Formula (3)

where in Formula (1), X represents an alicyclic hydrocarbon group, R1 through R13 in Formulae (1), (2) and (3) each independently represent a hydrogen atom, a chain hydrocarbon group, a halogen atom, an alkoxy group, a hydroxyl group, an ether group, an ester group, a cyano group, an amide group, an imide group, a silyl group and a chain hydrocarbon group substituted by a polar group (a halogen atom, an alkoxy group, a hydroxyl group, an ether group, an ester group, a cyano group, an amide group, an imino group or a silyl group), and in Formula (3), "..." represents a carbon-carbon saturated bond or a carbon-carbon unsaturated bond.

(13) The objective lens of any one of Item (12), wherein the polymer resin forming the lens body contains a block polymer containing:

polymer block [A] having repeat unit [1] represented by Formula (11); and polymer block [B] having repeat unit [1] represented by Formula (11), repeat unit [2] represented by Formula (12) and repeat unit [3] represented by Formula (13),

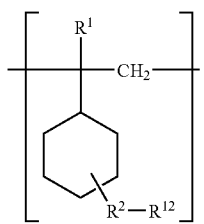

Formula (11)

where in Formula (11), $R^1$ represents a hydrogen atom or an alkyl group having a carbon number of 1 to 20, $R^2$ through $R^{12}$ each independently represent a hydrogen atom, an alkyl group having a carbon number of 1 to 20, a hydroxyl group, an alkoxy group having a carbon number of 1 to 20 or a halogen group,

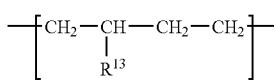

Formula (12)

where, in Formula (12), $R^{13}$ represents a hydrogen atom or an alkyl group having a carbon number of 1 to 20,

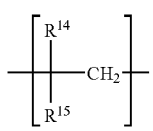

Formula (13)

where, in Formula (13), $R^{14}$ and $R^{15}$ each independently represent a hydrogen atom or an alkyl group having a carbon number of 1 to 20.

(14). The objective lens of any one of Items (1) to (11), wherein the polymer resin forming the lens body contains hydrogenated norbornene ring-opening polymer.

(15) The objective lens of any one of Items (1) to (14), wherein the lens body contains:

a first optical element arranged at the light source side of the lens body; and a second optical element arranged at the optical information recording medium side of the lens body, wherein the second optical element has a positive paraxial power and the objective lens satisfies Formula (41) and Formula (42), $$|P1/P2| \leq 0.2 \qquad \text{Formula (41)}$$

$$0.8 \leq d_2/f_2 \leq 1.8 \qquad \text{Formula (42)}$$

wherein:

in Formula (41), P1 represents a paraxial power of the first optical element and P2 represents the paraxial power of the second optical element; and in Formula (42), $d_2$ represents a thickness of the second optical element on an optical axis and $f_2$ represents a focal length of the second optical element.

(16) The objective lens of any one of Items (1) to (14), wherein the lens body contains:

a first optical element on a surface of the lens body facing a light source; and a second optical element on a surface of the lens body facing to the optical information recording medium, wherein the first optical element and the second optical element each has a positive paraxial power and the objective lens satisfies Formula (51) and Formula (52), $$0.8 \leq NA \qquad \text{Formula (51)}$$

$$0.2 \leq \beta \leq 0.5 \qquad \text{Formula (52)}$$

wherein:

in Formula (51), NA represents a numerical aperture on a image side; and in Formula (52), β represents a lens magnification of the second optical element.

(17) The objective lens of any one of Items (1) to (14), wherein the lens body contains a single constituent, and the objective lens satisfies Formula (60), $$0.8 \leq d/f \leq 1.8 \qquad \text{Formula (60)}$$

where, in Formula (60), d represents a thickness of the objective lens on an optical-axis, and f represents a focal length of the objective lens for a light flux having a wavelength of 405 nm.

(18) The objective lens of any one of Items (1) to (17), wherein the lens body has an antireflection film made of zirconium oxide except for a surface facing to the optical information recording medium.

(19) An optical pickup apparatus containing the objective lens of any one of Items (1) to (18) and a light source emitting the monochromatic light having the specific wavelength in the range of 350 to 450 nm.

In Items (1) through (17), the surface of the lens body facing to the optical information recording medium is provided with an antireflection film so that the decrease in transmittance of light is avoided. The refractive index of the antireflection film is less than 1.7, namely, the antireflection film formed on the surface facing the optical information recording medium contains an intermediate refractive index material or a low refractive index material. Accordingly, generation of heat in the antireflection film is smaller compared to when a high refractive index film is used, while the lens is irradiated with ultraviolet rays. Thus, the deformation of the lens surface due to generated heat is suppressed while keeping a high transmittance of short wavelength in the range of 350 to 450 nm, the light having a larger energy.

In Item (18), since the objective lens of Items (1) through (17) is used in the optical pickup apparatus, the deformation of the lens surface due to generated heat is suppressed while keeping a high transmittance of short wavelength in the range of 350 to 450 nm, the light having a larger energy.

In the following, the best embodiment to practice the present will be explained referring to the drawings. However, the scope of the invention is not limited to the illustrated examples.

FIG. 1 is a cross-sectional drawing to show a brief constitution of optical pickup apparatus 1.

As shown in FIG. 1, optical pickup apparatus 1 is provided with light source unit 2. Light source unit 2 is provided with a box form basket 3 the upper potion in FIG. 1 of which is constituted of a light transmitting board. Inside basket 3, arranged are blue light source 4 (laser diode), which emits monochromatic light (laser) of a specific wavelength (such as 405 nm and 407 nm) within 350-450 nm for a BD or an AOD (HD DVD), and red light source 5 (laser diode), which emits monochromatic light (laser) of a specific wavelength within 620-680 nm for a DVD.

Light (blue light) emitted from blue light source 4 is transmitted, as light illustrated by a solid line in FIG. 1, through the light transmitting board of basket 3 toward the transmitting direction as it is, and light (red light) emitted from red light source 5 is transmitted, as light illustrated by a broken line in FIG. 1, through the light transmitting board of basket 3 toward the transmitting direction as it is.

Along the light axis direction of each light emitted from blue light source 4 and red light source 5, collimator 11, splitter 12, ¼ wavelength plate 13, iris member 14 and objective lens 15 are arranged in this order from the downward to the upward in FIG. 1, and BD or AOD 20 or DVD 30 as an optical recording medium is to be placed at the position opposing to objective lens 15. On the light side in FIG. 1 of splitter 12, cylindrical lens 16, concave lens 17 and sensor 18 are arranged in this order from the left side to the light side in FIG. 1.

Objective lens 15 according to the present is arranged to be opposed to BD or AOD 20, or DVD 30 as an optical information recording medium, and is provided with a function to condense each light emitted from blue light source 4 and red light source 5 onto BD or AOD 20, or DVD 30. Objective lens 15 is arranged freely transferable in the up and down directions in FIG. 1, and it is placed at the position shown by a solid line in FIG. 1 in the case of reading information of BD or AOD 20 while it is placed at the position shown by a broken line in FIG. 1 in the case of reading information of DVD 30.

Movement and action in optical pickup apparatus 1 will now be briefly explained. In the case of reading information of BD or AOD 20, objective lens is placed at the position shown by a solid line in FIG. 1 and blue light source 4 emits light in this state. Light emitted from blue light source 4 is firstly transmits collimator 13 to be made in to a parallel light flux, then transmits splitter 12 and ¼ wavelength plate 13 to reduced the aperture by iris member 14, and transmits objective lens 15 resulting in formation of a condensed light spot on the recording surface of BD or AOD 20.

The light having formed a condensed light spot is modulated on the recorded surface by information pits and reflects on said recorded surface, and the reflected light transmits objective lens 15, iris member 14 and ¼ wavelength board 13, then being branched by splitter 12, and transmits cylindrical lens 16 and concave lens 17 to be received by sensor 18. Thereby, information recorded on BD or AOD 20 is read out.

On the other hand, in the case of reading out information of DVD 30, objective lens is arranged at the position shown by a broken line in FIG. 1 and red light source 5 emits light in that state, thereafter, information recorded on DVD 30 is read out by similar movements and/or actions in the case of reading out information of BD or AOD 20.

Figure 2:
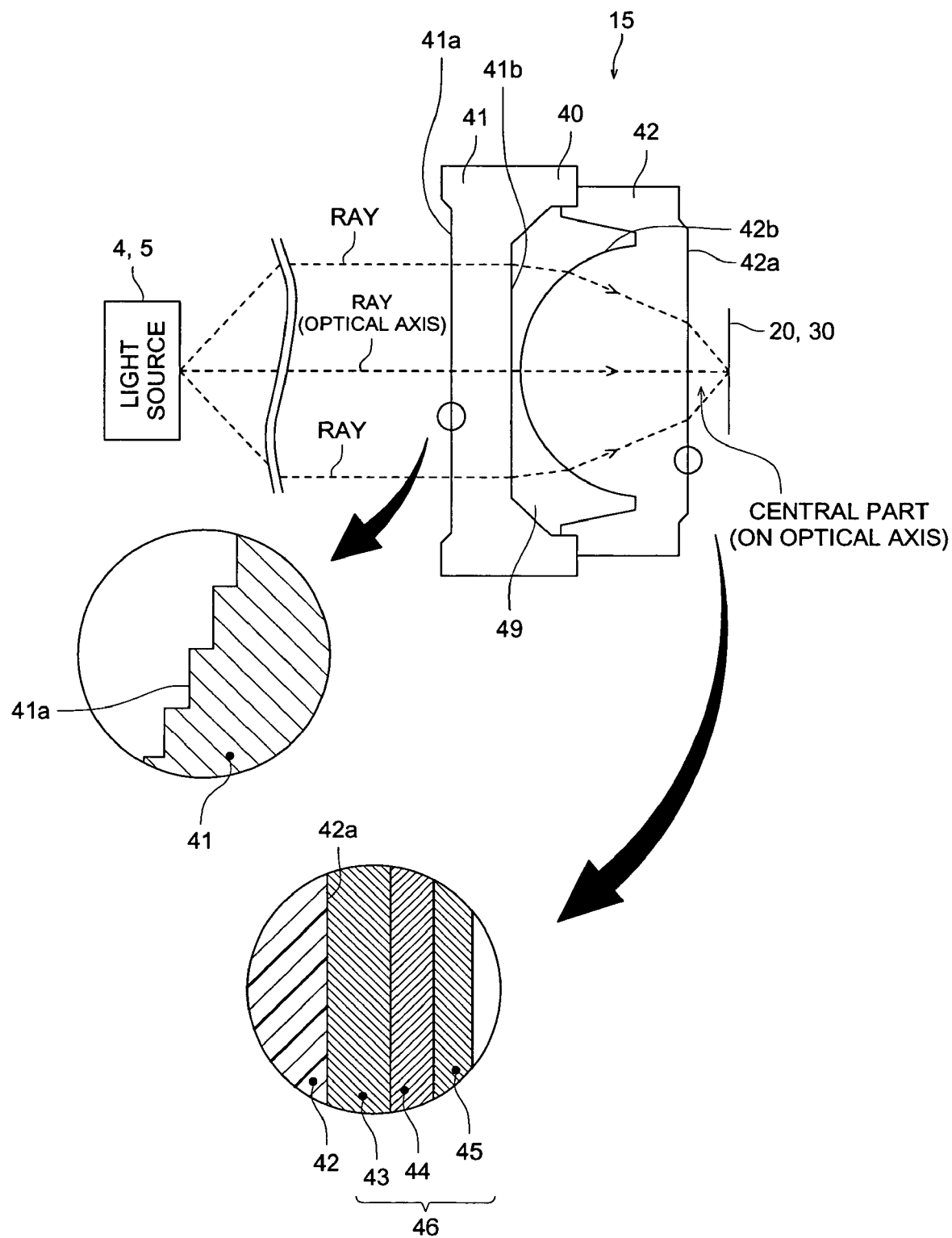
FIG. 2 is a schematic cross-section view of the objective lens.

FIG. 2 is a schematic cross-section view of the objective lens 15.

As shown in FIG. 2, objective lens 15 having a resinous lens body 40 is used for transmitting light of a specific wavelength within 350-450 nm or 620-680 nm emitted from blue light source 4 or red light source 5. Lens body 40 has two optical elements 41, 42 which are formed by molding a polymer resin having an alicyclic structure in a desired shape. The two optical elements 41 and 42 are adhered each other at both edges to form lens body 40 having a hollow portion 49 between optical elements 41 and 42.

Optical element 41 as the first optical element is arranged on the side of blue light source 4 or of red light source 5, and optical element 42 as the second optical element is arranged on the side of, BD or AOD 20, or DVD 30. In more detail, surface 41a of optical element 41 is opposed to blue light source 4 or of red light source 5; surface 42a of optical element 42 is opposed to BD or AOD 20, or DVD 30; and rear surface 41b of optical element 41 and rear surface 42b of optical element 42 are facing to each other.

Surface 41a and rear surface 41b of optical element 41 are both form aspheric surfaces, and, as shown in enlarged illustration FIG. 2, are provided with a diffraction structure of a ring-shape zone. Herein, in an enlarged illustration in FIG. 2, only surface 41a of optical element 41 is illustrated. Both of surface 42a and rear surface 42b of optical element 42 form an aspheric surface.

The light emitted from blue light source 4 or red light source 5 is incident into surface 41a of optical element 41 to transmit said optical element 41 and emitted from rear surface 41b; and further, it is incident into surface 42a of optical element 42 via hollow portion 49 to transmit said optical element 42 and emitted from rear surface 42b; then, it falls on the recording surface BD or AOD 20, or DVD 30.

On the other hand, the light reflected on BD or AOD 20, or DVD 30, is incident into surface 42a of optical element 42 to transmit said optical element 42 and emitted from rear surface 42b; and further, it is incident into rear surface 41b of optical element 41 via hollow portion 49 to transmit said optical element 41 and emitted from surface 41a.

Herein, optical element 42 is provided with a positive paraxial power and optical elements 41 and 42 each are molded so as to satisfy the both conditions represented by following Formulae (41) and (42).

$|P1/P2| \leq 0.2$   Formula (41)

$0.8 \leq d_2/f_2 \leq 1.8$   Formula (42)

In above Formula (41), P1 is a paraxial power of optical element 41, and P2 is a paraxial power of optical element 42. In above Formula (42), $d_2$ is a thickness on the optical axis of optical element 42, and $f_2$ is a focal distance of optical element 42 against light of a wavelength 405 nm.

In the case that the conditions of above Formulae (41) and (42) are satisfied, an objective lens for an optical pick up apparatus, which exhibits no deterioration of image height characteristics and capability of easy and proper correction of various aberrations, resulting in a high performance and a high light utilization efficiency, can be prepared as an objective lens commonly utilized when information is recorded and/or reproduced against at least two types of optical information recording media including BD.

Specifically, when Formula (41) is satisfied, since the paraxial power of optical element 41 becomes small and the curvature of optical surface can be decreased, it is possible to easily provide a ring-shape zone on one side or both sides of optical element 41, the ring-shape zone having a step structure and being able to provide an optical path difference and diffracted light. By using the ring-shape zone, various aberrations are properly corrected, for example, a color aberration and a spherical aberration due to differences in thickness of the transparent substrate of an optical information recording medium. Further, a ring-shape zone having a larger pitch is available, resulting in obtaining a highly precise ring-shape zone, by which: (i) the decrease of a utilization ratio of light due to manufacturing errors is avoided; and (ii) the effect of the shade formed by the steps of the ring-shape zone is minimized, and an objective lens enabling a high utilization ratio of light is obtained. Since the paraxial power of optical element 41 is small and the curvature of optical surface can be decreased, a large distance (working distance WD) between the objective lens and the optical information recording medium is obtained.

When Formula (42) is satisfied and $d_2/f_2$ is 0.8 or more, the center thickness (the thickness on optical axis) of optical element 42 is not too small, and the image height characteristics do not deteriorates nor the shift sensitivity of an optical surface becomes large. On the other hand, when $d_2/f_2$ is not more than 1.8, (i) the center thickness (the thickness on optical axis) of optical element 42 is not too large; (ii) image height characteristics do not deteriorates; (iii) the inclined center sensitivity becomes excellent; (iv) and (v) a spherical aberration and a coma aberration are possible to be properly corrected. When Formula (41) is satisfied, the above mentioned effects are also available for whole the objective lens containing optical elements 41 and 42.

Herein, on at least one of the following surfaces of: surface 41a and rear surface 41b of optical element 41 and rear surface 42b of optical element 42, an antireflection film (not illustrated in the figures) is provided in order to avoid reflection of light. The antireflection film is provided so as to form alternating layers of a low refractive index layer and a high refractive index layer. Here, "the low refractive index material" as mentioned in the present invention represents a material exhibiting a refractive index of 1.55 or less for a light having a wavelength of 405 nm, examples of which include: silicon oxide, magnesium fluoride, aluminum fluoride, yttrium fluoride, a mixture of two or more compounds thereof and a mixture of silicon oxide and aluminum oxide. The "high refractive index material" as mentioned in the present invention represents a material exhibiting a refractive index of 1.7 or more for a light having a wavelength of 405 nm, examples of which include: hafnium oxide, zirconium oxide, yttrium oxide, lanthanum oxide, lanthanum aluminate, lanthanum titanate, praseodymium titanate, tantalum oxide, titanium oxide, niobium oxide and a mixture of two or more compounds thereof.

In more detail, as one of the embodiments of the present invention, an antireflection film containing 5 or 7 layers in it is provided on one of the surfaces of: surface 41a and rear surface 41b of optical element 41 and rear surface 42b of optical element 42.

An antireflection film containing 5 layers is formed by providing: (i) a low refractive index layer of the thickness of 5 to 30 nm; (ii) a high refractive index layer of the thickness of 8 to 35 nm; (iii) a low refractive index layer of the thickness of 20 to 54 nm; (iv) a high refractive index layer of the thickness of 15 to 30 nm or 115 to 135; and (v) a low refractive index layer of the thickness of 75 to 120 nm, in this order on one of the above described surfaces.

An antireflection film containing 7 layers is formed by providing: (i) a low refractive index layer of the thickness of 60 to 80 nm or 120 to 145 nm; (ii) a high refractive index layer of the thickness of 10 to 30 nm; (iii) a low refractive index layer of the thickness of 30 to 60 nm; (iv) a high refractive index layer of the thickness of 45 to 72 nm or 115 to 135; (v) a low refractive index layer of the thickness of 8 to 25 nm; (vi) a high refractive index layer of the thickness of 45 to 74 nm; and (vii) a low refractive index layer of the thickness of 85 to 115 nm, in this order on one of the above described surfaces.

Since surface 41a and rear surface 41b of optical element 41 have small curvatures, the surfaces being closer to a flat surface, the above antireflection film containing 5 layers can be formed with a thickness variation of 5% or less on these surfaces. Although, the wavelength range providing a low reflection observed for the antireflection film containing 5 layers is narrower than that of the antireflection film containing 7 layers, a low reflectance of 1% or less is observed for two wavelenths. Accordingly, on surface 41a and rear surface 41b of optical element 41, an antireflection film containing 5 layers is preferably provided rather than the antireflection film containing 7 layers.

Since the surface 42a of optical element 42 has an aspheric surface, when an-antireflection film containing 7 layers are formed on surface 42a, a low reflectance of surface 42a is obtained in a wide range of wavelength, although the thickness variation of the film is several tens of %. Accordingly, on surface 42a of optical element 42, an antireflection film containing 7 layers is preferably provided rather than the antireflection film containing 5 layers.

These antireflection films containing 5 layers or 7 layers contains alternating layers of a low refractive index layer and a high refractive index layer. The low refractive index materials and the high refractive index materials are common to those above described for antireflection films for surface 41a, rear surface 41b or rear surface 42b.

When antireflection films using these materials are formed in a vacuum evaporation method, specifically when the films are formed on a plastic substrate at a lower temperature, variation of transparency of these films are smaller, even when amount of introduced oxygen or film forming rate is changed, compared to other film forming materials. By using the above mentioned materials, a film exhibiting low absorption of blue light having a wavelength of 405 nm is obtained, by which a temperature increase of the antireflection film while being irradiated with light is suppressed. Also, when these materials are used for an antireflection film used for blue light, exfoliation, crack of the film, or deformation of lens surface is suppressed while the film is irradiated with blue light. Thus an optical element exhibiting satisfactory optical properties is obtained.

On surface 42a of optical element 42, antireflection film 46 is formed to avoid reflection of light. An enlarged illustration of antireflection film 46 is shown in FIG. 2. As shown in FIG. 2, antireflection film 46 contains first layer 43, second layer 44 and third layer 45. First layer 43 is directly formed on surface 42a of optical element 42, second layer 44 is formed on first layer 43 and third layer 45 is formed on second layer 44. Namely, first layer 43 is located between optical element 42 and second layer 44 and second layer 44 is located between first layer 43 and third layer 45.

First layer 43, second layer 44 and third layer 45 each contains a low refractive index material, an intermediate refractive index material or a low-intermediate refractiveindex material. Here, the "intermediate refractive index material" as mentioned in the present invention represents a material exhibiting a refractive index of less than 1.7 while not less than 1.55 for a light having a wavelength of 405 nm, examples of which include: lead fluoride, cerium fluoride, neodymium fluoride, lanthanum fluoride, aluminum oxide and a mixture of two or more compound thereof. The "low-intermediate refractive index material" as mentioned in the present invention represents a material exhibiting a refractive index of not more than 1.55 for a light having a wavelength of 405 nm, an example of which include a mixed material of silicon oxide and aluminum oxide.

Herein, as shown in an enlarged illustration of FIG. 2, first layer 43 is directly in contact with surface 42a of optical element 42 and second layer 44, however, first layer 43 is not necessarily directly brought in contact with surface 42a of optical element 42 and second layer 44 and a different layer from first layer 43 containing a low refractive index material, an intermediate refractive index material or a low/intermediate refractive index material may be included between first layer 43 and surface 42a of optical element 42; as well as another different layer containing a low refractive index material, an intermediate refractive index material or a low/intermediate refractive index material may be included also between first layer 43 and second layer 44.

Further, as shown in a enlarged illustration of FIG. 2, in this embodiment, example of a three-layered structure in which first, second and third layers 43, 44, and 45 are deposited on surface 42a of optical element 42, however, a four-layered structure may be possible by depositing a layer similar to second layer 44 on third layer 45, and a five-layered structure is also possible by depositing a layer similar to second layer 44 and a layer similar to third layer 45 alternately on third layer 45; the layer composition on surface 42a of optical element 42 including these layer structures may be also applied on surface 41a of optical element 41, on rear surface 41b of optical element 41, and on rear surface 42b of optical element 42.

Antireflection film 46 may s single layer of silicon oxide, magnesium fluoride, a mixture of silicon oxide and magnesium fluoride or a mixture of silicon oxide and aluminum oxide, wherein the thickness of the antireflection film on the optical axis, $D_1$ (nm) preferably satisfy Formula (61) and, more preferably, satisfy Formula (62).

$$(74(2m+1)-20)\,(\text{nm}) \leq D_1 \leq (74(2m+1)+20)\,(\text{nm}) \quad \text{Formula (61)}$$

where, in Formula (61), m represents an integer of 0 to 6.

$$(74-20)\,(\text{nm}) \leq D_1 \leq (74+20)\,(\text{nm}). \quad \text{Formula (62)}$$

Other preferable examples of the antireflection film of the present invention will be described below:

(a) an antireflection film containing:

a first layer containing aluminum oxide, the first layer satisfying:

$$45\,\text{nm} \leq d_1 \leq 90\,\text{nm},$$

where $d_1$ represents a thickness of the first layer;

a second layer containing silicon oxide, magnesium fluoride, a mixture of silicon oxide and aluminum oxide, or a mixture of silicon oxide and magnesium fluoride, the second layer satisfying:

$$60\,\text{nm} \leq d_2 \leq 90\,\text{nm},$$

where $d_2$ represents a thickness of the second layer;

(b) an antireflection film containing:

a first layer containing an intermediate refractive index material, a thickness of the first layer $d_1$ satisfying:

$$80\,\text{nm} \leq d_1 \leq 120\,\text{nm},$$

a second layer containing a low refractive index material, a thickness of the second layer $d_2$ satisfying:

$$35\,\text{nm} \leq d_2 \leq 65\,\text{nm},$$

a third layer made of the intermediate refractive index material, a thickness of the third layer $d_3$ satisfying:

$$140\,\text{nm} \leq d_3 \leq 180\,\text{nm},$$

a fourth layer containing the low refractive index material, a thickness of the fourth layer $d_4$ satisfying:

$$70\,\text{nm} \leq d_4 \leq 105\,\text{nm},$$

wherein:

the low refractive index material contains silicon oxide, magnesium fluoride, a mixture of silicon oxide and aluminum oxide, or a mixture of silicon oxide and magnesium fluoride; and the intermediate refractive index material contains aluminum-oxide or a material containing aluminum oxide as a main component;

(c) an antireflection film of (b), wherein a layer containing the low refractive index material is provided between the lens body and the first layer.

(d) an antireflection film containing:

a first layer containing a low refractive index material, a thickness of the first layer $d_1$ satisfying:

$$70\,\text{nm} \leq d_1 \leq 100\,\text{nm},$$

a second layer containing an intermediate refractive index material, a thickness of the second layer $d_2$ satisfying:

$$15\,\text{nm} \leq d_2 \leq 40\,\text{nm},$$

a third layer containing the low refractive index material, a thickness of the third layer $d_3$ satisfying:

$$75\,\text{nm} \leq d_3 \leq 90\,\text{nm},$$

a fourth layer containing the intermediate refractive index material, a thickness of the fourth layer $d_4$ satisfying:

$$55\,\text{nm} \leq d_4 \leq 75\,\text{nm},$$

a fifth layer containing a low refractive index material, a thickness of the fifth layer $d_5$ satisfying:

$$3\,\text{nm} \leq d_5 \leq 20\,\text{nm},$$

a sixth layer containing an intermediate refractive index material, a thickness of the sixth layer $d_6$ satisfying:

$$70\,\text{nm} \leq d_6 \leq 95\,\text{nm},$$

a seventh layer containing the low refractive index material, a thickness of the seventh layer $d_7$ satisfying:

$$95\,\text{nm} \leq d_7 \leq 120\,\text{nm},$$

wherein:

the low refractive index material contains silicon oxide, magnesium fluoride, a mixture of silicon oxide and aluminum oxide, or a mixture of silicon oxide and magnesium fluoride; and the intermediate refractive index material contains aluminum oxide or a material containing aluminum oxide as a main component.

Herein, "resin containing a polymer provided with an alicyclic structure", which constitutes lens body 40 (optical elements 41 and 42) will be detailed.

"Resin containing a polymer provided with an alicyclic structure" preferably contains repeating unit (a) provided with an alicyclic structure represented by Formula (1), and chain structure repeating unit (b) represented by Formulae (2) or (3), in the whole repeating unit of a polymer having a weight average molecular weight of 1,000 to 1,000,000, so as to make the total content of not less than 90 weight %; and preferably further contains a alicyclic hydrocarbon type copolymer, in which the content of repeating unit (b) is not less than 1 weight % and less than 10 weight % and the chain of repeating unit (a) satisfies following Formula (Z).

$$A \leq 0.3 \times B \quad \text{Formula (Z)}$$

wherein, A=(a weight average molecular weight of a repeating unit chain provided with an alicyclic structure), and B=(a weight average molecular weight of a repeating unit provided with an alicyclic structure (Mw))×(a number of repeating units provided with an alicyclic structure/a total number of a repeating units composing an alicyclic hydrocarbon type copolymer).

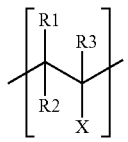

Formula (1)

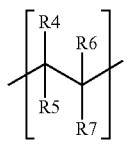

Formula (2)

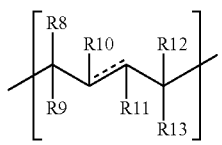

Formula (3)

R1-R13 in Formulae (1), (2) and (3) each, independently represent such as a hydrogen atom, a chain hydrocarbon group, a halogen atom, an alkoxy group, a hydroxyl group, an ether group, an ester group, a cyano group, an amide group, an imide group, a silyl group and a chain hydrocarbon group substituted by a polar group (a halogen atom, an alkoxy group, a hydroxyl group, an ether group, an ester group, a cyano group, an amide group, an imide group or a silyl group). Among them, preferable is the case of a hydrogen atom or a chain hydrocarbon group having a carbon number of 1-6, because of excellent heat resistance and low water absorbability. Halogen atoms include a fluorine atom, a chlorine atom, a bromine atom and an iodine atom. Chain hydrocarbon groups substituted by a polar group include, for example, alkyl halogenide groups having a carbon number of 1-20, preferably 1-10 and more preferably 1-6. Chain hydrocarbon groups include, for example, alkyl groups having a carbon number of 1-20, preferably 1-10 and more preferably 1-6; and alkenyl groups having a carbon number of 2-20, preferably 2-10 and more preferably 2-6.

X in formula (1) represents an alicyclic hydrocarbon group, the carbon number constituting which is generally 4-20; preferably 4-10 and more preferably 5-7. By setting the carbon number to constitute an alicyclic structure in this range, it is possible to decrease birefringence. Further, alicyclic structure is not limited to a monocyclic structure and may be a polycyclic structure such as a norbornane ring and a dicyclohexane ring.

Alicyclic hydrocarbon groups may be provided with a carbon-carbon unsaturated bond, however, the content is not more than 10%, preferably not more than 5% and more preferably not more than 3%, of the total carbon-carbon bonds. By setting the content of a carbon-carbon unsaturated bond of alicyclic hydrocarbon groups in this range, transparency and heat resistance are improved. Further, carbon atoms constituting an alicyclic hydrocarbon group may be bonded with chain hydrocarbon substituted by a hydrogen atom, a hydrocarbon group, a halogen atom, an alkoxy group, a hydroxyl group, an ether group, an ester group, a cyano group, an amide group, an imide group, a silyl group and a chain hydrocarbon group substituted by a polar group (a halogen atom, an alkoxy group, a hydroxyl group, an ether group, an ester group, a cyano group, an amide group, an imide group or a silyl group), and among them a hydrogen atom or a chain hydrocarbon group having a carbon number of 1-6 is preferred with respect to heat resistance and low water absorbability.

Further, " - - - " in Formula (3) represents a carbon-carbon saturated or unsaturated bond in the main chain, and in the case of transparency and heat resistance are strongly required, the content of the unsaturated bond is generally not more than 10%, preferably not more than 5% and more preferably not more than 3% of the total carbon-carbon bonds constituting the main chain.

Among repeating units represented by Formula (1), a repeating unit represented by following Formula (4) is superior with respect to heat resistance and low water absorbability.

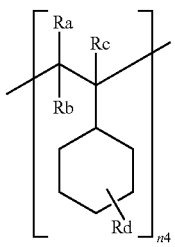

Formula (4)

Among repeating units represented by Formula (2), a repeating unit represented by following Formula (5) is superior with respect to heat resistance and low water absorbability.

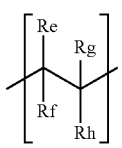

Formula (5)

Among repeating units represented by Formula (3), a repeating unit represented by following Formula (6) is superior with respect to heat resistance and low water absorbability.

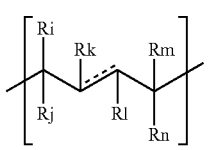

Formula (6)

In Formulae (4), (5) and (6), Ra, Rb, Rc, Rd, Re, Rf, Rg, Rh, Ri, Rj, Rk, Rl, Rm and Rn each independently represent a hydrogen atom or a lower chain hydrocarbon group and a hydrogen atom or a lower alkyl group having a carbon number of 1-6 is superior with respect to heat resistance and low water absorbability.

Among chain structure repeating units represented by Formulae (2) and (3), a chain structure repeating unit represented by Formula (3) is more superior in strength characteristics of the obtained hydrocarbon type copolymer.

In the present, the total content of repeating unit (a) provided with an alicyclic structure represented by Formula (1) and chain structure repeating unit (b) represented by Formula (2) and/or Formula (3) is generally not less than 90%, preferably not less than 95% and more preferably not less than 97%, base on weight. By setting the total content in the above range, low birefringence, sufficient heat resistance and low water absorbability as well as mechanical strength are obtained while being highly balanced with each other.

The content of chain structure-repeating unit (b) in an alicyclic hydrocarbon type copolymer is suitably selected depending on application purposes, however, generally in a range of not less than 1% and less than 10%, preferably not less than 1% and not more than 8% and more preferably not less than 2% and not more than 6%, based on weight. When the content of repeating unit (b) is in the above range, low birefringence, heat resistance and low water absorbability are obtained while being highly balanced with each other.

Further, the chain length of repeating unit (a) is sufficiently shorter than the molecular chain length of an alicyclic hydrocarbon type copolymer; and specifically, when A=(a weight average molecular weight of a repeating unit provided with an alicyclic structure), and B=(a weight average molecular weight of a repeating unit provided with an alicyclic structure (Mw))×(a number of repeating units provided with an alicyclic structure/the total number of repeating units constituting an alicyclic hydrocarbon type copolymer), A is in a range of not more than 30%, preferably not more than 20%, more preferably not more than 15% and most preferably not more than 10%, of B. When A is out of this range, birefringence may increase.

Further, it is also preferred that the chain length of repeating unit (a) is provided with a specific distribution. Specifically, when A=(a weight average molecular weight of a repeating unit chain provided with an alicyclic structure), and C=(a number average molecular weight of a repeating unit chain provided with an alicyclic structure), A/C is in a range of preferably not less than 1.3, more preferably 1.3-8 and most preferably 1.7-6. A block degree is increased when A/C is extremely small while a random degree is increased when A/C is extremely large, and increase in birefringence results in the both cases.

The molecular weight of an alicyclic hydrocarbon type copolymer of the present is in a range of 1,000-1,000,000, preferably 5,000-500,000, more preferably 10,000-300,000 and most preferably 50,000-250,000, based on a polystyrene (or polyisoprene) conversion weight average molecular weight (Mw) which is measured by means of gel permeation chromatography (hereinafter, referred to as GPC). Strength characteristics of an optical element are inferior when the weight average molecular weight of an alicyclic hydrocarbon type copolymer is extremely small, while birefringence increses when it is extremely large.

The molecular weight distribution of such copolymers is suitably selected according to application purposes, however, is in a range of generally not more than 2.5, preferably not more than 2.3 and more preferably not more than 2, based on a ratio of a weight average molecular weight (Mw) to a number average molecular weight (Mn), of polystyrene (or polyisoprene) conversion measured by means of GPC. When Mw/Mn is in this range, mechanical strength and heat resistance are obtained while being highly balanced with each other.

The glass transition temperature (Tg) of the copolymer may be suitably selected according to application purposes, however, it is generally 50-250° C., preferably 70-200° C. and more preferably 90-180° C.

Next, a manufacturing method of "polymers provided with an alicyclic structure" described above will be explained.

A manufacturing method of an alicyclic hydrocarbon type copolymer include (1) a method in which an aromatic vinyl type compound and a copolymerizable other monomer are copolymerized and carbon-carbon unsaturated bonds of the main chain and aromatic ring are hydrogenated and (2) a method in which an alicyclic vinyl type compound and a copolymerizable other monomer are copolymerized and the copolymer is appropriately hydrogenated.

In the case of manufacturing an alicyclic hydrocarbon type copolymer of the present is manufactured by the above-described methods, said copolymer is efficiently prepared by hydrogenation of carbon-carbon unsaturated bonds of such as the main chain and unsaturated rings such as an aromatic ring and a cycloalkene ring, in a copolymer containing an aromatic vinyl type compound and/or an alicyclic vinyl type compound (a') and copolymerizable other monomer (b') and provided with a chain structure, wherein D is not more than 30%, preferably not more than 20%, more preferably not more than 15% and most preferably not more than 10%, of E, when D=(a weight average molecular weight of a repeating unit chain arising from an aromatic vinyl type compound and/or an alicyclic vinyl type compound) and E=(a weight average molecular weight of a hydrocarbon type copolymer (Mw)×(a repeating unit number arising from an aromatic vinyl type compound and/or an alicyclic vinyl type compound/a repeating unit number of the total repeating unit number constituting a hydrocarbon type copolymer)). When D is out of the above range, birefringence in the obtained alicyclic hydrocarbon type copolymer becomes large.

In the present, an alicyclic hydrocarbon type copolymer can be prepared more efficiently by method (1).

The above described copolymers before hydrogenation preferably have D/F of a predetermined range, when F=(a number average molecular weight of a repeating unit chain arising from an aromatic vinyl type compound and/or an alicyclic vinyl type compound). Specifically, D/F is in a range of preferably not less than 1.3, more preferably not less than 1.3 and not more than 8 and most preferably not less than 1.7 and not more than 6. When D/F is out of this range, birefringence in the obtained alicyclic hydrocarbon type copolymer becomes large.

The weight average molecular weight and the number average molecular weight of a repeating unit chain arising from the above-described compound (a') can be determined by such as a method in which unsaturated double bonds in the main chain of an aromatic vinyl type copolymer are subjected to ozone addition being followed by reduction decomposition and the molecular weight of the taken out aromatic vinyl chain is measured, as described, for example, in literature Macromolecules, 16, 1925-1928 (1983).

The molecular weight of a copolymer before hydrogenation is in a range of 1,000-1,000,000, preferably 5,000-500,000 and more preferably 10,000-300,000, based on a polystyrene (or polyisoprene) conversion weight average molecular weight (Mw) measured by means of GPC. When the weight average molecular weight of a copolymer (Mw) is extremely small, an optical element containing an alicyclic hydrocarbon type copolymer obtained from the aforesaid copolymer is inferior in strength characteristics while the hydrogenation reactivity is inferior when it is extremely large.

Specific examples of an aromatic vinyl type compound utilized in above-described method (1) include, for example, styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene and 4-phenyl styrene; and preferable are such as styrene, 2-methylstyrene, 3-methylstyrene and 4-methylstyrene.

Specific examples of an alicyclic vinyl type compound utilized in above-described method (2) include, for example, cyclobutylethylene, cyclopentylethylene, cyclohexylethylene, cyclheptylethylene, cyclooctylethylene, norbornylethylene, dicyclohexylethylene, α-methylcyclohexylethylene, α-t-butylcyclohexylethylene, cyclopentenylethylene, cyclohexenylethylene, cycloheptenylethylene, cyclooctenylethylene, cyclodecenylethylene, norbonenylethylene, α-methylcyclohexenylethylene and α-t-butylcyclohexenylethylene; and preferable among them are cyclohexylethylene and α-methylcyclohexylethylene.

These aromatic vinyl type compounds and alicyclic vinyl type compounds each can be utilized alone or in combination of at least two types.

Copolymerizable other monomers are not specifically limited, however, chain vinyl compounds and chain conjugated diene compounds are utilized, and operational capability in the manufacturing process is superior and strength characteristics of the obtained alicyclic hydrocarbon type copolymer is excellent when chain conjugated diene is employed.

Specific examples of a chain vinyl compound include chain olefin monomers such as ethylene, propylene, 1-butene, 1-pentene and 4-metyl-1-pentene; nitrile type monomers such as 1-cyanoethylene (acrylonitrile), 1-cyano-1-methylethylene (methacrylonitrile) and 1-cyano-1chloroethylene (α-chloroacrylonitrile); (meth)acrylicacid ester type monomers such as 1-(methoxycarbonyl)-1-methylethylene (methacrylic acid methylester), 1-(ethoxycarbonyl)-1-methylethylene (methacrylic acid ethylester), 1-(propoxycarbonyl)-1-methylethylene (methacrylic acid propylester), 1-(butoxycarbonyl)-1-methylethylene (methacrylic acid butylester), 1-methoxycarbonyl ethylene (acrylic acid methylester), 1-ethoxycarbonyl ethylene (acrylic acid ethylester), 1-propoxycarbonyl ethylene (acrylic acid propylester) and 1-butoxycarbonyl ethylene (acrylic acid butylester); unsaturated fatty acid type monomers such as 1-carboxyethylene (acrylic acid), 1-carboxy-1-methylethylene (methacrylic acid) and maleic acid anhydride; and among them preferable are chain olefin monomers and most preferable are ethylene, propylene and 1-butene.

Chain conjugated dienes include, for example, 1,3-butadiene, isoprene, 2,3-dimethyl-1,3-butadiene, 1,3-pentadiene and 1,3-hexadiene. Chain conjugated dienes are preferable among these chain vinyl compounds and chain conjugated dienes, and specifically preferable are butadiene and isoprene.

These chain vinyl compounds and chain conjugated dienes can be utilized each alone or in combination of at least two types.

A polymerization method of compound (a') is not specifically limited, and includes such as a collective polymerization method (a batch method) and a monomer consecutive addition method (a method to proceed polymerization while consecutively adding the residual monomer after starting polymerization by use of a part of the total using amount of the monomer), and, in particular, a hydrocarbon type copolymer provided with a preferable chain structure can be obtained by use of a monomer consecutive addition method. Copolymers before hydrogenation are provided with a more random chain structure when the aforesaid D value is the smaller and/or D/F is the larger. How much randomness a copolymer has is determined by a rate ratio of a polymerization rate of aromatic vinyl type compound and that of a copolymerizable other monomer; and a chain structure of the more randomness is provided when this rate ratio is the smaller.

According to the aforesaid monomer consecutive addition method, since homogeneously mixed monomers are consecutively added into the polymerization system, polymerization selectivity of the monomer in the growing process by polymerization of the monomer can be decreased, different from a batch method, resulting in the obtained copolymer having a more random chain structure. Further, polymerization temperature can be maintained to be low and stable because of small accumulation of polymerization reaction heat in the polymerization system.

In the case of a monomer consecutive addition method, first, a monomer of generally 0.01-60 weight %, preferably 0.02-20 weight % and more preferably 0.05-10 weight % of the total using amount of the monomer are charged in a polymerization reaction vessel in advance as an initial monomer, and polymerization is started by addition of an initiator. By setting the initial monomer amount in this range, it is possible to easily remove reaction heat which is generated at the initial reaction of a polymerization initiator, resulting in making the prepared copolymer being provided with more random chain structure.

When the reaction is continued until to make the polymer conversion ratio of the above initial monomer of not less than 70%, preferably not less than 80% and more preferably not less than 90%, the prepared copolymer comes to have more random chain structure. Thereafter, the residual portion of the above monomer is intermittently added, and the addition rate is determined in consideration of a monomer consumption rate in the polymerization system.

Generally, addition of the residual monomer is made to completed within a range of 0.5-3 times, preferably 0.8-2 times and more preferably 1-1.5 times of the time given by relational equation $[(100-I) \times T/I]$, when the time required until the polymerization conversion ratio of the initial monomer reaches to 90% is T, and the ratio (%) of the initial monomer against the total using monomer is I. Specifically, the initial monomer amount and the addition rate of the residual monomer are determined so that addition of the residual monomer is completed in a range of generally 0.1-30 hours, preferably 0.5-5 hours and more preferably 1-3 hours. Further, the polymerization conversion ratio immediately after the end of monomer addition is generally not less than 80%, preferably not less than 85% and more preferably not less than 90%. By setting the polymerization conversion ratio of the whole monomer immediately after the end of monomer addition in the above-described range, a chain structure of a prepared copolymer becomes more random.

Polymerization reaction may be any of such as radical polymerization, anionic polymerization and cationic polymerization, without any specific limitation, however, is preferably anionic polymerization in view of polymerization operations, easiness of a hydrogenation reaction in the post-process, and mechanical strength of a hydrocarbon type copolymer as the final product.

In the case of radical polymerization, utilized can be such as bulk polymerization, solution polymerization, suspension polymerization and emulsion polymerization, in the presence of an initiator at generally 0-200° C. and preferably 20-150°

C.; however, bulk polymerization and suspension polymerization are preferred in the case that contamination of such as impurities in resin has to be prevented. As a radical initiator, utilized can be organic peroxides such as benzoyl peroxide, lauroyl peroxide, t-butyl-peroxy-2-ethylhexanoate; azo compounds such as azoisobutyronitrile, 4-azobis-4-cyanopentanate and azodibenzoyl; water-soluble catalysts represented by potassium persulfate and ammonium persulfate; and redox initiators.

In the case of anionic polymerization, utilized can be such as bulk polymerization, solution polymerization and slurry polymerization, in the presence of an initiator at generally 0-200° C., preferably 20-100° C. and specifically preferably 20-80° C.; however, solution polymerization is preferred in consideration of removal of the reaction heat. In this case, an inert solvent, which can dissolve a polymer and a hydride thereof, is utilized. Inert solvents utilized in a solution reaction include, for example, aliphatic hydrocarbons such as n-butane, n-pentane, iso-pentane, n-hexane, n-heptane and iso-octane; alicyclic hydrocarbons such as cyclopentane, cyclehexane, methylcyclopentane, methylcyclohexane and decalin; aromatic hydrocarbons such as benzene and toluene, and in the case of employing aliphatic hydrocarbons and alicyclic hydrocarbons among them, they can be utilized as they are as an inert solvent also for a hydrogenation reaction. These solvents each can be utilized alone or in combination of at least two types, and generally utilized at a ratio of 200-10,000 weight parts per 100 weight parts of the whole using monomer.

As an initiator of the above-described anionic polymerization, for example, mono-organic lithium compounds such as n-butyl lithium, sec-butyl lithium, t-butyl lithium, hexyl lithium and phenyl lithium, poly-functional organic lithium compounds such as dilithiomethane, 1,4-dilithiobutane, 1,4-dilithio-2-ethylcyclohexane can be utilized.

In polymerization reaction, such as a polymerization promoter and a randomizer (an additive provided with a function to prevent a chain of one specific component from growing too long) can be further utilized. In the case of anionic polymerization, for example, a Lewis base compound can be utilized as a randomizer. Specific examples of a Lewis base compound include ether compounds such as dimethyl ether, diethyl ether, diisopropyl ether, dibutyl ether, tetrahydrofuran, diphenyl ether, ethyleneglycol diethyl ether and ethyleneglycol methylphenyl ether; tertiary amine compounds such as tetramethylethylenediamine, trimethylamine, triethylamine and pyridine; alkali metal alkoxide compounds such as potassium-t-amyloxide and potassium-t-butyloxide; and phosphine compounds such as triphenylphosphine. These Lewis base compounds can be utilized each alone or in combination of at least tow types.

Polymers prepared by radical polymerization or anionic polymerization described above can be recovered by a commonly known method such as a steam stripping method, a direct desolvent method and an alcohol coagulation method. Further, in the case of utilizing a solvent, which is inert in hydrogenation reaction, at the time of polymerization, it is possible not to recover the polymer from the polymerization solution but to utilize the polymer solution in hydrogenation process as it is.

(Hydrogenation Method of Unsaturated Bond)

When performing a hydrogenation reaction of, such as a carbon-carbon double bond of an unsaturated ring such as an aromatic ring and a cycloalkene ring, and an unsaturated bond of a main chain, in a copolymer before hydrogenation, there is no specific limitation with respect to a reaction method and a reaction form and a commonly known method can be applied; however, preferable is a hydrogenation method which can provide a high hydrogenation ratio and minimize polymer chain cutting reaction caused concurrently with a hydrogenation reaction, for example, including a method which is performed in an organic solvent utilizing a catalyst containing at least one metal selected from nickel, cobalt, iron, titanium, rhodium, palladium, ruthenium and rhenium. As a hydrogenation catalyst, either of an inhomogeneous system catalyst and a homogeneous system catalyst can be utilized.

An inhomogeneous system catalyst can be utilized as a metal or a metal compound itself, or being held by a suitable carrier. Carriers include, for example, active carbon, silica, alumina, calcium carbon, titania, magnesia, zirconia, diatomaceous earth and silicon carbide, and the carrying amount of a catalyst is in a range of generally 0.01-80 weight % and preferably 0.05-60 weight %. As a homogeneous system catalyst, utilized can be a catalyst in which a nickel, cobalt, titanium or iron compound and an organometalic compound are combined, or an organometalic complex catalyst of such as rhodium, parlladium, platinum, ruthenium and rhenium. As compounds of nickel, titanium and iron, for example, acetylacetone salts, naphtene salts, cyclobutadienyl compounds and cyclopentadienyl dichloro compounds, of various metals can be preferably utilized. As organoaluminum compounds, preferably utilized can be alkylaluminums such as triethylaluminum and triisobutylaluminum; halogenated aluminums such as diethylaluminum chloride and ethylaluminum dichloride; and hydrogenated alkyl aluminums such as diiosbutylaluminum hydride.

As examples of an organometallic complex catalyst, utilized are metal complexes such as a $\gamma$-dichloro-$\pi$-benzene complex, a dichloro-tris(triphenylphosphine) complex and a hydride-chloro-triphenylphosphine of each metal described above. These hydrogenation catalysts can be utilized each alone or in combination of at least two types, and the using amount is generally 0.01-100 parts, preferably 0.05-50 parts and more preferably 0.1-30 parts, against a polymer based on weight.

A hydrogenation reaction is performed at generally 10-250° C., however, preferably at 50-200° C. and more preferably at 80-180° C., because a hydrogenation ratio can be increased as well as a polymer chain cutting reaction, which causes simultaneously with the hydrogenation reaction, can be minimized. Further, the hydrogen pressure is generally 0.1-30 MPa, however, is preferably 1-20 MPa and more preferably 2-10 MPa, with respect to operation easiness in addition to the above reasons.

A hydrogenation ratio of thus obtained hydrides, with respect to any of a carbon-carbon unsaturated bond of the main chain, a carbon-carbon double bond of an aromatic ring and a carbon-carbon double bond of an unsaturated ring, is generally not less than 90%, preferably not less than 95% and more preferably not less than 97%, based on a measurement by means of $^1$H-NMR. When the hydrogenation ratio is low, birefringence may increase and thermal stability of the obtained copolymer may be deteriorated.

A method to recover a hydride after finishing a hydrogenation reaction is not specifically limited, and generally utilized can be a method in which a solvent is directly removed from the solution of a hydride by drying after removing a hydrogenation catalyst residue by a method such as filtration and centrifugal separation, or a method, in which the solution of a hydride is poured into a poor solvent for the hydride resulting in coagulation of the hydride.

Herein, an antioxidant may be contained in the above "resin containing a polymer provided with an alicyclic structure".

Antioxidants include phenolic antioxidants, phosphite antioxidants and sulfur-containing antioxidants, and preferable among these are phenolic antioxidants and specifically alkylphenolic antioxidants. By incorporating these antioxidants, coloring and strength decrease of an optical element, due to such as oxidation deterioration at the time of molding, can be prevented without deteriorating transparency and low water absorbability.

As phenolic antioxidants, utilized can be those conventionally well known, which include, for example, acrylate type compounds such as 2-t-butyl-6-(3-t-butyl-2-hydroxy-5-methylbenzyl)-4-methylphenyl acrylate and 2,4-di-t-amyl-6-(1-(3,5-di-t-amyl-2-hydroxyphenyl)ethyl)phenyl acrylate, described in JP-A Nos. 63-179953 and 1-168643; alkyl substituted phenol type compounds such as octadecyl-3-(3,5-di-t-butyl-4-hydroxyphenyl)propionate, 2,2'-methylene-bis(4-methyl-6-t-butylphenol), 1,1,3-tris(2-mehtyl-4-hydroxy-5-t-butylphenyl)butane, 1,3,5-trimethyl-2,4,6-tris(3,5-di-t-butyl-4-hydroxybenzyl)benzene, tetrakis(methylene-3-(3'5'-di-t-butyl-4'-hydroxyphenylpropionate)methane [that is pentaerythrimethyl-tetrakis(3-(3,5-di-t-butyl-4-hydroxypropionate))], triethyleneglycol bis(3-(3-t-butyl-4-hydroxy-5-mehtylphenyl)propionate); and triazine group containing phenol type compounds such as 6-(4-hydroxy-3,5-di-t-butylanilino)-2,4-bisoctylthio-1,3,5-triazine, 4-bisoctylthio-1,3,5-triazine and 2-octylthio-4,6-bis-(3,5-di-t-butyl-4-oxyanilino)-1,3,5-triazine.

Phosphite antioxidants are not specifically limited provide they are commonly utilized in a general resin industry, and include, for example, monophosphite type compounds such as triphenylphosphie, diphenylisodecyl phosphite, phenyldiisodecyl phosphite, tris(nonylphenyl)phosphite, tris(dinonylphenyl)phosphite, tris(2,4-di-t-butylphenyl)phosphite, and 10-(3,5-di-t-butyl-4-hydroxybenzyl)-9,10-dihydro-9-oxa-10-phosphaphenanthrene-10-oxide; diphosphite compounds such as 4,4'-butylidene-bis(3-methyl-6-t-butylphenyl-di-tridecylphosphite) and 4,4'-isopropylidene-bis (phenyl-di-alkyl(C12-C15)phosphite). Among these, monophosphite type compounds are preferable and such as tris(nonylphenyl)phosphite, tris(dinonylphenyl)phosphite, and tris(2,4-di-t-butylphenyl)phosphite are specifically preferable.

Phosphite antioxidants include, for example, dilauryl 3,3-thiopropionate, dimyristyl 3,3'-thiodipropionate, distearyl 3,3-thiodipropionate, laurylstearyl 3,3-thiodipropionate, pentaerythritol-tetrakis-(β-lauryl-thio-propionate) and 3,9-bis(2-dodecylthioethyl)-2,4,8,10-tetraoxaspiro[5,5]undecane.

These antioxidants can be utilized each alone or in combination of at least two types, and the blending amount, which is suitably selected in a range of not disturbing the purpose of the present, is generally 0.001-5 weight parts and preferably 0.01-1 weight parts against 100 weight parts of an alicyclic hydrocarbon type copolymer.

Further in "resin containing a polymer provided with an alicyclic structure" described above, contained may be the aforesaid alicyclic hydrocarbon type copolymer and at least one type of a compounding agent selected from the group of (1) a soft polymer, (2) an alcoholic compound and (3) organic or inorganic filler. By blending these compounding agents, milky-whitening under an environment of high temperature and high humidity for a long period can be prevented without deteriorating various characteristics such as transparency, low water absorbability and mechanical strength.

Among these, (1) a soft polymer and (2) an alcoholic compound are superior in an effect to prevent milky-whitening under an environment of high temperature and high humidity as well as in transparency of the obtained resin composition.

(1) A soft polymer utilized in the present is a polymer provided with a Tg of generally not higher than 30° C., and at least the lowest Tg is not higher than 30° C. when plural Tg's exist.

Specific examples of these soft polymers include, for example, olefin type soft polymers such as liquid polyethylene, polypropyrene, poly-1-butene, an ethylene.α-olefine copolymer, a propylene.α-olefine copolymer, an ethylene.propylene.diene copolymer (EPDM) and an ethylene.propylene.styrene copolymer; isobutylene type soft polymers such as polyisobutylene, isobutylene.isoprene rubber and an isbutylene.styrene copolymer; diene type soft polymers such as polybutadiene, polyisoprene, a butadiene.styrene random copolymer, an isoprene.styrene random copolymer, an acrylonitrile.butadiene copolymer, an acrylonitrile.butadiene.styrene copolymer, a butadiene.styrene block copolymer, an isoprene.styrene block copolymer and a styrene.isoprene.styrene block copolymer; silicon-containing soft polymers such as dimethylpolysiloxane, diphenylpolysiloxane and dihydroxypolysiloxane; soft polymers containing an α,β-unstaturated acid such as polybutylacrylate, polybutylmethacrylate, polyhydroxyethylmethacrylate, polyacrylamide, polyacrylonitrile and a butylacrylate.styrene copolymer; soft polymers containing an unsaturated alcohol, and amine or an acyl derivative thereof or acetal, such as polyvinyl alcohol, polyvinyl acetate, polyvinyl stearate, a vinyl acetate.styrene copolymer; epoxy type soft polymers such as polyethylene oxide, polypropylene oxide and epichlorohydrine rubber; fluorine-containing soft polymers such as vinylidene fluoride type rubber and tetrafluoroethylene-propyrene rubber; and other soft polymers such as natural rubber, polypeptide, protein, a polyester type thermoplastic elastomer, a vinyl chloride type thermoplastic elastomer and a polyamide type thermoplastic elastomer. These soft polymers may be those provided with a cross-linking structure or those in which a functional group is introduced by a modification reaction.

Among the above-described soft polymers, a diene type soft polymer is preferable, and specifically a hydride, in which a carbon-carbon unsaturated bond of said soft polymer is hydrogenated, is superior in rubber elasticity, mechanical strength, flexibility and dispersibility.

(2) An alcoholic compound is a compound provided with at least one non-phenol hydroxyl group in the molecule, and preferably provided with at least one hydroxyl group and at least one ether bond or ester bond. Specific examples of such compounds include polyhydric alcohol of at least dihydric, preferably alchol of at least trihydric and more preferably an alcoholic ether compound and an alcoholic ester compound in which one of the hydroxyl group in polyhydric alcohol having 3-8 hydroxyl groups is etherified or esterified.

Polyhydric alcohols of at least dihydric include, for example, polyethylene glycohol, glycerol, trimethylol propane, pentaerythritol, diglycerol, triglycerol, dipentaerythritol, 1,6,7-trihydroxy-2,2-di(hydroxymethyl)-4-oxoheptane, sorbitol, 2-methyl-1,6,7-trihydroxy-2-hydroxymethyl-4-oxoheptane, 1,5,6-trihydroxy-3-oxohexane pentaerythritol, and tris(2-hydroxyethyl)isocyanurate, and, in particular, preferable are polyhydric alcohols of at least trihydric and more preferable are polyhydric alcohols provided with 3-8 hydroxyl groups. In the case of preparing an alcoholic ester compound, such as glycerol, diglycerol and triglicerol, which capable of synthesizing an alcoholic ester compound containing an α,β-diol are preferred.

These alcoholic compounds include, for example, polyhydric alcoholic ester compounds such as glycerin monostearate, glycerin monolaurate, glycerin monobehenate, diglycerin monostearate, glycerin distearate, glycerin dilaurate, pentaerythritol monostearate, pentaerythritol monolaurate, pentaerythritol monobehenate, pentaerythritol distearate, pentaerythritol dilaurate, pentaerythritol tristearate and dipentaerythritol distearate; 3-(octyloxy)-1,2-propanediol, 3-(decyloxy)-1,2-propanediol, 3-(lauryloxy)-1,2-propanediol, 3-(4-nonylphenyoxy)-1,2-propanediol, 1,6-dihydroxy-2,2-di(hydroxymethyl)-7-(4-nonylphenyloxy)-4-oxoheptane, an alcoholic ether compound prepared by a reaction of, a condensate of p-nonylphenylether with formaldehyde, and glycidol; an alcoholic ether compound prepared by a reaction of, a condensate of p-octylphenylether with formaldehyde, and glycidol; an alcoholic ether compound prepared by a reaction of, a condensate of p-octylphenylether with dicyclopentadiene, and glycidol. These alcoholic compounds can be-utilized alone or in combination of at least two types. The molecular weight of these polyhydric alcoholic compounds is not specifically limited, however, is generally 500-2000 and preferably 800-1500, due to minimum decrease of transparency.

As (3) organic or inorganic filler, ordinary organic polymer particles or cross-linked organic polymer particles can be utilized, including, for example, those of polyolefins such as polyethylene and polypropylene; halogen-containing vinyl polymers such as polyvinyl chloride and polyvinylidene chloride; polymers derived from an α,β-unsaturated acid such as polyallylate and polymethacrylate; polymers derived from unsaturated alcohol such as polyvinyl alcohol and polyvinyl acetate; polymers derived from polyethylene oxide or bisglycidyl ehter; aromatic condensed polymers such as polyphenylene oxide, polycarbonate and polysulfone; polyurethane; polyamide; polyester; aldehyde-phenol type resin; and natural polymer compounds.

Inorganic filler includes, for example, particles of 1st group element compounds such as lithium fluoride and borax (sodium borate hydrate); 2nd group element compounds such as magnesium carbonate, magnesium phosphate, calcium carbonate, strontium titanate and barium carbonate; 4th group element compounds such as titanium dioxide (titania) and titanium monoxide; 6th group element compounds such as molybdenum dioxide and molybdenum trioxide; 7th group element compounds such as manganese chloride and manganese acetate; 8th -10th group element compounds such as cobalt chloride and cobalt acetate; 11th group element compounds such as copper iodide (I); 12th group element compounds such as zinc oxide and zinc acetate; 13th group element compounds such as aluminum oxide (alumina), aluminum fluoride, aluminosilicate (almina silicate, kaolin, kaolinite); 14th group element compounds such as silicon oxide (silica, silica gel), cliftonite, carbon, graphite and glass; and natural minerals such as carnallite, kainite, mica (mica, phlogopite) and byrose mineral.

The blending amount of above (1)-(3) is determined by a combination of an alicyclic hydrocarbon type copolymer and the compounding compound, however, generally a glass transition temperature and transparency of the composition will lowered when the blending amount is too large, which is unsuitable for utilization as an optical material. While milky-whitening of an optical element may be caused under high temperature and high humidity when the blending amount is too small. The blending amount is generally 0.01-10 weight parts, preferably 0.02-5 weight parts and specifically preferably 0.05-2 weight parts against 100 weight parts of an alicyclic hydrocarbon type copolymer. A prevention effect of milky-whitening under an environment of high temperature and high humidity can not be achieved when the blending amount is too small, while heat resistance and transparency of an optical element will be deteriorated when the blending amount is too large.

Herein, in the above "resin containing a polymer provided with an alicyclic structure", such as a UV absorbent, a light stabilizer, a near infrared absorbent, a colorant such as dye and pigment, sliding agent, a plasticizer, an anti-static agent and a fluorescent whitening agent as other compounding agents can be appropriately blended, and these can be utilized alone or in combination of at least two types; and the blending amount is suitably selected within a range not to disturb the objective of the present.

UV absorbents include benzophenone type UV absorbents such as 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-benzophenone, 2-hydroxy-4-methoxy-5-sulfobenzophenone trihydrate, 2-hydroxy-4-n-octoxybenzophenone, 2,2',4,4'-tetrahydroxybenzophenone, 4-dodecyloxy-2-hydroxybenzophenone and bis(5-benzoyl-4-hydroxy-2-methoxyphenyl)methane; and benzotriazole type UV absorbents such as 2-(2'-hydroxy-5'-methyl-phenyl) benzotriazole, 2-(2H-benzotriazole-2-il)-4-methyl-6-(3,4,5, 6-tetrahydrophthalimidylmethyl)phenol, 2-(2H-benzotriazole-2-il)-4,6-bis(1-methyl-1-phenylethyl)phenol, 2-(2'-hydroxy-3',5'-di-tertiary-butyl-phenyl)benzotriazole, 2-(2'-hydroxy-3'-tertiary-butyl-5'-methyl-phenyl)-5-chlorobenzotriazole, 2-(2'-hydroxy-5'-tertiary-octylphenyl) benzotriazole, 2-(2'-hydroxy-3',5'-di-tertiary-amylphenyl) benzotriazole, 2-[2'-hydroxy-3'-(3",4",5",6"-tetrahydrophthalimidomethyl)-5'-methylphenyl] benzotriazole and 2,2'-methylenebis-[4-(1,1,3,3-tetramthylbutyl)-6-(2H-benzotriazole-2-il)phenol]. Among these, preferable are 2-(2'-hydroxy-5'-methyl-phenyl)benzotriazole, 2-(2H-benzotriazole-2-il)-4-methyl-6-(3,4,5,6-tetrahydrophthalimidylmethyl)phenol and 2-(2H-benzotriazole-2-il)-4,6-bis(1-methyl-1-phenylethyl)phenol, with respect to heat resistance and low volatility.

Light stabilizers include such as benzophenone type light stabilizers, benzotriazole type light stabilizers and hindered-amine type light stabilizers, however, in the present, preferably utilized are hindered-amine type light stabilizers with respect to transparency and coloring resistance of a lens. Among hindered-amine type light stabilizers (hereinafter, described as "HALS"), those having a Mn of polystyrene conversion, which is measured by use of GPC employing THF as a solvent, of preferably 1,000-10,000, more preferably 2,000-5,000 and specifically preferably 2,800-3,800. When the Mn is too small, a predetermined amount may not be blended due to evaporation at the time of said HALS being blended in a block copolymer by thermal fusion kneading, or foams and silver streaks may be generated at the time of thermal fusion molding in such as injection molding, resulting in deterioration of manufacturing stability. Further, a volatile component may be generated as a gas from a lens in the case of the lens is used for a long time while a lamp is lit. On the contrary, when the Mn is too large, dispersibility into a block copolymer is lowered to decrese transparency of the lens, resulting in decrease of an effect of light fastness improvement. Therefore, in the present, a lens, which is superior in manufacturing stability, low gas generation as well as transparency, can be obtained by setting the Mn of HALS in the above range.

Specific examples of these HALS include high molecular weight HALS in which a plural number of pyperidine rings are bonded via a triazine skeleton such as N,N',N'',N'''-tetrakis-[4,6-bis-{butyl-(N-methyl-2,2,6,6-tetramethylpyperidine-4-yl)amino}-triazine-2-yl]-4,7-diazadecane-1,10-diamine, a polycondensate of dibutyl amine, 1,3,5-triazine and N,N'-bis(2,2,6,6-tetramethyl-4-pyperidyl)butylamine, poly[{(1,1,3,3-tetramethylbutyl)amino-1,3,5-triazine-2,4-diyl}[(2,2,6,6-tetramethyl-4-pyperidyl)imino]-hexamethylene[(2,2,6,6-tetramethyl-4pyperidyl)imino]], a polycondensate of 1,6-hexadiamine-N,N'-bis(2,2,6,6-tetramethyl-4-pyperidyl) and morphorine-2,4,6-trichloro-1,3,5-triazine, poly[(6-morphorino-s-tiazine-2,4-diyl)(2,2,6,6-tetramethyl-4-pyperidyl)imino]-hexamethylene[(2,2,6,6-tetramethyl-4-pyperidyl)imino]; and a high molecular weight HALS in which a pyperidine ring is bonded via a ester bond such as a polymer of dimethyl succinate and 4-hydroxy-2,2,6,6-tetramethyl-1-pyperidineethanol, a mixed esterified compound of 1,2,3,4-butane tetracarbonate, 1,2,2,6,6-pentamethyl-4-pyperidinol and 3,9-bis(2-hydroxy-1,1-dimethylethyl)-2,4,8,10-tetraoxaspiro[5,5]undecane.

Among these, preferable are a polycondensate of dibutyl amine and 1,3,5-triazine and N,N'-bis(2,2,6,6-tetramethyl-4-pyperidyl)butylamine, poly[{(1,1,3,3-tetramethylbutyl)amino-1,3,5-triazine-2,4-diyl}[(2,2,6,6-tetramethyl-4-pyperidyl)imino]-hexamethylene[(2,2,6,6-tetramethyl-4-pyperidyl)imino]] and a polymer of dimethyl succinate and 4-hydroxy-2,2,6,6-tetramethyl-1-pyperidineethanol, having a Mn of 2,000-5,000.

The blending amount of the above UV absorbent and HALS against a block copolymer according to the present is preferably 0.01-20 weight parts, more preferably 0.02-15 weight parts and most preferably 0.05-10 weight parts against 100 parts of the polymer. When the addition amount is too small, the effect to improve light fastness cannot be achieved sufficiently, resulting in generation of coloring in the case of outdoor applications for a long period of time. On the other hand, when the blending amount of HALS is too large, transparency of the lens is deteriorated due to generation of a gas arising from a part of HALS or deterioration of dispersibility of a block copolymer.

Further, the above "resin containing a polymer provided with an alicyclic structure" compositions can be prepared by suitably mixing the above each component. The mixing methods are not specifically limited provided they can sufficiently disperse each component into a hydrocarbon type polymer, and include a method in which resin being in a fused state is kneaded by such as a mixer, a biaxial kneader, a roll, a Brabender and extruder and a method in which each component is dissolved in a suitable solvent to be dispersed and followed by being coagulated. In the case of employing a biaxial kneader, the resin composition is extruded as a bar form generally in a fused state, then being cut into a suitable length by use of a strand cutter, resulting in being mostly utilized as a pelletized optical element material. In more detail, "resin containing a polymer provided with an alicyclic structure" is preferably contains a block polymer provided with polymer block [A] which contains repeating unit [1] represented by following Formula (11), and polymer block [B] which contains repeating unit [1] represented by following Formula (11), and repeating unit [2] represented by following Formula (12) or/and repeating unit [3] represented by following Formula (13), and the relationship between mol fraction a (mol %) of repeating unit [1] in aforesaid polymer block [A] and mol fraction b (mol %) of repeating unit [1] in aforesaid polymer block [B] preferably satisfies a>b.

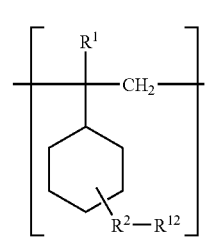

Formula (11)

In Formula (11), $R^1$ represents a hydrogen atom or an alkyl group having a carbon number of 1-20; and $R^2$-$R^{12}$ each represent a hydrogen atom, an alkyl group having a carbon number of 1-20, a hydroxyl group, an alkoxy group having a carbon number of 1-20 or a halogen group.

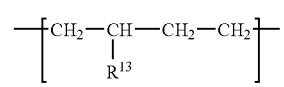

Formula (12)

In Formula (12), $R^{13}$ represents a hydrogen atom or an alkyl group having a carbon number of 1-20.

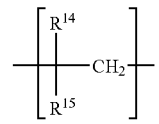

Formula (13)

In Formula (13), $R^{14}$ and $R^{15}$ each represent a hydrogen atom or an alkyl group having a carbon number of 1-20.

A preferable structure of repeating unit [1] represented by above Formula (11) is one in which $R^1$ is a hydrogen atom or a methyl group, and all $R^2$-$R^{12}$ are hydrogen atoms. When the content of a repeating unit [1] in polymer block [A] is in the above range, transparency and mechanical strength are superior. The residual part other than the aforesaid repeating unit [1] in polymer block [A] is a hydride of a repeating unit arising from chain conjugated dien and chain vinyl compound.

Polymer block [B] contains aforesaid repeating unit [1], and repeating unit [2] represented by following Formula (12) or/and repeating unit [3] represented by following Formula (13). The content of repeating unit [1] in polymer block [B] is preferably 40-95 mol % and more preferably 50-90 mol %. When the content of repeating unit [1] is in the above range, transparency and mechanical strength are superior. It is preferred to make (2×m2+m3) of not less than 2 mol %, more preferably 5-60 mol % and most preferably 10-50 mol %, when a mol fraction of repeating unit [2] is m2 (mol %) and a mol fraction of repeating unit [3] is m3 (mol %), in block [B].

Preferable structures of repeating unit [2] represented by above Formula (12) are those in which $R^{13}$ is a hydrogen atom or a methyl group.

Preferable structures of repeating unit [3] represented by above Formula (12) are those in which $R^{14}$ is a hydrogen atom and $R^{15}$ is a methyl group or an ethyl group.

When the content of aforesaid repeating unit [2] or repeating unit [3] in polymer block [B] is too small, the mechanical strength is decreased. Therefore, the transparency and mechanical strength are superior when the content of repeating unit [2] and repeating unit [3] are in the above range. Polymer block [B] may further contain repeating unit [X] represented by following Formula (X). The content of repeating unit [X] is in a range not to disturb the characteristics of block copolymer of the present, and is preferably not more than 30 mol % and more preferably not more than 20 mol %, against the total block copolymer.

Formula (X)

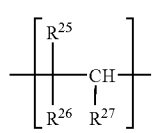

In Formula (X), $R^{25}$ represents a hydrogen atom or an alkyl group having a carbon number of 1-20; $R^{26}$ represents a nitrile group, alkoxycarbonyl group, a formyl group, a hydroxycarbonyl group or a halogen group; and $R^{27}$ represents a hydrogen atom. Or $R^{26}$ and $R^{27}$ may bond each other to form an acid anhydride or an imide group.

Further, block copolymer utilized in the present satisfies relationship a>b, when a mol fraction of repeating unit [1] in polymer block [A] is a and a mol fraction of repeating unit [1] in polymer block [b] is b. Thereby, the transparency and mechanical strength are superior.

Further, a block copolymer utilized in the present is superior in mechanical strength and heat resistance, in the case of ratio (ma/mb) is preferably 5/95-95/5, more preferably 30/70-95/5 and most preferably 40/60-90/10, when ma is a mol number of the total repeating unit constituting block [A], and mb is a mol number of the total repeating unit constituting block [B].

The molecular weight of a block copolymer utilized in the present is in a range of preferably 10,000-300,000, more preferably 15,000-250,000 and most preferably 20,000-200,000, based on a polystyrene (or polyisoprene) conversion weight average molecular weight (hereinafter, described as "Mw") measured by means of gel permeation chromatography (hereinafter, described as GPC) employing tetrahydrofuran as a solvent. When the Mw of a block copolymer is in the above range, the balance of mechanical strength, heat resistance and molding capability is excellent.

The molecular weight distribution of a block copolymer can be suitably selected depending on application purposes, however, the mechanical strength and heat resistance are superior when it is in a range of not more than 5, more preferably not more than 4 and most preferably not more than 3, based on ratio (Mw/Mn) of Mw to a number average molecular weight (hereinafter, described as "Mn") of polystyrene (polyisoprene) conversion, which is measured by means of GPC.

The glass transition temperature (hereinafter, described as "Tg") of a block copolymer is suitably selected according to application purposes, however, is preferably 70-200° C., more preferably 80-180° C. and most preferably 90-160° C., based on a measured value on the higher temperature side by use of a differential scanning type calorimeter (hereinafter, described as ""DSC).

The above block copolymer utilized in the present may be any of a di-block copolymer of ([A]-[B]) form provided with polymer block [A] and polymer block [B], a tri-block copolymer of ([A]-[B]-[A]) form or ([B]-[A]-[B]) form, or a block copolymer in which at least total four of polymer block [A] and polymer block [B] are alternately connected. Further, it may be a block copolymer in which these blocks are bonded in a radial form.

A block copolymer utilized in the present can be prepared by the following method. The methods include such a method, in which a monomer mixture containing an aromatic vinyl compound or/and an alicyclic vinyl compound provided with an unsaturated bond in the ring, and a monomer mixture containing a vinyl type monomer, are polymerized to prepare a block copolymer provided with a polymer block containing a repeating unit arising from an aromatic vinyl compound or/and an alicyclic vinyl compound, and a polymer block containing a repeating unit arising from a vinyl type monomer, and an aromatic ring or/and an alicyclic ring of said block copolymer being hydrogenated; and a method, in which a monomer mixture containing an unsaturated alicyclic vinyl compound, and a monomer mixture containing a vinyl type monomer (except an aromatic vinyl compound and an alicyclic vinyl compound) are polymerized to prepare a block copolymer provided with a polymer block, which contains a repeating unit arising from an alicyclic vinyl compound and a polymer block containing a repeating unit arising from a vinyl type monomer. Among them, a more preferable block copolymer utilized in the present can be prepared, for example, by the following method.

(1) As the first method, firstly, a monomer mixture [a'] containing not less than 50 mol % of an aromatic vinyl compound or/and an alicyclic vinyl compound provided with an unsaturated bond in the ring is polymerized to prepare polymer block [A'] containing a repeating unit arising from an aromatic vinyl compound or/and an alicyclic compound provided with an unsaturated bond in the ring. A monomer mixture [b'], which contains not less than 2 mol % of a vinyl type monomer (except an aromatic vinyl compound and an alicyclic vinyl compound) and an aromatic vinyl compound or/and an alicyclic vinyl compound provided with an unsaturated bond in the ring at a ratio of not more than the ratio in a monomer mixture [a'], are polymerized to prepare a polymer block [B'] containing a repeating unit arising from an aromatic vinyl compound or/and an alicyclic vinyl compound and a repeating unit arising from vinyl type monomer. After preparing a block copolymer provided with the aforesaid polymer block [A'] and polymer block [B'] is obtained, an aromatic ring or/and an alicyclic ring of said block polymer is hydrogenated.

(2) As the second method, firstly, a monomer mixture [a] containing not less than 50 mol % of a saturated alicyclic vinyl compound is polymerized to prepare polymer block [A] containing a repeating unit arising from a saturated alicyclic vinyl compound. A monomer mixture [b], which contains not less than 2 mol % of a vinyl type monomer (except an aromatic vinyl compound and an alicyclic vinyl compound) and a saturated alicyclic vinyl compound at a ratio of not more than the ratio in a monomer mixture [a], is polymerized to prepare a polymer block [B] containing a repeating unit arising from a saturated alicyclic vinyl compound and a repeating unit arising from vinyl type monomer. Block copolymer provided with aforesaid polymer block [A] and polymer block [B] is prepared via at least these processes.

Among the above-described methods, above method (1) is more preferred with respect to such as easy availability of monomers, a polymerization yield and easy introduction of a repeating unit [1] into polymer block [B'].

Specific examples of an aromatic vinyl compound in above method (1) include styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene, 4-phenylstyrene, and those in which a substituent such as a hydroxyl group and an alkoxy group is introduced therein. Among them, styrene, 2-methylstyrene, 3-methylstyrene and 4-methylstyrene are preferred.

Specific examples of an unsaturated alicyclic vinyl. compound in above method (1) include such as cyclohexenyl ethylene, α-methylcyclohexenyl ethylene and α-t-butylcyclohexenyl ethylene, and these provided with a substituent such as a halogen group, an alkoxy group or a hydroxyl group.

These aromatic vinyl compounds and alicyclic vinyl compounds can be utilized each alone or in combination of at least two types, however, in the present, it is preferred to utilize an aromatic vinyl compound, and among them more preferred is styrene or α-methylstyrene, in either monomer mixture [a'] and [b'].

A vinyl type monomer utilized in the above method includes a chain vinyl compound and a chain conjugated diene compound.

Specific examples of a chain vinyl compound include chain olefin monomers such as ethylene, propyrene, 1-butene, 1-pentene and 4-methyl-1-pentene; and most preferable among them are ethylene, propyrene and 1-butene.

Chain conjugated dienes include, for example, 1,3-butadiene, isoprene, 2,3-dimethyl-1,3-butadiene, 1,3-pentadiene and 1,3-hexadiene. Among these chain vinyl compounds and chain conjugated dienes, preferable is a chain conjugated diene and specifically preferable are butadiene and isoprene. These chain vinyl compounds and chain conjugated dienes can be utilized alone or in combination of at least two types.

When a monomer mixture containing the above-described monomer is polymerized, the polymerization reaction may be performed by any method of such as radical polymerization, anionic polymerization and cationic polymerization, however, preferable is anionic polymerization and most preferable is living anion polymerization in the presence of an inert solvent.

Anionic polymerization is performed in the presence of a polymerization initiator in a temperature range of generally 0-200° C., preferably 20-100° C. and specifically preferably 20-80° C. As an initiator, utilized can be organic monolithiums such as n-butyl lithium, sec-butyl lithium, t-butyl lithium, hexyl lithium and phenyl lithium; and polyfunctional organic lithium compounds such as dilithiomethane, 1,4-dilithiobutane, 1,4-dilithio-2-ethyl cyclohexane.

Inert solvents utilized include, for example, aliphatic hydrocarbons such as n-butane, n-pentane, isopentane, n-hexane, n-heptane and isooctane; alicyclic hydrocarbons such as cyclopentane, cyclohexane, methylcyclopentane, methylcycloheane and decalin; aromatic hydrocarbons such as benzene and toluene, and it is preferred to employ aliphatic hydrocarbons and alicyclic hydrocarbons among them, because these can be also utilized as an inert solvent in hydrogenation reaction as they are. These solvents can be utilized each alone or in combination of at least two types, and utilized so as to make a ratio of generally 200-10,000 weight parts against 100 weight parts of the total using monomer.

When polymerizing each polymer block, a polymerization promoter or a randomizer can be utilized to prevent a chain of one certain component from growing long. In particular, when performing polymerization by means of anionic polymerization, such as a Lewis base compound can be utilized as a randomizer. Specific examples of a Lewis base compound include ether compounds such as dimethyl ether, diethyl ether, diisopropyl ether, dibutyl ether, tetrahydrofuran, diphenyl ether, ethyleneglycol diethyl ether and ethyleneglycol methyl phenyl ether; tertiary amine compounds such as tetramethylethylenediamine, trimethylamine, triethylamine and pyridine; alkali metal alkoxide compounds such as potassium-t-amyloxide and potassium-t-butyloxide; and phosphine compounds such as triphenylphosphine. These Lewis base compounds can be utilized each alone or in combination of at least two types.

A method to prepare a block copolymer by means of living anion polymerization includes conventionally well known methods such as a consecutive addition polymerization reaction method and a coupling method; however, a consecutive addition polymerization reaction method is preferably utilized in the present.

In the case of preparing the above block copolymer provided with polymer block [A'] and polymer block [B'] by a consecutive addition polymerization reaction method, a process to prepare polymer block [A'] and a process to prepare polymer block [B'] are continuously performed in succession. Specifically, monomer mixture [a'] is polymerized, in an inert solvent in the presence of living anion polymerization catalyst, to prepare polymer block [A'], and successively monomer mixture [b'] is added into the reaction system to continue polymerization, resulting in preparation of polymer block [B'] connected with polymer block [A']. Further, according to a requirement, monomer mixture [a'] is added again and polymerization is performed to connect polymer block [A'] with the aforesaid product to form a tri-block polymer; and further, monomer mixture [b'] is added again and polymerization is performed to connect polymer block [B'] with the aforesaid product to form a tetra-block polymer.

The prepared block copolymer is recovered by such as a steam stripping method, a direct desolvent method and an alcohol coagulation method. In the case of employing a solvent, which is inactive in a hydrogenation reaction, in a polymerization reaction, a block copolymer is not required to be recovered from the polymerization solution because the polymerization solution can be utilized also in a hydrogenation reaction process as it is.

Among block copolymers (hereinafter, referred as "block copolymer before hydrogenation") provided with polymer block [A'] and polymer block [B'], preferable are those having a repeating unit of the following structure.

Preferable polymer block [A'] constituting a block copolymer before hydrogenation is a polymer block containing not less than 50 mol % of repeating unit [4] represented by following Formula (14).

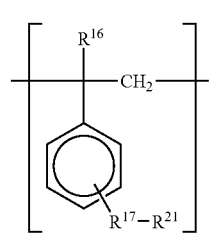

Formula (14)

In Formula (14), $R^{16}$ represents a hydrogen atom or an alkyl group having a carbon number of 1-20, and $R^{17}$-$R^{21}$ represent each independently a hydrogen atom, an alkyl group having a carbon number of 1-20, a hydroxyl group, an alkoxy group having a carbon number of 1-20 or a halogen group. Herein, [$R^{17}$-$R^{21}$] described above represents $R^{17}$, $R^{18}$, . . and $R^{21}$.

Further, preferable polymer block [B'] is one which necessarily contains aforesaid repeating unit [4] and at least either one of repeating unit [5] represented by following Formula (15) or repeating unit [6] represented by following Formula (16). Further, relationship a'>b' is satisfied when a mol fraction of repeating unit [4] in polymer block [A'] is a' and a mol fraction of repeating unit [4] in polymer block [B'] is b'.

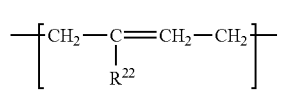

Formula (15)

In Formula (15), $R^{22}$ represents a hydrogen atom or an alkyl group having a carbon number of 1-20.

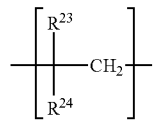

Formula (16)

In Formula (16), $R^{23}$ represents a hydrogen atom or an alkyl group having a carbon number of 1-20, and $R^{24}$ represents a hydrogen atom, or an alkyl group or alkenyl group, which have a carbon number of 1-20.

Further, in block [B'], repeating unit [Y] represented by following Formula (Y) may be contained.

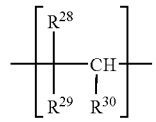

Formula (Y)

In Formula (Y), $R^{28}$ represents a hydrogen atom or an alkyl group having a carbon number of 1-20; $R^{29}$ represents a nitrile group, an alkoxycarbonyl group, a formyl group, a hydroxycarbonyl group or a hlogen group; and $R^{30}$ represents a hydrogen atom. Or $R^{29}$ and $R^{30}$ may bond each other to form an acid anhydride or an imide group.

Further, a preferable block copolymer before hydrogenation has the ratio (ma'/mb') of 5/95-95/5, more preferably 30/70-95/5 and most preferably 40/60-90/10, when a mol number of the total repeating unit constituting block [A'] is ma' and a mol number of the total repeating unit constituting block [B'] is mb'. When ma'/mb' is in the above range, the mechanical strength and heat resistance are superior.

The molecular weight of a preferred block copolymer before hydrogenation is in a range of 12,000-400,000, more preferably 19,000-350,000 and most preferably 25,000-300,000, based on a polystyrene (or isoprene) conversion Mw measured by means of GPC employing THF as a solvent. The mechanical strength is lowered when Mw of a block copolymer is extremely small, while a hydrogenation ratio is lowered when it is extremely large.

The molecular weight distribution of a preferred block copolymer before hydrogenation is suitably selected according to application purposes, however, the ratio (Mw/Mn) of Mw against Mn, of polystyrene(or polyasoprene) conversion, which is measured by means of GPC, is preferably not more than 5, more preferably not more than 4 and most preferably not more than 3. The hydrogenation ratio is improved when Mw/Mn is in this range.

Tg of a preferable block copolymer before hydrogenation may be suitably selected according to application purposes, however, is 70-150° C., more preferably 80-140° C. and most preferably 90-130° C. based on the measured value on the higher temperature side by means of DSC.

When performing a hydrogenation reaction of a carbon-carbon double bond of an unsaturated ring, such as an aromatic ring and a cycloalkene ring, and an unsaturated bond of a main chain or side chain, in the aforesaid copolymer before hydrogenation, there is no specific limitation with respect to a reaction method and a reaction form and a commonly known method can be applied; however, preferable is a hydrogenation method which can provide a high hydrogenation ratio and minimize polymer chain cutting reaction, including a method which is performed in an organic solvent utilizing a catalyst containing at least one metal selected from nickel, cobalt, iron, titanium, rhodium, palladium, ruthenium and rhenium. As a hydrogenation catalyst, either of an inhomogeneous system catalyst and a homogeneous system catalyst can be utilized.

An inhomogeneous type catalyst can be utilized as a metal or a metal compound itself, or being held by a suitable carrier. Carriers include, for example, active carbon, silica, alumina, calcium carbon, titania, magnesia, zirconia, diatomaceous earth and silicon carbide, and the carrying amount of a catalyst is in a range of generally 0.01-80 weight % and preferably 0.05-60 weight %. As a homogeneous system catalyst, a catalyst in which a nickel, cobalt, titanium or iron compound and an organometalic compound are combined, or an organometalic complex catalyst of such as rhodium, parlladium, platinum, ruthenium and rhenium. As compounds of nickel, titanium and iron, for example, acetylacetonates, napthenates, cyclobutadienyl compounds and cyclopentadienyl dichloro compounds, of various metals can be utilized. As organoaluminum compounds, preferably utilized can be alkylaluminums such as triethylaluminum and triisobutylaluminum; aluminum halogenides such as diethylaluminum chloride and ethylaluminum dichloride; and hydrogenated alkyl aluminums such as diiosbutylaluminum hydride.

As examples of an organometallic complex catalyst, utilized are metal complexes such as a γ-dichloro-π-benzene complex, a dichloro-tris(triphenylphosphine) complex and a hydride-chloro-triphenylphosphine complex of each metal described above. These hydrogenated catalysts can be utilized each alone or in combination of at least two types, and the using amount is preferably 0.01-100 weight parts and more preferably 0.05-50 parts and most preferably 0.1-30 parts, against 100 weight parts of a polymer.

A hydrogenation reaction is performed at generally 10-250° C., however, preferably at 50-200° C. and more preferably at 80-180° C., because a hydrogenation ratio can be increased as well as a polymer chain cutting reaction can be minimized. Further, the hydrogen pressure is generally 0.1-30 MPa, however, is more preferably 1-20 MPa and most preferably 2-10 MPa, with respect to operation easiness in addition to the above reasons.

A hydrogenation ratio of thus obtained hydrides, with respect to any of a carbon-carbon unsaturated bond of the main chain, and a carbon-carbon double bond of an aromatic ring and a cycloalkene ring, is preferably not less than 90%, more preferably not less than 95% and most preferably not less than 97%, based on a measurement by means of ¹H-NMR. When the hydrogenation ratio is low, birefringence may increase and thermal stability of the obtained copolymer may be deteriorated.

A copolymer after finishing the hydrogenation reaction can be recovered by a method in which a solvent is directly removed from the solution of a hydride by drying after removing a hydrogenation catalyst by a method such as filtration and centrifugal separation, and a method in which the solution of a copolymer is poured into a poor solvent for the block copolymer resulting in coagulation of the copolymer.

Further, milky-whitening under an environment of high temperature and high humidity for a long period can be prevented without deteriorating various characteristics such as transparency, thermal resistance and mechanical strength by blending a soft polymer having the lowest glass transition temperature of not higher than 30° C. into a block copolymer of the present.

Specific examples of these soft polymers include, for example, olefin type soft polymers such as liquid polyethylene, polypropyrene, poly-1-butene, an ethylene.α-olefine copolymer, a propylene.α-olefine copolymer, an ethylene.propylene.diene copolymer (EPDM) and an ethylene.propylene.styrene copolymer; isobutylene type soft polymers such as polyisobutylene, isobutylene.isoprene rubber and an isbutylene.styrene copolymer; diene type soft polymers such as polybutadiene, polyisoprene, a butadiene.styrene random copolymer, an isoprene.styrene random copolymer, an acrylonitrile.butadiene copolymer, an acrylonitrile.butadiene.styrene copolymer, a butadiene.styrene block copolymer, an isoprene.styrene block copolymer and a styrene.isoprene.styrene block copolymer; silicon-containing soft polymers such as dimethylpolysiloxane, diphenylpolysiloxane and dihydroxypolysiloxane; soft polymers containing an α,β-unsaturated acid such as polybutylacrylate, polybutylmethacrylate, polyhydroxyethylmethacrylate, polyacrylamide, polyacrylonitrile and a butylacrylate.styrene copolymer; soft polymers containing an unsaturated alcohol, and amine or an acyl derivative thereof or acetal, such as polyvinyl alcohol, polyvinyl acetate, polyvinyl stearate, a vinyl acetate.styrene copolymer; epoxy type soft polymers such as polyethylene oxide, polypropylene oxide and epichlorohydrine rubber; fluorine-containing soft polymers such as vinylidene fluoride type rubber and tetrafluoroethylene-propyrene rubber; and other soft polymers such as natural rubber, polypeptide, protein, a polyester type thermoplastic elastomer, a vinyl chloride type thermoplastic elastomer and a polyamide type thermoplastic elastomer. These soft polymers may be those provided with a cross-linking structure or those in which a functional group is introduced by a modification reaction.

Among the above soft polymers, a diene type soft polymer is preferable, and specifically, hydrides in which a carbon-carbon unsaturated bond of said soft polymer is hydrogenated are superior in rubber elasticity, mechanical strength, flexibility and dispersibility. The blending amount of a soft polymer differs depending on types of the compound, however, generally, when the blending amount is too large, the glass transition temperature and transparency of a block copolymer is significantly lowered, which makes the copolymer unusable as a lens. While, milky-whitening of an optical element under high temperature and high humidity may be caused when the blending amount is too small. The blending amount is preferably 0.01-10 weight parts, more preferably 0.02-5 weight parts and most preferably 0.05-2 weight parts, against 100 weight parts of a block copolymer.

A method to form a block copolymer composition by blending the above compounding agent in a block copolymer utilized in the present includes, for example, a method in which a block copolymer is kneaded with a compounding agent in a fused state by use of such as a mixer, a Brabender and an extruder; and a method in which a block copolymer and a compounding agent are dissolved in a suitable solvent and dispersed, followed by being coagulated. In the case of utilizing a biaxial kneader, the product is generally extruded as a strand state after having been kneaded and then often utilized by being cut into a pellet form by use of a pelletizer.

"Resin containing a polymer provided with an alicyclic structure", other than the above resin, may be those containing hydrogenated norbornene ring-opening polymer, a saturated bond ratio of which is 99.92-99.99% calculated from a peak area detected with a UV spectrometer and a differential refractometer in gel permeation chromatography (GPC).

A saturated bond ratio is a calculated value corresponding to a ratio of a carbon-carbon saturated bond in the total carbon-carbon bonds in an open ring polymer hydride, which is calculated from peak areas $S_1$ and $S_2$ detected with a UV spectrometer and a differential refractometer in gel permeation chromatography (GPC), as described below. The saturated bond ratio is represented by the following equation: saturated bond ratio (%)=100+k×($S_1/S_2$), when a peak area detected by a UV spectrometer is $S_1$ and a peak detected by a differential refractometer is $S_2$ in the case of a molecular weight of hydrogenated norbornene ring-opening polymer being measured by means of gel permeation chromatography (GPC). Herein, $S_1$ generally becomes small, when the smaller becomes a ratio of carbon-carbon double bond in a polymer. Further, "100—saturated bond ratio" is a ratio of a carbon-carbon unsaturated bond. When hydrogenation is completely performed, the saturated bond ratio is 100%.

In the above equation, k is calculated according to the following procedure. (1) Hydrogenation ratios of a plural number of polymer samples are measured by means of ¹H-NMR. (2) A sample solution is prepared by use of cyclohexane as a solvent so as to make a concentration of a polymer of 0.5 weight %. (3) The molecular weight of the sample solution obtained in above (2) is measured by means of gel permeation chromatography (GPC) and ($S_1/S_2$) is calculated from a peak area ($S_1$) which is detected with a UV spectrometer and a peak area ($S_2$) which is detected with a differential refractometer, of GPC. (4) Plotted are a hydrogenation ratio calculated by means of ¹H-NMR on the ordinate and $S_1/S_2$ on the abscissa, and the slope k calculated by a method of least square is defined as k. k is generally a negative value. Herein, a hydrogenation ratio by means of ¹H-NMR is calculated from an integrated value of a peak area in the ¹H-NMR spectrum of a polymer before and after hydrogenation.

A saturated bond ratio is calculated according to the following procedure. (1) A solution, for gel permeation chromatography (GPC) measurement of hydrogenated norbornene ring-opening polymer, is prepared. Cyclohexane is employed as a solvent, and the concentration of the aforesaid hydride in the solution is set to 0.5 weight %. (2) The molecular weight of the solution prepared in above (1) is measured by means of gel permeation chromatography (GPC) and a peak area ratio ($S_1/S_2$) is calculated from a peak area ($S_1$) which is detected with a UV spectrometer and a peak area ($S_2$) which is detected with a differential refractometer, of GPC. (3) A saturated bond ratio is calculated from peak area ratio ($S_1/S_2$) calculated in above (2) and calculated k, according to the following equation:

$$\text{Saturated bond ratio (\%)}=100+k\times(S_1/S_2)$$

A norbobnene open ring polymer hydride is provided with 50-100 weight %, preferably 70-100 weight % and more preferably 90-100 weight % of a repeating unit arising from a norbornene monomer represented by following Formula (21).

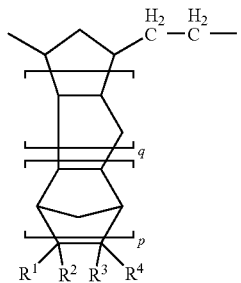

Formula (21)

(In Formula (21), $R^1$-$R^4$ each independently represent a hydrogen atom, a hydrocarbon group having a carbon number of 1-20, or a group containing a halogen atom, a silicon atom, an oxygen atom or a nitrogen atom; and $R^1$ and $R^4$ may bond each other to form a ring. p is 0, 1 or 2. q is 0 or 1.)

Hydrogenated norbornene ring-opening polymer is prepared as follows: a norbornene monomer and an open ring polymerization catalyst are charged in a reaction system to be subjected to open ring polymerization, and said catalyst is added even after finishing addition of said monomer to complete open ring polymerization resulting in preparation of norbornene ring-opening polymer, which is then hydrogenated in the presence of a hydrogenation catalyst.

A norbornene monomer constituting hydrogenated norbornene ring-opening polymer is norbornenes, norbornene derivatives provided with a ring structure other than a norbornene ring, or polycyclic cyclo-olefins provided with a norbornene ring of such as tetracycododecenes and hexacycoheptadecenes, and typically represented by following Formula (22). These monomers may be further provided with a hydrocarbon group such as an alkyl group, an alkenyl group and an alkylydene group; a group containing a nitrogen atom, an oxygen atom, a silicon atom, a phosphor atom or a sulfur atom; or a double bond other than the double bond of a norbornene ring.

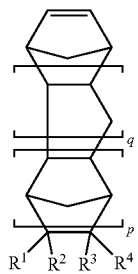

Formula (22)

(In Formula (22), $R^1$-$R^4$, p and q are identical to those in above Formula (21).)

Norbornenes are norbornene monomers in which p and q of Formula (22) are 0. Specific examples include unsubstituted or alkyl group substituted norbornenes such as norbornene, 5-methylnorbornene, 5-ethylnorbornene, 5-butylnorbornene, 5-hexylnorbornene, 5-decylnorbornene, 5-cyclohexylnorbornene and 5-cyclopentylnorbornene; norbornenes provided with an alkenyl group such as 5-ethylidenenorbornene, 5-vinylnorbornene, 5-propylnorbornene, 5-cyclohexenylnorbornene and 5-cyclopentenylnorbornene; norbornenes provided with an aromatic group such as 5-phenylnorbornene; norbornenes provided with an oxygen atom such as 5-methoxycarbonyl-norbornene, 5-ethoxycarbonynorbornen, 5-methyl-5-methoxycarbonylnorbornen, 5-methyl-5-ethoxycarbonylnorbornen, norbornenyl-2-methylpropionate, norbornenyl-2-methyloctanate, norbornene-5,6-dicarbonate anhydride, 5-hydroxymethylnorbornene, 5,6-di(hydroxymethyl)norbonene, 5,5-di(hydroxymethyl)norbonene, 5-hydroxy-i-propylnorbornene, 5,6-dicarboxynorbornene and 5-methoxycarbonyl-6-carboxynorbornene; and norbornenes provided with a group containing a nitrogen atom such as norbornene-5,6-dicarboxylic acid imide.

Norbornene derivatives provided with a ring structure other than a norbornene ring are norbornene monomers in which p is 0, q is 0 or 1, and $R^1$ and $R^4$ bond each other to form a ring structure other than a norbornene ring and a 5-membered ring, in Formula (22). Specifically, listed are dicyclopentadienes in which p is 0 and q is 1, and norbornene derivatives in which p is 0, q is 1 and an aromatic ring is provided. Specific examples of dicyclopentadienes include tricyclo[4.3.0.1$^{2.5}$]deca-3,7-diene (customary name: dicyclopentadiene), which is provided with a double bond in a 5-membered ring portion, and tricyclo[4.3.1$^{2.5}$.0]deca-3-ene, tricyclo[4.4.1$^{2.5}$.0]unda-3-ene, in which a double bond in a 5-membered ring is saturated. Specific examples of norbornene derivatives which have p of 0 and q of 1 and are provided with an aromatic ring include tetracyclo[6.5.1$^{2.5}$.0$^{1.6}$.0$^{8.13}$]trideca-3,8,10,12-tetraene (also referred to as 1,4-methano-1,4,4a,9a-tetrahydrofluorene).

Tetracyclododecenes are norbornene monomers which have p of 1 and q of 0 in Formula (22). Specific examples include unsubstituted or alkyl group substituted tetracycldodecenes such as tetracycldodecene, 8-methyltetracycldodecene, 8-ethyltetracycldodecene, 8-cyclohexyltetracycldodecene and 8-cyclopentyltetracycldodecene; tetracyclododecenes provided with a double bond outside the ring such as 8-methylidene tetracycldodecene, 8-ethylidene tetracycldodecene, 8-vinyltetracyclodecene, 8-propenyltetracyclodecene, 8-cyclohexenyltracycldodecene and 8-cyclopentenyltetracycldodecene; tetracyclodecenes provided with an aromatic ring such as 8-phenyltetracyclododecene; tetracyclodecenes containing an oxygen atom such as 8-methoxycarbonyltetracyclododecene, 8-methyl-8-methoxycarbonyltetracyclododecene, 8-hydroxymethyltetracyclododecene, 8-carboxytetracyclododecene, tetracyclododecene-8,9-dicarbonate and tetracyclododecene-8,9-dicarbonate anhydride; tetracyclododecenes containing a nitrogen atom such as 8-cyanotetracyclododecene and tetracyclododecene-8,9-dicarboxylic acid imide; tetracyclodecenes containing a halogen atom such as 8-chlorotetracyclododecene; tetracyclodododecenes containing a silicon atom such as 8-trimethoxysilyltetracyclododecene.

Hexacycloheptadecenes are norbornene monomers having p of 2 and g of 0 in Formula (22). Specific examples include unsubstituted or alkyl group substituted hexacycloheptadecenes such as hexacycloheptadecene, 12-methylhexacycloheptadecene, 12-ethylhexacycloheptadecehe, 12-cyclohexylhexacycloheptadecene and 12-cyclopentylhexacycloheptadecene; hexacycloheptadecenes provided with a double bond outside the ring such as 12-methylidenehexacycloheptadecene, 12-ethylidenehexacycloheptadecene, 12-vinylhexacycloheptadecene, 12-propenylhexacycloheptadecene, 12-cyclohexenylhexacycloheptadecene and 12-cyclopentenylhexacycloheptadecene; hexacycloheptadecenes provided with an aromatic ring such as 12-phenylhexacycloheptadecene; hexacycloheptadecenes containing an oxygen atom such as 12-methoxycarbonylhexacycloheptadecene, 12-methyl-12-methoxycarbonylhexacycloheptadecene, 12-hydroxymethylhexacycloheptadecene, 12-carboxyhexacycloheptadecene, hexacycloheptadecene-12,13-anhydride and hexacycloheptadecene-12,13-dicarbonate anhydride; hexacycloheptadecenes containing a nitrogen atom such as 12-cyanohexacycloheptadecene and hexacycloheptadecene-12,13-dicarbimide; hexacycloheptadecenes containing a halogen atom such as 12-chloro hexacycloheptadecene; cycloheptadecenes containing a silicon atom such as 12-trimethoxysilyltetracyclodecene. The above norbornene monomers may be utilized each alone or in combination of at least two types.

Hydrogenated norbornene ring-opening polymer may contain a repeating unit arising from a monomer which is copolymerizable with a norbornene monomer. Other monomers which are.copolymerizable with a norbornene monomer are not specifically limited, however, for example, include cycloolefins such as cyclobutene, cyclopentene, cyclohexene, 3,4-dimethylcyclopentene, 3-methylcyclohexene, 2-(2-methylbutyl)-1-cyclohexene and cyclooctene, 3a,5,6,7a-tetrahydro-4,7-methano-1H-indene; and non-conjugated dienes such as 1,4-hexadiene, 4-methyl-1,4-hexadiene, 5-metyl-1,4-hexadiene and 1,7-octadiene.

The content of these repeating units arising from other monomers which are copolymerizable with a norbornene monomer is generally 0-50 weight %, preferably 0-30 weight % and more preferably 0-10 weight %.

The polyisoprene conversion weight average molecular weight of hydrogenated norbornene ring-opening polymer; which is measured by means of gel permeation chromatography employing cyclohxane as a solvent, is generally 10,000-100,000, preferably 13,000-70,000, more preferably 14,000-60,000 and most preferably 15,000-50,000. Further, the molecular weight distribution (MWD), which is represented by a ratio of a weight average molecular weight to a number average molecular weight (Mw/Mn), is generally 1.5-5.0, preferably 1.7-4.0 and more preferably 1.8-3.0.

Hydrogenated norbornene ring-opening polymer is more preferable when the smaller is the ratio of a component having the polyisoprene conversion weight average molecular weight (Mw), which is measured by means of gel permeation chromatography employing cyclohxane as a solvent, of not less than 75,000. Specifically, it is not more than 15 weight % and preferably not more than 10 weight %, based on the total polymer.

The glass transition temperature (Tg) of hydrogenated norbornene ring-opening polymer is suitably selected according to application purposes, however, is in a range of generally 30-300° C., preferably 60-250° C. and more preferably 80-200° C. Heat resistance and light fastness of the obtained optical element are deteriorated when the glass transition temperature is extremely low, while mold processing capability is deteriorated when it is extremely high.

The manufacturing method of hydrogenated norbornene ring-opening polymer includes performing open ring polymerization while adding a norbornene monomer and an open ring polymerization catalyst (an initial addition catalyst) into the reaction system, and preparing norbornene ring-opening polymer by completing open ring polymerization with addition of said catalyst even after finishing said monomer addition, followed by hydrogenation in the presence of a hydrogenation catalyst.

A norbornene monomer, to which this manufacturing method can be applied, includes a norbornene monomer constituting the hydride. The ratio of a norbornene monomer is generally 50-100 weight %, preferably 70-100 weight %, more preferably 90-100 weight % and most preferably 100 weight %. By setting the ratio of a norbornene monomer in the above range, mechanical strength of the prepared optical element is improved.

Further, in a manufacturing method of hydrogenated norbornene ring-opening polymer, utilized may be a monomer which is copolymerizable with the above-described norbornene monomer. Other monomers which are copolymerizable with the above-described norbornene type monomer are not specifically limited and include cycloolefins such as cyclobutene, cyclopentene, cyclohexene, 3,4-dimethylcyclopentene, 3-methylcyclohexene, 2-(2-methylbutyl)-1-cyclohexene, cyclooctene,-3a,5,6,7a-tetrahydro-4,7-methano-1H-indene; and non-conjugated dienes such as 1,4-hexadiene, 4-methyl-1,4-hexadiene, 5-methyl-1,4-hexadiene and 1,7-octadiene. The ratio of these other monomers which are copolymerizable with a norbornene type monomer is-generally 0-50 weight %, preferably 0-30 weight % and more preferably 0-10 weight %.

In a manufacturing method of hydrogenated norbornene ring-opening polymer, the polymerization reaction can be performed either with or without a solvent, and the type of a solvent is not specifically limited in the case of utilizing a solvent, provided it can sufficiently dissolve a norbornene monomer and the open ring polymer. In particular, it is preferable to perform polymerization in an inert organic solvent.

The inert organic solvent includes, for example, aromatic hydrocarbons such as benzene, toluene and xylene; aliphatic hydrocarbons such as n-pentane, hexane and heptane; alicyclic hydrocarbons such as cyclopentane and cyclohexane; hydrocarbon halogenides such as stylenedichloride, dichloroethane, dichloroethylene, tetrachloroethane, chlorobenzene, dichlorobenzene and trichlorobenzene. Among them, preferable are aliphatic hydrocarbons such as n-pentane, hexane and heptane; alicyclic hydrocarbons such as cyclopentane and cyclohexane; or halogenides htereof. These solvents can be utilized each alone or in combination of at least two types, and the using amount is in a range of generally 10-1000 weight parts, preferably 50-700 weight parts and more preferably 100-500 weight parts against 100 parts of a norbornene monomer.

The manufacturing method of hydrogenated norbornene ring-opening polymer includes performing open ring polymerization while adding a norbornene monomer and an open ring polymerization catalyst (an initial addition catalyst) into the reaction system.

In this manufacturing method, a norbornene monomer and an open ring polymerization catalyst may be added either by mixing or each independently, however, it is preferable to perform open ring polymerization by adding the residual norbornene monomer and an open ring polymerization catalyst after a part of a norbornene monomer, inert organic solvent and a promoter are charged into a reaction vessel. The charging amount of a norbornene monomer in this case is not more than 50 weight % and preferably not more than 40 weight %, against the total amount of a norbornene monomer used in a manufacturing method of hydrogenated norbornene ring-opening polymer.

A promoter applicable to a manufacturing method of hydrogenated norbornene ring-opening polymer includes those utilized as a promoter of an open ring catalyst. Specifically, listed are organic aluminum compounds and organic tin compounds, and preferable are organic aluminum compounds.

Specific examples of organic aluminum compounds include trialkylaluminum such as trimethylaluminum, triethylaluminum, tri-n-propylaluminum, triisopropylaluminum and triisobutylaluminum; alkylhalidealuminum such as diethylaluminum monochloride and ethylaluminum dichloride, however, preferably include such as triethylaluminum, triisobutylaluminum and diethylaluminum chloride.

These promoters can be utilized each alone or in combination of at least two types. The addition amount of a promoter is 0.005-10 mol % and preferably 0.02-5 mol % based on a norbornene monomer. By utilizing a promoter in the above range, generation of such as a gel and a high molecular weight component are minimized as well as polymerization activity is high to make easier control of the molecular weight.

In a manufacturing method of hydrogenated norbornene ring-opening polymer, incorporated to an open ring polymerization reaction may be a molecular weight modifier or a reaction controlling agent other than a norbornene monomer, an open ring polymerization catalyst and a promoter, As a molecular weigh modifier, generally utilized are such as chain monoolefins and chain conjugated dienes. Specific examples include 1-butene, 2-btene, 1-pentene, 1-hexene, 1-heptene, 1-octene, 1-dodecene and 1,4-hexadiene. The using amount of a molecular weight modifier is suitably selected according to polymerization conditions, however, is generally 0.2-10 mol %, preferably 0.4-7 mol % and more preferably 0.5-4 mol %, against a norbornene monomer.

As a reaction controlling agent, utilized can be at least one type of a polar compound selected from polar compounds containing active hydrogen such as alcohol and amine; and polar compounds not containing active hydrogen such as ether, ester, ketone and nitrile. A polar compound containing active hydrogen is effective to prevent gel generation and to obtain a polymer having a specific molecular weight, and alcohol is preferable among them. While, a polar compound without containing active hydrogen is effective to depress formation of a component having a low molecular weight, which may deteriorate mechanical strength, and among them preferable are ether, ester and ketone, and specifically preferable is ketone.

Alcohols include, for example, saturated alcohols such as methanol, ethanol, propanol, isopropanol, butanol, isobutanol, t-butanol, pentanol, isopentanol, hexanol and cyclohexanol; unsaturated alcohols such as phenol and benzyl alcohol, and preferably are propanol, isopropanol, butanol and isobutanol.

Esters include, for example, methyl formate, ethyl formate, methyl acetate, ethyl acetate, propyl acetate, isopropyl acetate, methyl benzoate, ethyl benzoate, propyl benzoate and isopropyl benzoate, and preferable among them are methyl acetate and ethyl acetate.

Ethers include, for example, dimethyl ether, diethyl ether, dibutyl ether, ethyleneglycol dibutyl ether and triethyleneglycol dibutyl ether, and preferable among them are diisopropyl ether and diethyl ether.

Ketones include, for example, acetone, methyl ethyl ketone, diethyl ketone, methyl phenyl ketone and diphenyl ketone, and preferable among them are actone and methyl ethyl ketone.

Reaction controlling agents can be utilized each alone or in combination of at least two types. Particularly, in hydrogenated norbornene ring-opening polymer, it is preferable to utilize a polar compound containing active hydrogen in combination with a polar compound without active hydrogen, and specifically preferable are combinations of alcohol with ketone, alcohol with nitrile, alcohol with ether, and alcohol and ester. The using amount of a reaction controlling agent is in a range of generally 0.001-10 mol % and preferably 0.01-5 mol %, against a norbornene monomer.

The open ring polymerization is performed under a temperature range of generally −20-100° C., preferably 0-100° C., more preferably 10-80° C. and most preferably 10-50° C. The reaction rate is decreased when the temperature is too low, while the control of the reaction is difficult as well energy cost is high when the temperature is too high. That is, by adjusting the temperature in to a range of −20-100° C., polymerization can be advanced at a suitable reaction rate in addition that reaction control is easy and energy cost is depressed low.

The pressure condition of open ring polymerization is generally 0-5 MPa, preferably an ordinary pressure—1 MPa and more preferably an ordinary pressure—0.5 MPa.

Open ring polymerization may be performed under an inert gas atmosphere such as nitrogen and argon, to prevent the obtained polymer from such as degradation or coloring due to oxidation.

Open ring polymerization catalysts applicable to a manufacturing method of hydrogenated norbornene ring-opening polymer are commonly known open ring polymerization catalysts of a norbornene monomer, which are disclosed in JP-B No. 41-20111 (hereinafter, JP-B refers to Examined Japanese Patent Application Publication), JP-A No. 46-14910, JP-B Nos. 57-17883 and 57-61044, JP-A Nos. 54-86600, 58-127728 and 1-240517. Specifically, they are compounds of transition metals of 4th to 10th group in the periodic table, and include halogenides, oxyhalogenides, alkoxyhalogenides, alkoxides, carbonates, (oxy)acetylacetonates and carbonyl complexes of these transition metals.

Specific examples include $TiCl_4$, $TiBr_4$, $VOCl_3$, $VOBr_3$, $WBr_4$, $WBr_6$, $WCl_2$, $WCl_4$, $WCl_5$, $WCl_6$, $WF_4$, $WI_2$, $WOBr_4$, $WOCl_4$, $WOF_4$, $MoBr_2$, $MoBr_3$, $MoBr_4$, $MoCl_4$, $MoCl_5$, $MoF_4$, $MoOCl_4$, $MoOF_4$, $WO_2$, $H_2WO_4$, $Na_2WO_4$, $K_2WO_4$, $(NH_4)_2WO_4$, $CaWO_4$, $CuWO_4$, $MgWO_4$, $(CO)_5WC(OCH_3)(CH_3)$, $(CO)_5WC(OC_2H_5)(CH_3)$, $(CO)_5WC(OC_2H_5)(C_4H_5)$, $(CO)_5MoC(OC_2H_5)(CH_3)$, $(CO)_5Mo{=}C(C_2H_5)(N(C_2H_5)_2)$, tridecylammonium molybdate and tridecylammonium tungstate.

Among above open ring polymerization catalysts, compounds of W, Mo, Ti or V are preferred, and in particular, halogenides, oxyhalogenides or alkoxyhalogenides thereof are more preferred, with respect to such as practical polymerization reactivity.

The addition amount of an open ring polymerization catalyst is generally 0.001-5 mol %, preferably 0.005-2.5 mol % and more preferably 0.01-1 mol %, against a norbornene monomer.

In a manufacturing method of hydrogenated norbornene ring-opening polymer, open ring polymerization is preformed while adding a norbornene monomer and an open ring polymerization catalyst into the reaction system, and said catalyst is further added (an additional catalyst) after finishing said monomer addition. The timing of additional addition of an open ring polymerization include, for example, those immediately after finishing addition of a norbornene monomer addition, or after an elapse of time after finishing addition of said monomer. Further, a method of additional addition of an open ring polymerization catalyst includes, for example, a method in which an open ring polymerization catalyst is added at once, a method in which said catalyst is added continuously, or a method in which said catalyst is added intermittently, however, a method of continuous addition is preferred.

In a manufacturing method of hydrogenated norbornene ring-opening polymer, the polymerization conversion ratio at the time of finishing addition of a norbornene monomer is preferably 90-99% and more preferably 93-97%, and the amount of additional catalyst is preferably not less than 0.00005 mol % and more preferably not less than 0.0025 mol %, against a norbornene monomer.

In a manufacturing method of hydrogenated norbornene ring-opening polymer, open ring polymerization is preferably performed while stirring the inside of the reaction system. Rapid temperature rise due polymerization reaction heat can be suitably depressed by performing open ring polymerization while stirring the inside of the reaction system.

In a manufacturing method of hydrogenated norbornene ring-opening polymer, the open ring polymerization reaction is terminated after polymerization is advanced until the aimed molecular weight or polymerization conversion ratio is reached. Thereafter, an open ring polymerization catalyst is deactivated to prevent gelation of the polymerization reaction solution, and further thereafter the deactivated open ring polymerization catalyst is appropriately eliminated.

A method to deactivate an open ring polymerization catalyst includes, for example, a method in which a catalyst deactivator is added into the polymerization reaction solution.

As a catalyst deactivator, exemplified are compound provided with a hydroxyl group such as water, alcohols, carboxylic acids and phenols.

Alcohols include mono- or poly-alcohols of an aliphatic group, an alicyclic group and an aromatic group such as methanol, ethanol, 1-propanol, 2-propanol, 1-butanol, 2-butanol, 3-methyl-1-butanol, 2-ethyl-1-hexanol, 2-propene-1-ol, 1,2-ethanediol, 1,2-butanediol, 1,4-butanediol, 1,6-hexanediol, glycerin, pentaerythritol, 2-ethoxyethanol, 2,2-dichloro-1-ethanol, 2-bromo-1-ethanol and 2-phenyl-1-ethanol.

Carboxylic acids include mono-, di- or poly-carboxylic acids of an aliphatic group, an alicyclic group and an aromatic group such as formic acid, acetic acid, trichloroacetate, acrylic acid, oxalic acid, maleic caid, propane tricarboxylic acid, tartaric acid, citric acid, cyclopentane carboxylic acid, cyclohexane carboxylic acid, benzoic acid, phthalic acid and pyromerit acid.

Phenols include such as phenol, cresol and xylenol. These catalyst deactivators can be utilized alone or in combination of at least two types.

Water or water-soluble compounds (for example, a compound having a carbon number of not more than 4) among these compounds provided with a hydroxyl group are preferable because they are hardly remained in-a polymer due to the low solubility in a polymer solution. Among them, water and lower alcohols are preferred and it is specifically preferable to utilize water and alcohols simultaneously, because catalyst deactivation is more efficient compared to the case of utilizing water alone, as well as precipitation of catalyst residue becomes easier compared to the case of utilizing alcohol alone. The preferable using ratio of alcohol is 0.1-5 weight parts and specifically 0.2-2 weight parts, against 1 weight part of water.

The amount of a catalyst deactivator is set at any amount provided it is sufficient to deactivate a polymerization catalyst, and is in a range of 1-20 mol equivalents more preferably 2-10 mol equivalents against a stoichiometric amount required to deactivate a polymerization catalyst. For example, in the case of utilizing 1 mol of hexachlorotungstate and 1.5 mol of triethylaluminum as an open ring polymerization catalyst and methanol as a catalyst deactivator, since 6 mol of methanol against 1 mol of hexachlorotangstate and 3 mol against 1 mol of triethyl aluminum are required on stoichiometory, the stoichiometric amount of methanol necessary to deactivate open ring polymerization catalysts is 10.5 mol.

Further, in the case that a polymerization catalyst precipitates as a result of addition of a catalyst deactivator into the polymerization solution, such as activated clay, talc, diatomaceous earth, bentonite, synthetic zeorite, silica gel and almina powder may be added as coagulation nuclei or a coagulation promoter for the precipitating insoluble component. A range of the addition amount is arbitrary, however, is preferably approximately 0.1-10 times based on the weight of an open ring polymerization catalyst.

The addition of a catalyst deactivator is performed at any temperature of −50-100° C. and preferably 0-80° C., and under any pressure of 0-0.5 MPa and preferably an ordinary pressure—0.5 MPa, and the system is stirred under the condition for 0.5-10 hours and preferably 1-3 hours.

In a manufacturing method of hydrogenated norbornene ring-opening polymer, since a hydrogenation catalyst is liable to be poisoned due to generation of a hydrogen halogenide by addition of a polymerization catalyst deactivator, in the case of employing a transition metal halogenide as an open ring polymerization catalyst, it is preferable to add an acid scavenger in advance, after the polymerization proceeds to reach a molecular weight or polymerization conversion ratio corresponding to the purpose and before addition of a polymerization deactivator. Further, it is preferable to additionally add an acid scavenger after addition of a polymerization catalyst deactivator and before start of hydrogenation reaction.

Acid scavengers include metal hydroxides such as sodium hydroxide, potassium hydroxide, calcium hydroxide, magnesium hydroxide and aluminum hydroxide; metal oxides such as calcium oxide and magnesium oxide; metals such as aluminum, magnesium, zinc and iron; salts such as calcium carbonate, magnesium carbonate, sodium carbonate, potassium carbonate, sodium hydrogen carbonate, potassium hydrogen carbonate, hydrotalcite $(Mg_6Al_2(OH)_{16}CO_3 \cdot 4H_2O)$, sodium acetate and magnesium acetate; and epoxy compounds such as ethylene oxide, propylene oxide, butylenes oxide, butyl glycidyl ether, pheny glycidyl ether, cyclohexene oxide, 4-vinylcyclohexene oxide and styrene oxide.

Salts provided with an acid scavenging effect are salts exhibiting an alkaline property, and are preferably a salt of a strong acid and a weak alkali. Among these acid scavengers, epoxy compounds and salts, and combinations thereof are preferable as an acid scavenger utilized before addition of a polymerization catalyst deactivator, because of an excellent acid scavenging effect. Salts are preferred as an acid scavenger which is additionally added at the time of hydrogenation. They can effectively depress the corrosion of a reaction vessel under the temperature condition at the time of hydrogenation.

The amount of an acid scavenger is not less than 0.5 equivalents, preferably 1-100 equivalents and more preferably 2-10 equivalents, against the maximum amount of hydrogen halogenide which can be generated by hydrolysis of the utilized open ring polymerization catalyst, that is, a stoichiometric amount.

Addition of an acid scavenger is performed at an arbitrary temperature of −50-100° C. and preferably 0-80° C., and under an arbitrary pressure of 0-5 MPa and preferably an ordinary pressure—0.5 MPa. Successive addition and reaction of a polymerization catalyst deactivator are performed in a similar manner to the above description.

In the case of an acid scavenger being added, it is preferable that hydrogenation catalyst maintains the activity even in the state that an open ring polymerization catalyst is not eliminated before the hydrogenation process and the polymerization catalyst residue coexists.

In a manufacturing method of hydrogenated norbornene ring-opening polymer, hydrogenation is performed by adding a hydrogenation catalyst after the open ring polymerization reaction described above. As a hydrogenation catalyst, commonly utilized in hydrogenation of olefin compounds and aromatic compounds can be employed without specific limitation, and an inhomogeneous type catalyst and a homogeneous type catalyst can be generally employed.

Inhomogeneous system catalysts include, for example, nickel, palladium, platinum, or solid catalysts in which these metals are carried by a carrier such as carbon, silica, diatomaceous earth, alumina and titanium oxide; and catalysts containing combinations of such as nickel/silica, nickel/diatomaceous earth, nickel/alumina, palladium/carbon, palladium/silica, palladium/diatomaceous earth and palladium/alumina.

Homogeneous system catalysts include, for example, catalysts containing a combination of a transition metal compound with an alkylaluminum compound or an alkyl lithium, such as catalysts containing combinations of cobalt acetate/triethylaluminum, cobalt acetate/triisobutylaluminum, nickel acetate/triethylaluminum, nickel acetate/triisobutylaluminum, nickel acetylacetonate/triethylaluminum, nickel acetylacetonate/triisobutylaluminum, titanocene chloride/n-butyllithium and zirconocene chloride/n-butyllithium.

Hydrogenation catalysts can be utilized each alone or in combination of at least two types. The using amount of a hydrogenation catalyst is in a range of generally 0.01-100 weight parts, preferably 0.1-50 weight parts and more preferably 1-30 weight parts, against 100 weight parts of a norbornene open ring polymer. The hydrogenation reaction is performed under a hydrogen pressure of generally 0.1-30 MPa, preferably 1-20 MPa and more preferably 2-10 MPa, at a temperature range of 0-250° C., and for a reaction time of 1-20 hours.

In a manufacturing method of hydrogenated norbornene ring-opening polymer, hydrogenated norbornene ring-opening polymer is recovered by the following procedure. In the case of utilizing an inhomogeneous system catalyst as a hydrogenation catalyst, said hydride can be obtained by removing a hydrogenation catalyst by filtration after the hydrogenation reaction described above and successive drying by means of a coagulation drying method or a direct drying method employing such as a thin layer drier. Hydrogenated norbornene ring-opening polymer can be obtained generally as a powder form or a pellet form. On the other hand, in the case of utilizing a homogeneous system catalyst, the catalyst is deactivated by addition of alcohol and/or water and eliminated by filtration after having been made insoluble in a solvent.

Into hydrogenated norbornene ring-opening polymer, other polymers, various type of compounding agents, organic or inorganic filler may be added alone or in combination of at least two types.

As other polymers, elastomers such as polybutadiene, polyisobutylene, PBS, SIS, and SEBS; resin such as polystyrene, poly(meth)acrylate, polycarbonate, polyester, polyether, polyamide, polyimide and polysulfone can be blended. Further, these other polymers can be utilized each alone or in combination of at least two types.

Compounding agents are not specifically limited provided they are generally utilized in thermoplastic resin materials, and include, for example, an antioxidant, a UV absorbent, a light stabilizer, a near infrared absorbent, colorants such as dye and pigment, sliding agent, a plasticizer, an antistatic agent, a fluorescent whitening agent, a slow burning agent, an anti-blocking agent and a leveling agent.

Among them, is preferably added is an antioxidant which includes such as phenolic antioxidants, phosphite antioxidants and sulfur-containing antioxidants, more preferably phenolic antioxidants and most preferably an alkyl substituted phenolic antioxidant. It is possible to prevent coloring and strength decrease of an optical element due to such as oxidation deterioration at the time of molding, without decreasing low water absorbability.

Organic or inorganic filler includes, for example, minerals such as silica, diatomaceous earth, alumina, titanium oxide, magnesium oxide, pumice powder, pumice balloon, basic magnesium carbonate, dolomite, calcium oxide, calcium carbonate, calcium sulfate, potassium titanate, barium sulfate, calcium sulfite, talc, clay, mica and asbestos; fiber such as glass fiber, boron fiber, silicon carbide fiber, polyethylene fiber, polypropylene fiber, polyester fiber and polyamide fiber; glass flake, glass beads, calcium silicate, montmorillonite, bentonite, graphite, aluminum powder and molybdenum sulfide.

These filler can be added each alone or in combination of at least two types. The blending ratio of filler can be suitably determined according to each function and application purposes within a range of not disturbing the purpose of the present.

The method of blending of the above-described additive in hydrogenated norbornene ring-opening polymer includes such as a method in which hydrogenated norbornene ring-opening polymer is fused to be kneaded with a compounding agent by use of a mixer, a biaxial kneader, a roll, a Brabender and extruder, and a method in which the additive is dissolved and dispersed in a suitable solvent followed by being coagulated. In the case of employing a biaxial kneader, the product is generally extruded into a strand form after having been kneaded, then mostly utilized by being cut into a pellet form by a pelletizer.

Hydrogenated norbornene ring-opening polymer can be molded into an optical element to be utilized for various purposes. A molding method is not specifically limited and a fused molding method is preferably employed to obtain an optical element which is excellent in such as low birefringence, mechanical strength and dimensional precision. A fused molding method includes such as an injection molding method, an extrusion molding method, a press molding method and a blow molding method, however, an injection molding method is preferred with respect to such as low birefringence and dimensional stability.

The molding condition is suitably selected according to a using purpose and a molding method, however, in the case of an injection molding method, the resin temperature of hydrogenated norbornene ring-opening polymer is selected in a range of generally 150-400° C., preferably 200-350° C. and more preferably 230-330° C. The fluidity is deteriorated resulting in causing a loss or strain in an optical element when the resin temperature is extremely low, while silver streaks or molding defects such as yellowing of an optical element may possibly generate due to thermal decomposition when the resin temperature is extremely high. An optical element can be utilized in various forms such as a spherical form, a bar form, a plate form, a column form, a tubular form, a fiber form, or a film or sheet form.

An optical element of hydrogenated norbornene ring-opening polymer is preferably provided with a yellowing chromaticity difference $\Delta YI$ of not more than 0.5, when being molded into a plate form. Herein, a yellowing chromaticity difference ΔYI is defined as a difference with chromaticity index of air YI, by measuring a yellowing chromaticity index YI at an ordinary temperature employing air as a blank by use of a chromaticity meter. ΔYI becomes the smaller value, as the smaller is coloring.

Next, a manufacturing method of objective lens 15 will be explained.

First, two optical elements 41 and 42 are prepared by subjecting "resin containing a polymer provided with an alicyclic structure" explained above to a commonly known injection technique. After preparing each of optical elements 41 and 42, first layer 43 having a layer thickness of 50-15000 nm is deposited on surface 42a of optical element 42, then second layer 44 being deposited on first layer 43, and thereafter further deposited is third layer 45 on second layer 44.

Deposition of first, second and third layers 43, 44 and 45 are performed by a treatment employing a commonly known method such as an evaporation method, a CVD (Chemical Vapor Deposition) and a sol gel method. The deposition method of first, second and third layers 43, 44 and 45 is not specifically limited provided it can deposits first, second and third layers 43, 44 and 45 having high transparency. Further, to minimize light absorption values by first, second and third layers 43, 44 and 45, it is necessary to suitably control an introduction amount of an oxygen gas and a deposition rate so that the deposition of layers is not performed under a condition of oxygen shortage.

In the case of performing the deposition of first, second and third layers 43, 44 and 45 by a treatment employing an evaporation method as an example of the deposition treatment; when gases introduced into a vacuum chamber, the vacuum degree in said vacuum chamber is maintained at $0.5 \times 10^{-2}$-$3 \times 10^{-2}$ Pa while introducing such as an oxygen gas, an argon gas, a nitrogen tetrafluoride gas and a nitrogen gas into the vacuum chamber; on the other hand when gases are not introduced, the vacuum degree in the vacuum chamber is maintained at $0.7 \times 10^{-2}$ Pa.

In this state, utilizing an electron gun heating evaporation source, a low refractive index material or a intermediate refractive index material is fusing evaporated until the layer thickness reaches 10-15000 nm, resulting in formation of first layer 43 having a layer thickness of 10-15000 nm on surface 42a of optical element 42. In the case of forming first layer 43 containing a mixture of a low refractive index material and an intermediate refractive index material, an evaporation source of a low refractive index material and an evaporation source of an intermediate refractive index material may be separately arranged in a vacuum chamber to perform multi-source evaporation utilizing the both evaporation sources. Then, second layer 44 is formed on first layer 43, and third layer 45 is formed on second layer 44, in the same manner as above.

After deposition of first, second and third layers 43, 44 and 45 on surface 42a of optical element 42, said optical element 42 and optical element 41 are adhered at each edge portion, resulting in completion of the manufacturing of objective lens 15.

In the case of further depositing a layer similar to second and third layers 44 and 45 on third layer 45, a treatment according to the aforesaid deposition method of second and third layers 44 and 45 may be suitably performed, and also in the case of depositing a layer similar to first, second and third layers 43, 44 and 45 and a layer similar thereto on the surface other than surface 42a of optical element 42 (surface 41a and rear surface 41b of optical element 41 and rear surface 42b of optical element 42), a treatment according to the aforesaid deposition method of first, second and third layers 43, 44 and 45 may be suitably performed. Then after finishing the deposition treatment of each of optical elements 41 and 42, optical element 41 and optical element 42 are adhered each other at the edge portion.

In the above embodiment, light emitted from blue light source 4 or red light source 5 is converged at surface 42a of optical element 42 of objective lens 15 in optical pickup apparatus 1 to give the maximum strength, however, since the refractive index of each layer of antireflection film 46 is less than 1.7, namely, each layer-of antireflection film 46 is a low refractive index layer or an intermediate refractive index layer, generation of heat due to the irradiation of light from blue light source 4 is small. Thus, deformation of lens surface is suppressed even when the objective lens is used for transmitting light having a wavelength of 350 to 450 nm, the light having large energy.

In one embodiment of the present invention, each of first layer 43, second layer 44 and third layer 45 contains a low refractive index material, an intermediate refractive index material or a mixture thereof. Fluorides in which oxygen content is small are preferably used as materials for these layers, because, when an additive is mixed with the resin used for lens body 40, oxidation or deterioration of the additive is suppressed, resulting in improving the abrasion resistance of first layer 43, second layer 44 and third layer 45 while suppressing deformation of the surfaces of lens body 40 (specifically, the surface of surface 42a of optical element 42).

Herein, the present invention is not limited to the above embodiment, and various improvements and amendments of design may be possible provided they do not disturb the purpose of the present.

For example, in the above embodiment, described is an example in which applied are blue light of a specific wavelength within wavelengths of 350-450 nm and red light of a specific wavelength within wavelengths of 620-680 nm as light to transmit objective lens 15, however, near infrared light of wavelengths of 750-810 nm may be additionally applied, as well as light of a wavelength other than these wavelengths of 350-450 nm, 620-680 nm and 750-810 nm may be further applied. A low reflectance for all the light of the above three wavelength ranges are obtained by providing an antireflection film containing 7 layers on each surface of surface 41a, rear surface 41b of optical element 41; and rear surface 42b of optical element 42. Further, the layer constitution and resin composition of lens body 40 applied in objective lens 15 according to the present may be also applied to such as collimator 11, splitter 12, ¼ wavelength plate 13, cylindrical lens 16 and concave lens 17, which constitute optical pickup apparatus 1 as well as to optical elements utilized for applications other than optical pickup apparatus 1, and finally, preferably applicable to the all applications provided the application is an optical element to condense light of a specific wavelength within 350-450 nm.

Figure 3:
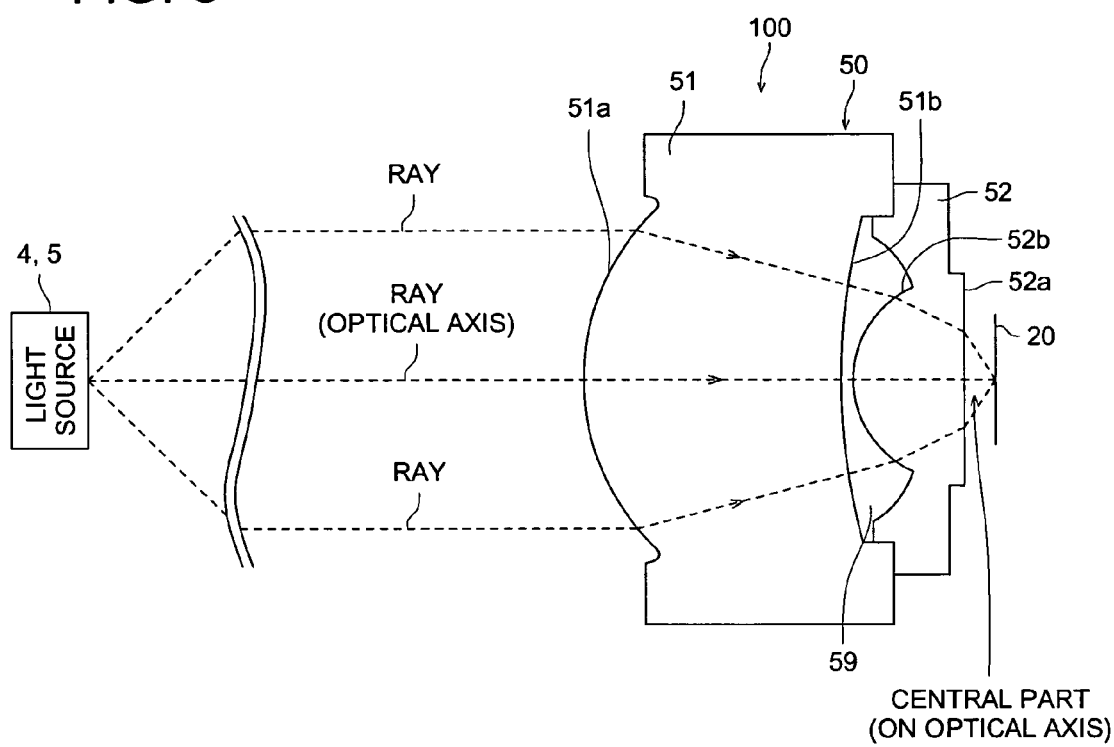
FIG. 3 is a schematic cross-section view of a modification of the objective lens illustrated in FIG. 2.

Further, objective lens 100 shown in FIG. 3 may be applied instead of objective lens 15. FIG. 3 is a cross-sectional view drawing to illustrate a brief constitution of objective lens 100.

Objective lens 15 shown in FIG. 2 is a compatible lens capable of converging the both of blue light and red light, while objective lens 100 shown in FIG. 3 is preferably utilized as an exclusive blue light lens capable of converging blue light. For this purpose, objective lens 100 shown in FIG. 3 is fixed at the position of objective lens 15 shown by a solid line in FIG. 1 at the time of being set on optical pickup apparatus 1 and designed so that light emitted from blue light source 4 is made into a condensed spot on the recording plane of BD or AOD 20.

With respect to the details of objective lens 100, objective lens 100 is provided with lens body 50 made of resin and lens body 50 is constituted of two optical elements 51 and 52. Lens body 50 is provided with a structure, in which each of optical elements 51 and 52 contains resin similar to that of aforesaid optical elements 41 and 42 and is adhered each other at the edge portion to form hollow portion 59, and which is a structure similar to the aforesaid lens body 40 with respect to these points.

Optical element 51 as the first optical element is arranged on the side of blue light source 4 or red light source 5 and optical element 52 as the second optical element is arranged on the side of BD or AOD 20, or DVD 30. In detail, surface 51a of optical element 51 is facing to blue light source 4 or red light source 5; surface 52a of optical element 52 is facing to BD or AOD 20, or DVD 30; and rear surface 51b of optical element 51 and rear surface 52b of optical element 52 are facing to each other.

Surface 51a and rear surface 51b of optical element 51 are constituted of aspheric surfaces, and rear surface 52b of optical element 52 is constituted of an aspheric surface. Surface 52a of optical element 52 is constituted of a flat plane.

The layer constitution of antireflection film 46 applied on surface 42a of optical element 42 is applied on surface 52a of optical element 52.

The antireflection film formed on surface 51a of optical element 51 contains two layers, namely, a high refractive index layer having a thickness of 20 to 60 nm directly provided on surface 51a and a low refractive index layer having a thickness of 70 to 110 nm directly provided on the above high refractive index layer. Alternatively, this antireflection film may contain three layers, namely, (i) a low refractive index layer having a thickness of 10 to 150 nm directly provided on surface 51a, (ii) a high refractive index layer having a thickness of 20 to 60 nm directly provided on the above low refractive index layer and (iii) a low refractive index layer having a thickness of 70 to 110 nm directly provided on the above high refractive index layer.

The antireflection film formed on rear surface 51b of optical element 51 contains two layers, namely, a high refractive index layer having a thickness of 15 to 55 nm directly provided on rear surface 51b and a low refractive index layer having a thickness of 60 to 100 nm directly provided on the above high refractive index layer. Alternatively, this antireflection film may contain three layers, namely, (i) a low refractive index layer having a thickness of 20 to 110 nm directly provided on rear surface 51b, (ii) a high refractive index layer having a thickness of 10 to 55 nm directly provided on the above low refractive index layer and (iii) a low refractive index layer having a thickness of 60 to 100 nm directly provided on the above high refractive index layer.

The antireflection film formed on rear surface 52b of optical element 52 contains two layers, namely, a high refractive index layer having a thickness of 20 to 60 nm directly provided on rear surface 52b and a low refractive index layer having a thickness of 70 to 110 nm directly provided on the above high refractive index layer. Alternatively, this antireflection film may contain three layers, namely, (i) a low refractive index layer having a thickness of 10 to 150 nm directly provided on rear surface 52b, (ii) a high refractive index layer having a thickness of 20 to 60 nm directly provided on the above low refractive index layer and (iii) a low refractive index layer having a thickness of 70 to 110 nm directly provided on the above high refractive index layer.

These antireflection films preferably contain alternating layers of silicon oxide as a low refractive index material and zirconium oxide as a high refractive index material.

Each of optical elements 51 and 52 is provided with a positive paraxial power, and particularly, optical element 52 is molded so as to satisfy the both conditions of following Formulae (51) and (52).

$$0.8 \leq NA \qquad \text{Formula (51)}$$

$$0.2 \leq \beta \leq 0.5 \qquad \text{Formula (52)}$$

In Formula (51), NA is a numerical aperture on the image side of optical element 52. In Formula (52), $\beta$ is a lens magnification of optical element 52.

In the case of the condition of above Formula (51) is satisfied, a converged spot having an excellent spot diameter can be formed on an optical information recording medium (specifically BD or AOD 20) by converging, specifically, a light flux emitted from blue light source 4 which emits monochromatic light of wavelength of near 405 nm.

With respect to the condition of above Formula (52), when a lens magnification $\beta$ is not less than 0.2, variation of wavefront aberration due to temperature change is decreased to widen the temperature range in which objective lens 100 is usable. On the other hand, when a lens magnification $\beta$ is not more than 0.5, since the distance on the light axis between surface 52a of optical element 52 and the surface of BD or AOD 20 does not become too short, it is possible to decrease the possibility of collision of objective lens with BD or AOD 20.

Herein, a manufacturing method of objective lens 100, namely, preparation of optical elements 51 and 52 and a layer deposition treatment on each of optical elements 51 and 52, is similar to the manufacturing method of above objective lens 15, except for design items such as a size and a shape of each of optical elements 51 and 52 are different from those of each of optical elements 41 and 42.

Figure 4:
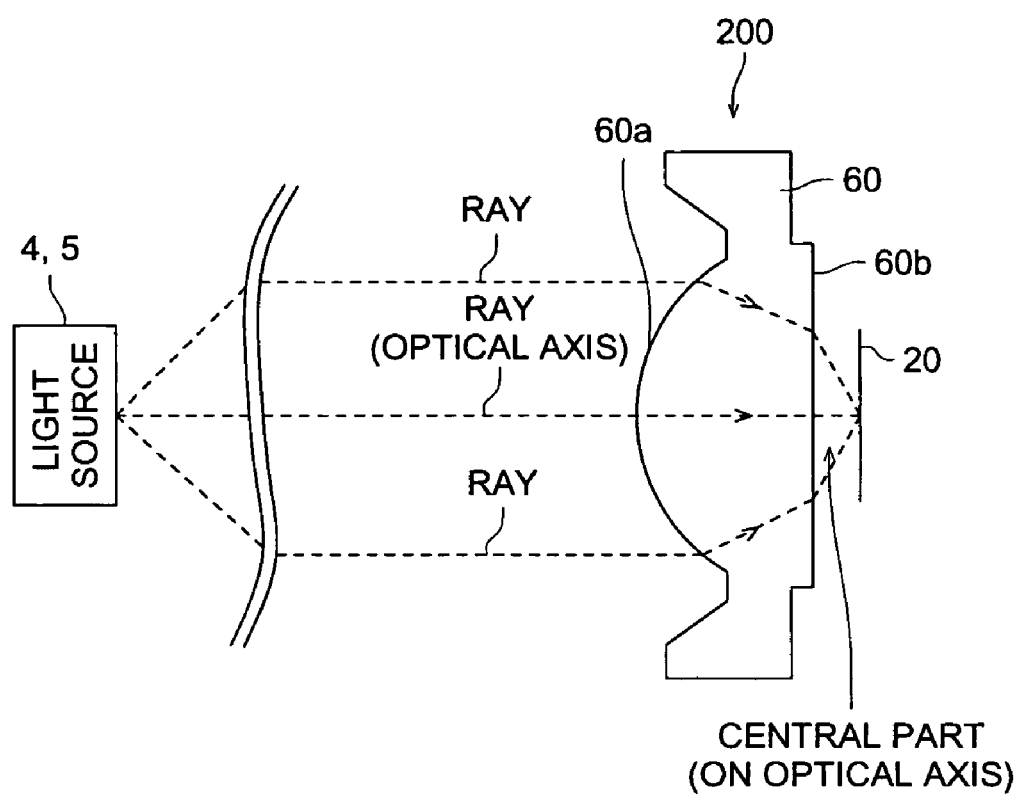
FIG. 4 is a schematic cross-section view of a modification of the objective lens illustrated in FIG. 2 or FIG. 3.

Further, objective lens 200 shown in FIG. 4 may be applied instead of above objective lens 15. FIG. 4 is a cross-sectional drawing to illustrate a brief constitution of objective lens 200.

Objective lens 15 shown in FIG. 2 is a compatible lens capable of converging the both of blue light and red light, while objective lens 200 shown in FIG. 4 is preferably utilized as an exclusive blue light lens capable of converging blue light, similar to objective lens 100 shown in FIG. 3. For this purpose, objective lens 200 shown in FIG. 4 is fixed at the position of objective lens 15 shown by a solid line in FIG. 1 at the time being set on optical pickup apparatus 1 and designed so that light emitted from blue light source 4 is made into a condensed spot on the recording plane of BD or AOD 20.

With respect to the details of objective lens 200, objective lens 200 is provided with lens body 60 which is constituted of resin similar to above optical elements 41 and 42. Lens body 60 is constituted of one molding. Objective lens 200 is provided with a structure, which is similar to each objective lens described above with respect that lens body 60 is constituted of resin similar to above-described optical elements 41 and 42, but different from above-described objective lenses 15 and 100 with respect that lens body 60 is constituted of one molding.

In lens body 60, surface 60a is facing to blue light source 4 or red light-source 5 and rear surface 60b is facing to BD or AOD 20 (optical information recording medium). The both of surface 60a and rear surface 60b of lens body 60 are aspheric surfaces. The same film construction as antireflection film 46, which is applied on surface 42a of optical element 42, is applied on rear surface 60b of lens body 60. The layer constitution provided on surface 51a of optical element 51 may also be applied on surface 60a of lens body 60.

Lens body 60 is formed so as to satisfy Formula (60).

$$0.8 \leq d/f \leq 1.8 \qquad \text{Formula (60)}$$

In above Formula (60), d is a thickness on the optical axis and f is a focal distance against light of a wavelength 405 nm.

The condition of above Formula (60) is one to obtain excellent image height characteristics. With respect to the condition of above Formula (60), when d/f is not less than 0.8, the central thickness of lens body does not become too short, the image height characteristics is not deteriorated, and the shift sensitivity of 60b surface does not become large, and when $d_2/f_2$ is not more than 1.8, the center thickness (the thickness on axis) of lens body 60 becomes not too large; image height characteristics does not deteriorates; the inclined center sensitivity becomes excellent; and a spherical aberration and a coma aberration are possible to be properly corrected.

Herein, a manufacturing method of objective lens 200, that is, such as preparation of lens body 60 and a layer deposition treatment on lens body 60, is similar to the manufacturing method of objective lens 15 described above, except that the design items such as the size and shape of lens body 60 are different from those of each of optical elements 41 and 42.

EXAMPLES

In this example, 9 samples aimed for an objective lens are prepared and the characteristics or properties of prepared samples 1-32 each were measured and evaluated.

(1) Preparation of Samples 1-32 and Lens Bodies A, B and C
(1-1) Preparation of Lens Body First, an arbitrary one type of resin was manufactured according to the following manufacturing method of (1-1-1) and (1-1-2) as "resin containing a polymer provided with an alicyclic structure" constituting a lens body. Wherein, "part(s)" and "%" in following (1-1-1) and (1-1-2) are based on weight unless otherwise mentioned.

(1-1-1) Manufacturing Method of Polymer

Unhydrated cyclohexane of 320 parts, 60 parts of styrene and 0.38 parts of dibutyl ether were charged in a stainless steal polymerization vessel equipped with a stirrer and a polymerization reaction was started by addition of 0.36 parts of n-butyl lithium solution (a 15% content hexane solution) while stirring. After the polymerization reaction was performed for 1 hour, 20 parts of a mixed monomer containing 8 pats of styrene and 12 parts of isoprene were added into the reaction solution, and 0.2 parts of isopropyl alcohol were added to terminate the reaction after further 1 hour of the polymerization reaction was performed. Mw of an obtained block copolymer was 102, 100 and Mw/Mn was 1.11.

Next, 400 parts of the polymerization reaction solution described above was transferred to a pressure resistant vessel equipped with a stirrer, and 10 parts of a nickel catalyst on silica-alumina carrier (manufactured by Nikki Chemicals Industry Co., Ltd; E22U, amount of nickel: 60%) as a hydrogenation catalyst were added and mixed. The inside of the reaction vessel was replaced by a hydrogen gas and hydrogen was further supplied while the solution was stirred, and the temperature was set as high as 160° C. to continue the reaction at 4.5 MPa for 8 hours, resulting in achievement of hydrogenation to aromatic rings. After finishing the hydrogenation reaction, the reaction solution was filtered to eliminate a hydrogenation catalyst and diluted with addition of 800 parts of cyclohexane, then said reaction solution was pored into 3,500 parts of isopropanol (having been filtered through a filter having a pore size of 1 μm in a clean room of a classification of 1000) to make a block copolymer be precipitated, which was separation recovered by filtration and dried under reduced pressure at 80° C. for 48 hours. The block copolymer thus obtained was a diblock copolymer containing a block containing a repeating unit arising from styrene (hereinafter, referred to as "St") and a block containing a repeating unit arising from styrene and isoprene (hereinafter, referred to as "St/Ip"), and the mol ratio of each block was as follows: St:(St/Ip)=69:31 (St:Ip=10:21). Mw of said block copolymer was 85,100, Mw/Mn was 1.17, the hydrogenation ratio of a main chain and an aromatic ring was 99.9%, and Tg was 126.5° C.

(1-1-2) Manufacturing of Resin 0.1 part of styrene-ethylene-butylene-styrene block copolymer (Septone 2002, manufactured by Kuraray Co., Ltd.); 0.1 part of tetrakis-[methylene-3-(3',5'-di-tertiary-butyl-4'-hydroxyphenyl)propionate]methane (Irganox 1010, manufactured by Ciba Speciality Chemicals Corp.) as an antioxidant; 0.1 part of 2-(2'-hydroxy-5'-mehtyl-phenyl)benzotriazole (Tinuvin P, manufactured by Ciba Speciality Chemicals Corp.) as a benzotriazole type UV absorber; and 0.1 part of a polycondensation product [HALS (A), Mn=3, 000] of dibutylamine, 1,3,5-triazine-N,N'-bis(2,2,6,6-tetramethyl-4-pyperidyl)-1,6-hexamethylenediamine and N-(2,2,6, 6-tetramethyl-4-pyperidyl)butylamine as a HALS, each was added against 100 parts of the block copolymer which were obtained by the above manufacturing of a polymer, and the mixture was kneaded by use of a biaxial kneader (manufactured by Toshiba Kikai Co., Ltd.; TEM-35B, screw diameter of 37 mm, L/D=32, screw rotational number of 150 rpm, resin temperature of 240° C., feed rate of 10 kg/hour), followed by being extruded in a strand form, which was then cooled by water and cut by a plletizer to be made into pellets. The pellets were dried by use of a hot air drier at 70° C. for 2 hours to eliminate moisture, and pellets after having been dried were injection molded resulting in preparation of an aimed lens body.

Incidentally, in the present examples, prepared and employed as lens bodies were three types of materials, composed of resinous materials of an external diameter of 30 mm, a thickness of 3 mm, and a refractive index of 1.53 for light of wavelength 405 nm. Specifically prepared were Lens body A employed for Samples 7-9 and 12-32 based on (1-1-3) below, while Lens body B employed for Samples 2-6 and 11 were prepared based on (1-1-4) below, and Lens body C employed for Samples 1 and 10 were prepared based on (1-1-5) below.

(1-1-3) Preparation of Lens body A

Based on the production method described in above Items (1-1-1) and (1-1-2), a material which corresponds to Lens body 40 in FIG. 2 was prepared and the resulting product was designated as Lens body A. Table 1 shows the lens characteristics of Lens body A. In regard to the lens characteristics of Lens body A, when the design standard wavelength of a light source was 405 nm, numerical aperture on the image side was represented by "NA", paraxial power of the optical element corresponding to optical element 41 in FIG. 2 is represented by "P1", paraxial power of the optical element corresponding to optical element 42 in FIG. 2 is represented by "P2", the thickness on the optical axis of the optical element corresponding to the optical element in FIG. 2 is represented by "$d_2$", and the focal length of the optical element (being the optical element corresponding to optical element 42 in FIG. 2) is represented by "$f_2$", NA is 0.85, P1 is 0, |P1/P2| is 0, $d_2/f_2$ is 1.31, and $f_2$ is 2.2 mm.

TABLE 1

| Surface No. | r (mm) | d (mm) | $N_{780}$ | $N_{650}$ | $N_{405}$ | $v_d$ | Remarks |
|---|---|---|---|---|---|---|---|
| S0 | | d0(variable) | | | | | Light Source |
| S1 | 73.397 | 0.700 | 1.53734 | 1.54090 | 1.56013 | 56.7 | Optical Element A |
| S2 | 15.448 | 0.050 | | | | | |
| S3 | 1.481 | 2.880 | 1.53734 | 1.54090 | 1.56013 | 56.7 | Optical Element B |
| S4 | −2.213 | d4(variable) | | | | | |
| S5 | ∞ | d5 | 1.57062 | 1.57756 | 1.61949 | 30.0 | Transparent Substrate |
| S6 | ∞ | (variable) | | | | | |

Aspherical Surface Coefficient

| | S1 | S2 | S3 | S4 |
|---|---|---|---|---|
| κ | 1.0000E+01 | −3.2040E+02 | −6.9456E−01 | −4.2199E+01 |
| $A_4$ | −2.6004E−02 | −2.3152E−02 | 8.6333E−03 | 8.7350E−02 |
| $A_6$ | 7.5368E−03 | 6.4221E−03 | 2.2473E−03 | −6.8060E−02 |
| $A_8$ | −1.7309E−03 | −3.6784E−04 | −1.0354E−03 | 1.8814E−02 |
| $A_{10}$ | 2.0472E−04 | 5.9437E−05 | 7.9520E−04 | 1.38884E−04 |
| $A_{12}$ | | | −1.3879E−04 | −8.1055E−04 |
| $A_{14}$ | | | −3.9714E−05 | |
| $A_{16}$ | | | 1.7745E−05 | |
| $A_{18}$ | | | 3.6874E−07 | |
| $A_{20}$ | | | −6.0458E−07 | |

Diffraction Surface Coefficient

| | S1 | S2 |
|---|---|---|
| $b_2$ | −1.0333E−03 | −1.3785E−03 |
| $b_4$ | 5.8830E−04 | −5.1124E−05 |
| $b_6$ | −5.3581E−05 | −1.8337E−05 |
| $b_8$ | −1.2776E−04 | −1.3817E−06 |
| $b_{10}$ | 2.0884E−05 | −3.4287E−06 |

| | High Density DVD | DVD | CD |
|---|---|---|---|
| d0 (variable) | ∞ | 28.951 | 18.099 |
| d4 (variable) | 0.602 | 0.505 | 0.266 |
| d5 (variable) | 0.100 | 0.600 | 1.200 |

In Table 1, in regard to the description in the table of the first column from the top, "Optical Element A" corresponds to optical element 42 of FIG. 2, while "S1" is the surface which corresponds to surface 41a of FIG. 2, "S2" is the surface which corresponds to rear surface 41b, and "S3" is the surface which corresponds rear surface 42b of FIG. 2, "S4" is a surface which corresponds to surface 42a of FIG. 2, "r" (in mm) is a paraxial curvature radius, "d" (in mm) is thickness on the optical axis, "N780" is a refractive index for light at a wavelength of 780 nm, "N650" is a refractive index for light of a wavelength of 650 nm, "N405 is a refractive index for light at a wavelength of 405 nm, and "$v_d$" is an Abbe number.

In Table 1, in regard to the description of the second and third column from the top, each of surfaces S1, S2, S3, and S4 is formed in an aspherical surface represented by Formula (101) below.

$$X = \frac{h^2/r}{1 + \sqrt{1 - (1+\kappa)h^2/r^2}} + \sum_{i=2}^{10} A_{2i}h^{2i} \quad \text{Formula (101)}$$

In above Formula (101), "X" is the coordinate axis in the optical axis direction (the light traveling direction is taken to be a positive value), "h" is the axis (height from the optical axis) in the vertical direction to the optical axis, "r" is the paraxial curvature radius, "κ" is a cone constant, and "A" is an aspheric coefficient.

In Table 1, in regard to the description in the table of the third horizontal row from the top, each of surfaces S1 and S2 has a diffraction structure represented by optical path difference function $\Omega_b$ (mm).

$$\Phi_b = n \sum_{j=1}^{5} b_{2j} h^{2j} \quad \text{Formula (102)}$$

In above Formula (102), "b" is a diffraction surface coefficient.

Preparation (1-1-4) of Lens body B

Based on the description of the above items (1-1-1) and (1-1-2), a lens body which corresponds to lens body 50 in FIG. 3 was prepared and designated as Lens body B. Table 2 shows the lens characteristics of Lens body B. In regard to the lens characteristics of Lens body B, when the design standard wavelength of a light source was 405 nm, the numerical aperture on the image side of the optical element corresponding to optical element 52 in FIG. 3 was represented by "NA", the focal length of the optical element (the optical element corresponding to optical element 52 in FIG. 3) was represented by "f", and the lens magnification of the optical element corresponding to optical element 52 in FIG. 3 was represented by "β", NA was 0.85, f was 1.76 mm, and β was 0.368.

TABLE 2

| Surface No. | r (mm) | d (mm) | N | $v_d$ | Remarks |
|---|---|---|---|---|---|
| 0 | | ∞ | | | Light Source |
| 1 | 2.0993 | 2.5000 | 1.52469 | 56.5 | Objective Lens |
| 2 | 7.4878 | 0.0500 | | | |
| 3 | 0.8495 | 1.1000 | 1.52469 | 56.5 | |
| 4 | ∞ | 0.2400 | | | |
| 5 | ∞ | 0.1000 | 1.61950 | 30.0 | Protective |
| 6 | ∞ | | | | Layer |

Aspherical Surface Coefficient

| | First Surface | Second Surface | Third Surface |
|---|---|---|---|
| K | −1.29619E−01 | 4.21216E+01 | −7.52178E−01 |
| $A_4$ | −3.32463E−03 | 7.05250E−03 | 1.33488E−01 |
| $A_6$ | −6.20097E−05 | −1.83155E−02 | 8.64895E−03 |
| $A_8$ | −5.15940E−04 | 9.12154E−03 | 2.15671E−01 |
| $A_{10}$ | −1.18058E−04 | −6.43084E−03 | −1.09974E−01 |
| $A_{12}$ | −6.64802E−05 | −7.44093E−03 | |
| $A_{14}$ | 1.21151E−04 | | |
| $A_{16}$ | −3.94410E−05 | | |

In Table 2, "Object Lens" corresponds to aforesaid Lens body B; "Surface No. 1" or "First Surface" corresponds to surface 51a in FIG. 3; "Surface No. 2" or "Second Surface" corresponds to rear surface 51b in FIG. 3; "Surface No. 3" or "Third Surface" corresponds to rear surface 52b in FIG. 3; "Surface No. 4" is the surface which corresponds to surface 52a in FIG. 3; "r" (in mm) is the paraxial curvature radius; "d" in mm) is the thickness on the optical axis; "N" is the refractive index for light at a wavelength of 405 nm; and "$v_d$" is an Abbe number.

In Table 2, in regard to the descriptions in the lower table, each of the First, Second, and Third Surfaces is formed into the aspherical surface shape represented by above Formula (101).

(1-1-4) Preparation of Lens Body C

While being based on the production method described in above Items (1-1-1) and (1-1-2), a material which corresponded to lens body 60 in FIG. 4 was prepared and the resulting product was designated as Lens body C. Table 3 shows the lens characteristics of Lens body C. In regard to the lens characteristics of Lens body C, when the design standard wavelength of a light source was 405 nm, numerical aperture on the image side was represented by "NA", focal length was represented by "f", and thickness on the optical axis was represented by "d", NA was 0.85, f was 1.765 mm, and d/f was 1.47.

TABLE 3

Example 9

$\lambda$ = 405 [nm]
f = 1.765 [mm]
NA = 0.85
Magnification = 0

| | r(mm) | d(mm) | n | vd |
|---|---|---|---|---|
| 1* | 1.17503 | 2.602 | 1.52523 | 59.5 |
| 2* | −1.04152 | 0.357 | | 30.0 |
| 3 | ∞ | 0.100 | 1.61950 | |
| 4 | ∞ | 0.000 | | |

Aspherical Surface Coefficient
First Surface

K = −0.682004
A4 = 0.180213E−01
A6 = 0.368416E−02
A8 = 0.140365E−02
A10 = 0.342876E−03
A12 = −0.311534E−04
A14 = 0.103341E−03
A16 = 0.141728E−04

Second Surface

K = −29.373780
A4 = 0.297543E+00
A6 = −0.423018E+00
A8 = 0.295535E+00
A10 = −0.829290E−01
A12 = −0.252257E−03

*aspherical surface

In Table 3, "1*" being "First Surface" corresponds to surface 60a in FIG. 4; "2*" being "Second Surface" is the surface which corresponds to rear surface 60b in FIG. 4; "r" (in mm) is the paraxial curvature radius; "d" (in mm) is thickness of the optical axis; "n" is the refractive index for light at a wavelength of 405 nm; and "$v_d$" is an Abbe number.

With regard to the description in Table 3, each of the first and second surfaces is formed into an aspherical surface shape represented by above Formula (101).

(1-2) Formation of Antirelection Film

Each of the antireflection films of the types and thicknesses, listed in Table 4 below, was formed on each of the lens bodies prepared as above.

TABLE 4

| | Shape of Lens Body | Type of S1 Surface Coating | H Material Film Thickness of S1 Surface Coating | Type of S2 Surface Coating | H Material Film Thickness of S2 Surface Coating |
|---|---|---|---|---|---|
| Sample 1 | Lens Body C (FIG. 4) | Coating 1 | 62 | Coating 5 | 0 |
| Sample 2 | Lens Body B (FIG. 3) | Coating 9 | 38 | Coating 4 | 34 |
| Sample 3 | Lens Body B (FIG. 3) | Coating 6 | 38 | Coating 7 | 37 |
| Sample 4 | Lens Body B (FIG. 3) | Coating 9 | 45 | Coating 7 | 37 |
| Sample 5 | Lens Body B (FIG. 3) | Coating 9 | 45 | Coating 7 | 193 |
| Sample 6 | Lens Body B (FIG. 3) | Coating 9 | 45 | Coating 7 | 193 |
| Sample 7 | Lens Body A (FIG. 2) (3 Wavelengths) | Coating 11 | 193 | Coating 11 | 193 |
| Sample 8 | Lens Body A (FIG. 2) (3 Wavelengths) | Coating 12 | 145 | Coating 12 | 145 |
| Sample 9 | Lens Body A (FIG. 2) (2 Wavelengths) | Coating 17 | 157 | Coating 17 | 157 |

TABLE 4-continued

| | Shape of Lens Body | Type of S1 Surface Coating | H Material Film Thickness of S1 Surface Coating | Type of S2 Surface Coating | H Material Film Thickness of S2 Surface Coating |
|---|---|---|---|---|---|
| Sample 10 | Lens Body C (FIG. 4) | Coating 13 | 30 | Coating 14 | 80 |
| Sample 11 | Lens Body B (FIG. 3) | Coating 9 | 45 | Coating 4 | 34 |
| Sample 12 | Lens Body A (FIG. 2) (2 Wavelengths) | Coating 16 | 0 | Coating 11 | 193 |
| Sample 13 | Lens Body A (FIG. 2) (2 Wavelengths) | Coating 20 | 53 | Coating 20 | 53 |
| Sample 14 | Lens Body A (FIG. 2) (2 Wavelengths) | Coating 21 | 138 | Coating 21 | 138 |
| Sample 15 | Lens Body A (FIG. 2) (2 Wavelengths) | Coating 22 | 150 | Coating 22 | 150 |
| Sample 16 | Lens Body A (FIG. 2) (3 Wavelengths) | Coating 23 | 128 | Coating 23 | 128 |
| Sample 17 | Lens Body A (FIG. 2) (3 Wavelengths) | Coating 24 | 129 | Coating 23 | 128 |

| | Type of S3 Surface Coating | H Material Film Thickness of S3 Surface Coating | Type of S4 Surface Coating | H Material Film Thickness of S4 Surface Coating | Transmittance | Deformation of Lens Surface | Overall Evaluation |
|---|---|---|---|---|---|---|---|
| Sample 1 | — | — | — | — | B | A | A |
| Sample 2 | Coating 6 | 38 | Coating 2-1 | 0 | B | A | A |
| Sample 3 | Coating 3 | 38 | Coating 8-1 | 0 | B | A | A |
| Sample 4 | Coating 6 | 38 | Coating 10-1 | 0 | B | A | A |
| Sample 5 | Coating 12 | 145 | Coating 18 | 0 | B | A | A |
| Sample 6 | Coating 12 | 145 | Coating 19 | 0 | B | C | C |
| Sample 7 | Coating 12 | 145 | Coating 2-1 | 0 | C | A | B |
| Sample 8 | Coating 12 | 145 | Coating 8-1 | 0 | C | A | B |
| Sample 9 | Coating 12 | 145 | Coating 2-1 | 0 | B | A | A |
| Sample 10 | — | — | — | — | A | D | D |
| Sample 11 | Coating 6 | 38 | Coating 15 | 25 | D | D | D |
| Sample 12 | Coating 12 | 145 | Coating 12 | 145 | D | D | D |
| Sample 13 | Coating 23 | 128 | Coating 2-1 | 0 | B | A | A |
| Sample 14 | Coating 23 | 128 | Coating 5 | 0 | B | A | A |
| Sample 15 | Coating 23 | 128 | Coating 5 | 0 | C | C | C |
| Sample 16 | Coating 23 | 128 | Coating 2-1 | 0 | B | A | A |
| Sample 17 | Coating 24 | 129 | Coating 2-1 | 0 | C | C | C |

| | Shape of Lens Body | Type of S1 Surface Coating | H Material Film Thickness of S1 Surface Coating | Type of S2 Surface Coating | H Material Film Thickness of S2 Surface Coating |
|---|---|---|---|---|---|
| Sample 18 | Lens Body C (FIG. 4) | Coating 3 | 38 | Coating 2-3 | 0 |
| Sample 19 | Lens Body B (FIG. 3) | Coating 9 | 45 | Coating 7 | 37 |
| Sample 20 | Lens Body B (FIG. 3) | Coating 6 | 38 | Coating 7 | 37 |
| Sample 21 | Lens Body B (FIG. 3) | Coating 6 | 38 | Coating 7 | 37 |
| Sample 22 | Lens Body B (FIG. 3) | Coating 6 | 38 | Coating 7 | 37 |
| Sample 23 | Lens Body B (FIG. 3) | Coating 6 | 38 | Coating 7 | 37 |
| Sample 24 | Lens Body B (FIG. 3) (3 Wavelengths) | Coating 6 | 38 | Coating 7 | 37 |
| Sample 25 | Lens Body C (FIG. 4) (2 Wavelengths) | Coating 23 | 128 | Coating 25-1 | 0 |
| Sample 26 | Lens Body A (FIG. 2) | Coating 23 | 128 | Coating 20 | 53 |
| Sample 27 | Lens Body A (FIG. 2) | Coating 23 | 128 | Coating 23 | 128 |
| Sample 28 | Lens Body A (Fig. 4) (2 Wavelengths) | Coating 12 | | Coating 26-1 | 0 |
| Sample 29 | Lens Body A (FIG. 2) (3 Wavelengths) | Coating 23 | 128 | Coating 26-1 | 0 |
| Sample 30 | Lens Body A (FIG. 2) (3 Wavelengths) | Coating 23 | 128 | Coating 23 | 128 |
| Sample 31 | Lens Body A (FIG. 4) (3 Wavelengths) | Coating 23 | 128 | Coating 26-1 | 0 |
| Sample 32 | Lens Body A (FIG. 4) (3 Wavelengths) | Coating 23 | 128 | Coating 12 | 133 |

| | Type of S3 Surface Coating | H Material Film Thickness of S3 Surface Coating | Type of S4 Surface Coating | H Material Film Thickness of S4 Surface Coating | Transmittance | Deformation of Lens Surface | Overall Evaluation |
|---|---|---|---|---|---|---|---|
| Sample 18 | — | | | | B | A | A |
| Sample 19 | Coating 26-1 | 0 | Coating 2-2 | 0 | B | A | A |
| Sample 20 | Coating 6 | 38 | Coating 2-3 | 0 | B | A | A |
| Sample 21 | Coating 6 | 38 | Coating 2-4 | 70 | D | D | D |
| Sample 22 | Coating 3 | 38 | Coating 8-2 | 0 | B | A | A |
| Sample 23 | Coating 12 | 145 | Coating 8-3 | 0 | B | A | A |
| Sample 24 | Coating 12 | 145 | Coating 10-2 | 0 | B | A | A |
| Sample 25 | | | | 0 | B | A | A |

TABLE 4-continued

| | | | | | | | |
|---|---|---|---|---|---|---|---|
| Sample 26 | Coating 23 | 128 | Coating 25-2 | 0 | B | A | A |
| Sample 27 | Coating 23 | 128 | Coating 25-3 | 120 | A | D | D |
| Sample 28 | | | | | A | A | A |
| Sample 29 | Coating 23 | 128 | Coating 26-1 | 0 | C | A | C |
| Sample 30 | Coating 23 | 128 | Coating 26-2 | 0 | B | A | A |
| Sample 31 | | | | | B | A | A |
| Sample 32 | | | | | B | D | D |

As used herein, the term "S1 Surface" in Table 4 refers to the lens surface nearest from the light source; "S2 Surface" refers to the lens surface second nearest to the light source; "S3 Surface" refers to the lens surface third nearest to the light source; and "S4 Surface" refers to the lens surface fourth nearest to the light source. When a lens consists of only one optical element, namely the material is Lens body C, "S2 Surface" is the surface which faces optical information recording medium, while when a lens consists of two optical elements, namely the material is composed of Lens bodies A and B, "S4 Surface" is the surface which faces the optical information recording medium.

Further, "H Material Film Thickness" refers to the thickness (nm) of the film formed employing high refractive index materials.

Still further, each of "Coating 1-Coating 24", as described herein, refers to each of the antireflection films having constitutions listed in Tables 5-8.

TABLE 5

| | Coating 1 | Coating 2-1 | Coating 3 | Coating 4 | Coating 5 | Coating 6 | Coating 7 |
|---|---|---|---|---|---|---|---|
| $\lambda_0$ (nm) | 460 | 440 ± 50 | 470 | 415 | 440 ± 20 | 470 | 415 |
| First Layer | | | | | | | |
| Deposition Material | Substance M3 | silicon oxide | hafnium oxide | silicon oxide | silicon oxide | silicon oxide | zirconium oxide |
| Layer Material | lanthanum aluminate (high) | silicon oxide (low) | hafnium oxide (high) | silicon oxide (low) | silicon oxide (low) | silicon oxide (low) | zirconium oxide (high) |
| Introduced Gas | oxygen gas | oxygen gas | oxygen gas | argon gas | oxygen gas | argon gas | oxygen gas |
| n1 | 1.95 | 1.46 | 1.89 | 1.46 | 1.46 | 1.46 | 1.94 |
| d1 (nm) | 62 | 74 ± 20 | 38 | 89 | 370 ± 20 | 95 | 37 |
| Second Layer | | | | | | | |
| Deposition Material | silicon oxide | — | silicon oxide | Substance M3 | — | Substance M3 | silicon oxide |
| Layer Material | silicon oxide (low) | — | silicon oxide (low) | lanthanum aluminate (high) | — | lanthanum aluminate (high) | silicon oxide (low) |
| Introduced Gas | argon gas | — | argon gas | oxygen gas | — | oxygen gas | argon gas |
| n2 | 1.46 | — | 1.46 | 1.95 | — | 1.95 | 1.46 |
| d2 (nm) | 81 | — | 90 | 34 | — | 38 | 78 |
| Third Layer | | | | | | | |
| Deposition Material | — | — | — | silicon oxide | — | silicon oxide | — |
| Layer Material | — | — | — | silicon oxide (low) | — | silicon oxide (low) | — |
| Introduced Gas | — | — | — | argon gas | — | argon gas | — |
| n3 | — | — | — | 1.46 | — | 1.46 | — |
| d3 (nm) | — | — | — | 81 | — | 97 | — |
| *1 | 62 | 0 | 38 | 34 | 0 | 38 | 37 |

*1: Thickness (nm) of High Refractive Material Layer

TABLE 6

| | Coating 8-1 | Coating 9 | Coating 10-1 | Coating 13 | Coating 14 | Coating 15 | Coating 18 | Coating 19 |
|---|---|---|---|---|---|---|---|---|
| $\lambda_0$ (nm) | 440 | 460 | 440 | 440 | 440 | 450 | 440 | 440 |
| First Layer | | | | | | | | |
| Deposition Material | aluminum oxide | silicon oxide | silicon oxide | Substance L5 | Substance M3 | cerium oxide | silicon oxide | silicon oxide |
| Layer Material | aluminum oxide (low) | silicon oxide (low) | silicon oxide (low) | *2 | lanthanum aluminate (high) | cerium oxide (high) | silicon oxide (low) | silicon oxide (low) |

TABLE 6-continued

| | Coating 8-1 | Coating 9 | Coating 10-1 | Coating 13 | Coating 14 | Coating 15 | Coating 18 | Coating 19 |
|---|---|---|---|---|---|---|---|---|
| Introduced Gas | oxygen gas | oxygen gas | oxygen gas | argon gas | oxygen gas | oxygen gas | oxygen gas | oxygen gas |
| n1 | 1.63 | 1.46 | 1.46 | 1.49 | 1.95 | 1.85 | 1.46 | 1.46 |
| d1 (nm) | 63 | 83 | 20 | 27 | 80 | 25 | 960 | 1000 |
| Second Layer | | | | | | | | |
| Deposition Material | silicon oxide | zirconium oxide | aluminum oxide | zirconium oxide | silicon oxide | Substance L2 | — | — |
| Layer Material | silicon oxide (low) | zirconium oxide (high) | aluminum oxide (medium) | zirconium oxide (high) | silicon oxide (low) | *2 | — | — |
| Introduced Gas | oxygen gas | oxygen gas | oxygen gas | oxygen gas | oxygen gas | oxygen gas | — | — |
| n2 | 1.46 | 1.95 | 1.63 | 1.94 | 1.46 | 1.49 | — | — |
| d2 (nm) | 72 | 45 | 68 | 30 | 60 | 94 | — | — |
| Third Layer | | | | | | | | |
| Deposition Material | — | silicon oxide | Substance L5 | Substance L5 | — | — | — | — |
| Layer Material | — | silicon oxide (low) | *2 | *2 | — | — | — | — |
| Introduced Gas | — | oxygen gas | none | oxygen gas | — | — | — | — |
| n3 | — | 1.46 | 1.49 | 1.49 | — | — | — | — |
| d3 (nm) | — | 91 | 76 | 90 | — | — | — | — |
| *1 | 0 | 45 | 0 | 30 | 80 | 25 | 0 | 0 |

*1: Thickness (nm) of High Refractive Material Layer
*2: mixture of aluminum oxide and silicon oxide

TABLE 7

| | Coating 11 | Coating 12 | Coating 16 | Coating 17 |
|---|---|---|---|---|
| First Layer | | | | |
| Deposition Material | aluminum oxide | silicon oxide | silicon oxide | silicon oxide |
| Layer Material | aluminum oxide (medium) | silicon oxide (low) | silicon oxide (low) | silicon oxide (low) |
| Introduced Gas | oxygen gas | none | oxygen gas | oxygen gas |
| n1 | 1.65 | 1.46 | 1.46 | 1.46 |
| d1 (nm) | 100 | 116 | 73 | 20 |
| Second Layer | | | | |
| Deposition Material | Substance M3 | zirconium oxide | aluminum oxide | hafnium oxide |
| Layer Material | lanthanum aluminate (high) | zirconium oxide (high) | aluminum oxide (medium) | hafnium oxide (high) |
| Introduced Gas | oxygen gas | oxygen gas | oxygen gas | oxygen gas |
| n2 | 1.76 | 1.93 | 1.65 | 1.89 |
| d2 (nm) | 40 | 15 | 31 | 19 |
| Third Layer | | | | |
| Deposition Material | silicon oxide | silicon oxide | silicon oxide | silicon oxide |
| Layer Material | silicon oxide (low) | silicon oxide (low) | silicon oxide (low) | silicon oxide (low) |
| Introduced Gas | oxygen gas | none | oxygen gas | oxygen gas |
| n3 | 1.46 | 1.46 | 1.46 | 1.46 |
| d3 (nm) | 31 | 46 | 24 | 31 |
| Fourth Layer | | | | |
| Deposition Material | OA600 | zirconium oxide | aluminum oxide | hafnium oxide |
| Layer Material | mixture of tantalum oxide and titanium oxide (high) | zirconium oxide (high) | aluminum oxide (medium) | hafnium oxide (high) |
| Introduced Gas | oxygen gas | oxygen gas | oxygen gas | oxygen gas |
| n4 | 1.76 | 1.93 | 1.65 | 1.89 |
| d4 (nm) | 77 | 61 | 98 | 138 |
| Fifth Layer | | | | |
| Deposition Material | silicon oxide | silicon oxide | silicon oxide | silicon oxide |
| Layer Material | silicon oxide (low) | silicon oxide (low) | silicon oxide (low) | silicon oxide (low) |
| Introduced Gas | oxygen gas | none | oxygen gas | oxygen gas |
| n5 | 1.46 | 1.46 | 1.46 | 1.46 |
| d5 (nm) | 15 | 15 | 85 | 86 |
| Sixth Layer | | | | |
| Deposition Material | Substance M3 | zirconium oxide | — | — |
| Layer Material | lanthanum aluminate (high) | zirconium oxide (high) | — | — |
| Introduced Gas | oxygen gas | oxygen gas | — | — |
| n6 | 1.76 | 1.93 | — | — |
| d6 (nm) | 76 | 57 | — | — |
| Seventh Layer | | | | |
| Deposition Material | silicon oxide | silicon oxide | — | — |
| Layer Material | silicon oxide (low) | silicon oxide (low) | — | — |

TABLE 7-continued

|  | Coating 11 | Coating 12 | Coating 16 | Coating 17 |
|---|---|---|---|---|
| Introduced Gas | oxygen gas | none | — | — |
| n7 | 1.46 | 1.46 | — | — |
| d7 (nm) | 105 | 101 | — | — |
| *1 | 193 | 133 | 0 | 157 |

*1: Thickness of High Refractive Material Layer (nm)

TABLE 8

|  | Coating 20 | Coating 21 | Coating 22 | Coating 23 | Coating 24 |
|---|---|---|---|---|---|
| First Layer | | | | | |
| Deposition Material Layer Material | Substance L5 mixture of aluminum oxide and silicon oxide | silicon oxide silicon oxide (low) | silicon oxide silicon oxide (low) | silicon oxide silicon oxide (low) | silicon oxide silicon oxide (low) |
| Introduced Gas | oxygen gas | oxygen gas | oxygen gas | oxygen gas | oxygen gas |
| n1 | 1.49 | 1.46 | 1.46 | 1.46 | 1.46 |
| d1 (nm) | 22 | 70 | 20 | 137 | 137 |
| Second Layer | | | | | |
| Deposition Material Layer Material | Substance M3 lanthanum aluminate (high) | zirconium oxide zirconium oxide (high) | cerium oxide cerium oxide (high) | hafnium oxide hafnium oxide (high) | cerium oxide cerium oxide (high) |
| Introduced Gas | oxygen gas | oxygen gas | oxygen gas | oxygen gas | oxygen gas |
| n2 | 1.76 | 1.93 | 1.85 | 1.89 | 1.85 |
| d2 (nm) | 28 | 15 | 19 | 18 | 19 |
| Third Layer | | | | | |
| Deposition Material Layer Material | Substance L5 mixture of aluminum oxide and silicon oxide | silicon oxide silicon oxide (low) | silicon oxide silicon oxide (low) | silicon oxide silicon oxide (low) | silicon oxide silicon oxide (low) |
| Introduced Gas | oxygen gas | oxygen gas | oxygen gas | oxygen gas | oxygen gas |
| n3 | 1.49 | 1.46 | 1.46 | 1.46 | 1.46 |
| d3 (nm) | 48 | 29 | 31 | 38 | 38 |

TABLE 8-continued

|  | Coating 20 | Coating 21 | Coating 22 | Coating 23 | Coating 24 |
|---|---|---|---|---|---|
| Fourth Layer | | | | | |
| Deposition Material Layer Material | OA600 mixture of tantalum oxide and titanium oxide | zirconium oxide zirconium oxide (high) | cerium oxide cerium oxide (high) | hafnium oxide hafnium oxide (high) | hafnium oxide hafnium oxide (high) |
| Introduced Gas | oxygen gas | oxygen gas | oxygen gas | oxygen gas | oxygen gas |
| n4 | 1.76 | 1.93 | 1.85 | 1.89 | 1.89 |
| d4 (nm) | 25 | 123 | 131 | 56 | 56 |
| Fifth Layer | | | | | |
| Deposition Material Layer Material | Substance L5 mixture of aluminum oxide and silicon oxide | silicon oxide silicon oxide (low) | silicon oxide silicon oxide (low) | silicon oxide silicon oxide (low) | silicon oxide silicon oxide (low) |
| Introduced Gas | oxygen gas | oxygen gas | oxygen gas | oxygen gas | oxygen gas |
| n5 | 1.49 | 1.46 | 1.46 | 1.46 | 1.46 |
| d5 (nm) | 117 | 82 | 86 | 14 | 14 |
| Sixth Layer | | | | | |
| Deposition Material Layer Material | — | — | — | hafnium oxide hafnium oxide (high) | hafnium oxide hafnium oxide (high) |
| Introduced Gas | — | — | — | oxygen gas | oxygen gas |
| n6 | — | — | — | 1.89 | 1.89 |
| d6 (nm) | — | — | — | 54 | 54 |
| Seventh Layer | | | | | |
| Deposition Material Layer Material | — | — | — | silicon oxide silicon oxide (low) | silicon oxide silicon oxide (low) |
| Introduced Gas | — | — | — | oxygen gas | oxygen gas |
| n7 | — | — | — | 1.46 | 1.46 |
| d7 (nm) | — | — | — | 99 | 99 |
| *1 | 53 | 138 | 150 | 128 | 129 |

*1: Thickness of High Refractive Layer (nm)

TABLE 9

|  | Coating 2-2 | Coating 2-3 | Coating 2-4 | Coating 8-2 | Coating 8-3 |
|---|---|---|---|---|---|
| $\lambda_0$ nm | 440 ± 50 | 440 ± 50 | 440 ± 50 | 440 | 440 |
| First Layer | | | | | |
| Deposition Material Layer Material | Substance L5 mixture of aluminum oxide and silicon oxide (low) | magnesium fluoride magnesium fluoride (low) | zirconum oxide zirconium oxide (high) | aluminum oxide aluminum oxide (intermediate) | aluminum oxide aluminum oxide (intermediate) |

TABLE 9-continued

Figure 5:
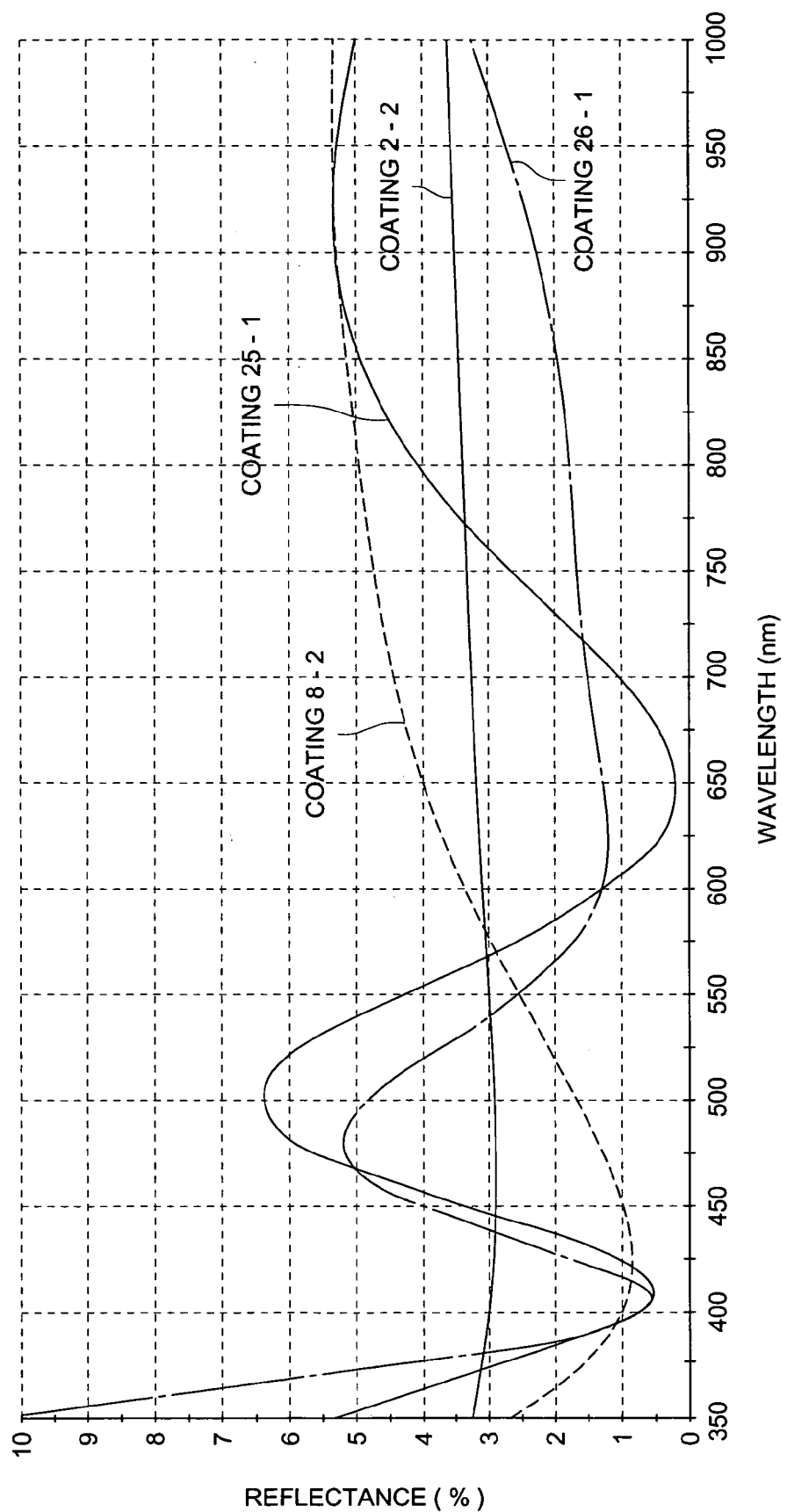
FIG. 5 shows relationships between wavelength and reflectance (spectroscopic reflectance) of the objective lenses.

| Introduced Gas | oxygen gas | carbon fluoride | oxygen gas | oxygen gas | oxygen gas |
|---|---|---|---|---|---|
| n1 | 1.49 | 1.38 | 1.94 | 1.63 | 1.63 |
| d1 (nm) | 73 ± 20 | 70 ± 20 | 70 | 70 | 50 |
| | | | Second Layer | | |
| Deposition Material Layer Material | | | | Substance L5 mixture of aluminum oxide and silicon oxide (low) | magnesium fluoride magnesium fluoride (low) |
| Introduced Gas | | | | oxygen gas | CF$_4$ |
| n2 | | | | 1.49 | 1.38 |
| d2 (nm) | | | | 70 | 78 |
| *1 | 0 | 0 | 70 | 0 | 0 |
| Spectroscopic Reflectance | FIG. 5 | | | FIG. 5 | |

| | Coating 10-2 | Coating 25-1 | Coating 25-2 | Coating 25-3 |
|---|---|---|---|---|
| λ$_0$ (nm) | 440 | | | |
| | First Layer | | | |
| Deposition Material Layer Material | Substance L5 mixture of aluminum oxide and silicon oxide (low) | aluminum oxide aluminum oxide (intermediate) | aluminum oxide aluminum oxide (intermediate) | aluminum oxide aluminum oxide (intermediate) |
| Introduced Gas | oxygen gas | oxygen gas | oxygen gas | oxygen gas |
| n1 | 1.49 | 1.63 | 1.63 | 1.63 |
| d1 (nm) | 25 | 106 | 110 | 110 |
| | Second Layer | | | |
| Deposition Material Layer Material | aluminum oxide aluminum oxide (intermediate) | silicon oxide silicon oxide (low) | magnesium fluoride magnesium fluoride (low) | silicon oxide silicon oxide (low) |
| Introduced Gas | oxygen gas | oxygen gas | CF$_4$ | oxygen gas |
| n2 | 1.63 | 1.46 | 1.38 | 1.46 |
| d2 (nm) | 70 | 53 | 60 | 53 |
| | Third Layer | | | |
| Deposition Material Layer Material | magnesium fluoride magnesium fluoride (low) | aluminum oxide aluminum oxide (intermediate) | aluminum oxide aluminum oxide (intermediate) | titanium oxide titanium oxide (high) |
| Introduced Gas | CF$_4$ | oxygen gas | oxygen gas | oxygen gas |
| n3 | 1.38 | 1.63 | 1.63 | 2.01 |
| d3 (nm) | 70 | 160 | 170 | 120 |
| | Fourth Layer | | | |
| Deposition Material Layer Material | | silicon oxide silicon oxide (low) | Substance L5 mixture of aluminum oxide and silicon oxide (low) | silicon oxide silicon oxide (low) |

TABLE 9-continued

| | | | |
|---|---|---|---|
| Introduced Gas | oxygen gas | oxygen gas | oxygen gas |
| n4 | 1.46 | 1.49 | 1.46 |
| d4 (nm) | 92 | 100 | 90 |
| *1 | 0 | 0 | 120 |
| Spectroscopic Reflectance | | FIG. 5 | |

*1: Thickness of High Refractive Layer (nm)

TABLE 10-1

| | Coating 25-4 | Coating 26-1 | Coating 26-2 |
|---|---|---|---|
| First Layer | | | |
| Deposition Material | silicon oxide | silicon oxide | magnesium fluoride |
| Layer Material | silicon oxide (low) | silicon oxide (low) | magnesium fluoride (low) |
| Introduced Gas | oxygen gas | oxygen gas | CF$_4$ |
| n1 | 1.46 | 1.46 | 1.38 |
| d1 (nm) | 20 | 104 | 115 |
| Second Layer | | | |
| Deposition Material | aluminum oxide | aluminum oxide | aluminum oxide |
| Layer Material | aluminum oxide (intermediate) | aluminum oxide (intermediate) | aluminum oxide (intermediate) |
| Introduced Gas | oxygen gas | oxygen gas | oxygen gas |
| n2 | 1.63 | 1.63 | 1.63 |
| d2 (nm) | 106 | 81 | 82 |
| Third Layer | | | |
| Deposition Material | silicon oxide | silicon oxide | silicon oxide |
| Layer Material | silicon oxide (low) | silicon oxide (low) | silicon oxide (low) |
| Introduced Gas | oxygen gas | oxygen gas | oxygen gas |
| n3 | 1.46 | 1.46 | 1.46 |
| d3 (nm) | 53 | 7.5 | 4 |
| Fourth Layer | | | |
| Deposition Material | aluminum oxide | aluminum oxide | aluminum oxide |
| Layer Material | aluminum oxide (intermediate) | aluminum oxide (intermediate) | aluminum oxide (intermediate) |
| Introduced Gas | oxygen gas | oxygen gas | oxygen gas |
| n4 | 1.63 | 1.63 | 1.63 |
| d4 (nm) | 160 | 61 | 64 |
| Fifth Layer | | | |
| Deposition Material | silicon oxide | silicon oxide | Substance L5 |
| Layer Material | silicon oxide (low) | silicon oxide (low) | mixture of aluminum oxide and silicon oxide (low) |
| Introduced Gas | oxygen gas | oxygen gas | oxygen gas |
| n5 | 1.46 | 1.46 | 1.49 |
| d5 (nm) | 92 | 84 | 81 |
| Sixth Layer | | | |
| Deposition Material | | aluminum oxide | aluminum oxide |
| Layer Material | | aluminum oxide (intermediate) | aluminum oxide (intermediate) |
| Introduced Gas | | oxygen gas | oxygen gas |
| n6 | | 1.63 | 1.63 |
| d6 (nm) | | 22 | 31 |
| Seventh Layer | | | |
| Deposition Material | | silicon oxide | magnesium fluoride |
| Layer Material | | silicon oxide (low) | magnesium fluoride (low) |
| Introduced Gas | | oxygen gas | CF$_4$ |
| n7 | | 1.46 | 1.38 |
| d7 (nm) | | 96 | 76 |
| *1 | 0 | 0 | 0 |
| Spectroscopic Reflectance | | FIG. 5 | |

*1: Thickness of High Refractive Layer (nm)

"First Layer", as described in Tables 5-7, refers to the layer formed on the surface of a lens body; "Second Layer", as described therein, refers to the layer formed on the surface of "First Layer"; "Third Layer", as described therein, refers to the layer formed on the surface of "Second Layer". Further, "Fourth Layer", as described in Table 7, refers to the layer formed on the surface of "Third Layer; "Fifth Layer", as described therein, refers to the layer formed on the surface of "Fourth Layer"; "Sixth Layer", as described therein, refer to the layer formed on the surface of "Fifth Layer", and "Seventh Layer", as described therein, refers to the layer formed on the surface of "Sixth Layer".

Further, "Deposition Material", as described herein, refers to the material used as a deposition source; "Layer Material", as described herein, refers to the material which constitutes a layer; "Introduced Gas", as described herein, refers to the gas which is introduced into a vacuum vessel during the deposition process, and each of "Refractive Indexes n1-n7" refers to each of the refractive indexes for light at a wavelength of 405 nm, while each of "Layer Thickness d1-d3" refers to each of the layer thicknesses. Further, in the above tables, "Substance L5", "Substance M3", and "Substance L2" are the trade names of deposition materials, produced by Merck. OA-600 is the trade name of a vacuum evaporation material produced by CANONOPTORON Inc.

The thickness of each of the layers in the coating refers to the thickness in the central portion of the layer surface (being the surface of the formed layer, which is the same as the following) of each of Samples 1-32. In more detail, the above thickness is determined by observing the section of the antireflection film formed on each of Samples 1-32, employing an electron microscope.

Further, the refractive index of each layer was determined as follows. Pseudo Samples 1-32 were prepared in the same manner as Samples 1-32, except that the lens body was replaced with glass (except for the type of the lens body, the film structure and the film forming method were the same as above (1-2)), and each of the refractive indexes was determined employing an ellipsometer.

(2) Determination and Evaluation of Characteristics and Properties of Each Sample The following characteristics and properties of each of samples 1-32, prepared as above, were determined and evaluated.

(2-1) Observation of Deformation of Lens Surface

At temperature of 85° C. and relative humidity of 5 percent, after making a wavelength 405 nm light parallel employing a collimator lens, light-was converged employing each of Samples 1-32. Light intensity, incident to S1 surface, was controlled to be 25 mW/mm$^2$. When light irradiation time reached 100 hours, 150 hours, and 200 hours, the external appearance of the aforesaid film surface of each of Samples 1-32 was observed and the variation amount of the surface shape of the aforesaid film surface of each of Samples 1-32 was also determined employing a surface roughness meter.

Observation and determination results of each of Samples 1-32 are listed in the column of "Deformation of Lens Surface" in above Tables 4. In Table 4, A and D were determined based on the criteria below.

A: no variation was noted after 200 hours

D: after 100 hours, film peeling and cracking were noted and depressions in the surface of at least 0.2 μm were formed None of Samples 1-32 was ranked in the criteria between A and D, namely B and C below.

B: no variation was noted after 150 hours, but was noted after 200 hours

C: no variation was noted after 100 hours, but was noted after 150 hours (2-2) Evaluation of Transmittance Characteristics The transmittance of each of Samples 1-32 was determined employing a Hitachi Spectral Photometer U-4000. Wavelengths of light used for the determination of transmittance were as follows: (i) for a lens to be used for 2 wavelengths measurement, having the structure shown in FIG. 2, wavelengths of 405 nm and 650 nm were used; (ii) for a lens to be used for 3 wavelengths measurement, having the structure shown in FIG. 2, wavelengths of 405 nm, 650 nm, and 780 nm were used, in which near infrared light was also included; and (iii) for a lens having the structure shown in FIG. 3 or FIG. 4, a wavelength of 405 nm (blue light) was used.

Measurement results of each of Samples 1-32 are listed in the "Transmittance" column of above Table 4. In Table 4, A, B, C, and D were determined based on the criteria below.

A: transmittance was at least 94 percent for all measured wavelengths

B: transmittance was 92-94 percent for all measured wavelengths

C: transmittance was 90-92 percent for all measured wavelengths

D: transmittance was less than 90 percent for all measured wavelengths (2-3) Overall Evaluation Based on the above results (2-1) and (2-2), each of Samples 1-32 was subjected to overall evaluation while paying attention to weather each lens had optimal characteristics as an objective lens or not (whether commercially viable or not). Evaluation results of each of Samples 1-32 are listed in the "Overall Evaluation" column in above Table 4. A, B, and C in Table 4 were determined based on the criteria below.

A: the level was far above commercial viability (above item (2-1) was A, while above item (2-2) was either A or B)

B: the level was above commercial viability (above item (2-1) was A, while above item (2-2) was C, or above item (2-1) was B, while above item (2-2) was either A or B)

C: the level reached commercial viability (above items (2-1) and (2-2) were in combination of B and C, or both were C)

D: the level was below commercial viability (at least one of above items (2-1 and 2-2) was D)

As shown in above Table 4, Samples 1-9, 13-20, 22-26 and 28-32 in which the refractive index of each of the antireflection films provided on the surface facing optical information recording medium (S2 surface or S4 surface) was less than 1.7, exhibited desired results. On the other hand, Samples 10-12, 20 and 27 in which a layer of which the refractive index was 1.7 or more was contained, did not exhibit desired results. As noted above, it was found that the refractive index of each of the antireflection films provided on the surface facing optical information recording medium was less than 1.7 was useful. When the above antireflection film was provided on S1 surface or on S3 surface, the results of the evaluation of deformation of lens surface were the same, namely, when an antireflection film containing no layer exhibiting a refractive index of 1.7 or more was provided on S1 surface or S3 surface, deformation of lens surface was found to be small.

Further, the evaluation results of Samples 5 and 6 showed the following. When an antireflection film having a refractive index of less than 1.7 was provided onto the surface facing the optical information recording medium and when the thickness of the above antireflection film was 960 nm, the overall evaluation was A, however, when the thickness thereof was 1,000 nm, the overall evaluation was C. Based on these results, it was found that when the thickness of the antireflection film was excessively high, the performance of the resulting objective lens was degraded.

Still further, evaluation results of Samples 9, 13-17, 26, 27, 29 and 30, namely, lenses which transmitted two or three wavelengths of light (refer to FIG. 2,) were as follows: (i) When an antireflection film employing cerium oxide as a high refractive index material was provided on any of Surfaces S1-S3, evaluation for the transmittance as well as the deformation of lens surface was degraded to result in the overall evaluation of C; (ii) When a layer of titanium oxide which is a high refractive index material was provided on S4 surface in sample 27, the evaluation for deformation of lens surface was D; (iii) On the other hand, when the antireflection film employing zirconium oxide, hafnium oxide, a mixture of silicon oxide and aluminum oxide or a mixture of tantalum oxide and titanium oxide was provided, the overall evaluation was A; and (iv) When samples 28, 31 and 32 were compared, in which light of two wavelengths or three wavelengths were transmitted (refer to FIG. 4), sample 28 and 32 obtained overall evaluation of A, in which an antireflection film of refractive index of less than 1.7 was provided on S2 surface, while the overall evaluation of sample 32 was D, in which a high refractive index layer was provided on S2 surface.

Further, the antireflection film of which the refractive index was less than 1.7 showed an effect of suppressing deformation of a lens surface when the film was provided on a plastic lens of not only of an objective lens but also of a collimator lens for an optical pickup apparatus, while the lens was irradiated with light having a wavelength of 405 nm.

In Samples 1-32, employed as "resins incorporating polymers having an alicyclic structure" constituting lens body materials were optional resins according to the production methods of above (1-1-1) and (1-1-2). However, in addition to these, one optional type resin incorporating hydrogenated norbornene ring-opening polymer, described in the above embodiments was prepared, and samples which were the same as Samples 1-17 were prepared while employing the resulting resins as a lens body material, and characteristics and properties of the resulting-samples were determined and evaluated in the same manner as above (2-1)-(2-3). The resulting measurement and evaluation results were similar to those for Samples 1-17, even though not specifically described herein.

What is claimed is:

1. An objective lens for converging a monochromatic light flux having a specific wavelength in a range of 350 to 450 nm on an optical information recording medium while the objective lens is placed facing the optical information recording medium, the objective lens comprising:
   a lens body containing a polymer resin having an alicyclic structure; and
   an antireflection film including one or more layers provided on a surface of the lens body facing to the optical information recording medium,
   wherein a refractive index of the antireflection film for a light flux having a wavelength of 405 nm is less than 1.7, and
   wherein the antireflection film comprises:
      a first layer containing aluminum oxide, the first layer satisfying:
         $45 \text{ nm} \leq d_1 \leq 90 \text{ nm}$, where $d_1$ represents a thickness of the first layer, and
      a second layer containing silicon oxide, magnesium fluoride, a mixture of silicon oxide and aluminum oxide, or a mixture of silicon oxide and magnesium fluoride, the second layer satisfying:
         $60 \text{ nm} \leq d_2 \leq 90 \text{ nm}$, where $d_2$ represents a thickness of the second layer.

2. The objective lens of claim 1, wherein a layer containing the low refractive index material is provided between the lens body and the first layer.

3. The objective lens of claim 1, wherein the polymer resin forming the lens body contains hydrogenated norbornene ring-opening polymer.

4. An optical pickup apparatus comprising the objective lens of claim 1 and a light source emitting the monochromatic light having the specific wavelength in the range of 350 to 450 nm.

5. An objective lens for converging a monochromatic light flux having a specific wavelength in a range of 350 to 450 nm on an optical information recording medium while the objective lens in placed facing the optical information recording medium, the objective lens comprising:
   a lens body containing a polymer resin having an alicyclic structure; and
   an antireflection film including one or more layers provided on a surface of the lens body facing to the optical information recording medium,
   wherein a refractive index of the antireflection film for a light flux having a wavelength of 405 nm is less than 1.7,
   wherein the antireflection film comprises:
      a first layer containing an intermediate refractive index material, a thickness of the first layer $d_1$ satisfying:
         $80 \text{ nm} \leq d_1 < 120 \text{ nm}$,
      a second layer containing a low refractive index material, a thickness of the second layer $d_2$ satisfying:
         $35 \text{ nm} \leq d_2 \leq 65 \text{ nm}$,
      a third layer containing the intermediate refractive index material, a thickness of the third layer $d_3$ satisfying:
         $140 \text{ nm} \leq d_3 \leq 180 \text{ nm}$
      a fourth layer made of the low refractive index material, a thickness of the fourth layer $d_4$ satisfying:
         $70 \text{ nm} \leq d_4 \leq 105 \text{ nm}$,
      wherein the low refractive index material contains silicon oxide, magnesium fluoride, a mixture of silicon oxide and aluminum oxide, or a mixture of silicon oxide and magnesium fluoride, and
      wherein the intermediate refractive index material contains aluminum oxide or a material containing aluminum oxide as a main component.

6. The objective lens of claim 5, wherein a layer containing the low refractive index material is provided between the lens body and the first layer.

7. The objective lens of claim 5, wherein the polymer resin forming the lens body contains hydrogenated norbornene ring-opening polymer.

8. An optical pickup apparatus comprising the objective lens of claim 5 and a light source emitting the monochromatic light having the specific wavelength in the range of 350 to 450 nm.

9. An objective lens for converging a monochromatic light flux having a specific wavelength in a range of 350 to 450 nm on an optical information recording medium while the objective lens in placed facing the optical information recording medium, the objective lens comprising:
   a lens body containing a polymer resin having an alicyclic structure; and
   an antireflection film including one or more layers provided on a surface of the lens body facing to the optical information recording medium,
   wherein a refractive index of the antireflection film for a light flux having a wavelength of 405 nm is less than 1.7,
   wherein the antireflection film comprises:
      a first layer containing a low refractive index material, a thickness of the first layer $d_1$ satisfying:
         $70 \text{ nm} \leq d_1 \leq 100 \text{ nm}$,
      a second layer containing an intermediate refractive index material, a thickness of the second layer $d_2$ satisfying:
         $15 \text{ nm} \leq d_2 \leq 40 \text{ nm}$,
      a third layer containing the low refractive index material, a thickness of the third layer $d_3$ satisfying:
         $75 \text{ nm} \leq d_3 \leq 90 \text{ nm}$,
      a fourth layer containing the intermediate refractive index material, a thickness of the fourth layer $d_4$ satisfying:
         $55 \text{ nm} \leq d_4 \leq 75 \text{ nm}$,
      a fifth layer made of a low refractive index material, a thickness of the fifth layer $d_5$ satisfying:
         $3 \text{ nm} \leq d_5 \leq 20 \text{ nm}$, a sixth layer containing an intermediate refractive index material, a thickness of the sixth layer $d_6$ satisfying:

70 nm $\leq d_6 \leq$ 95 nm, a seventh layer containing the low refractive index material, a thickness of the seventh layer $d_7$ satisfying:

95 nm $\leq d_7 \leq$ 120 nm wherein the low refractive index material contains silicon oxide, magnesium fluoride, a mixture of silicon oxide and aluminum oxide, or a mixture of silicon oxide and magnesium fluoride, and wherein the intermediate refractive index material contains aluminum oxide or a material containing aluminum oxide as a main component.

10. The objective lens of claim 9, wherein the polymer resin forming the lens body contains hydrogenated norbornene ring-opening polymer.

11. An optical pickup apparatus comprising the objective lens of claim 9 and a light source emitting the monochromatic light having the specific wavelength in the range of 350 to 450 nm.

12. An objective lens for converging a monochromatic light flux having a specific wavelength in a range of 350 to 450 nm on an optical information recording medium while the objective lens in placed facing the optical information recording medium, the objective lens comprising:

a lens body containing a polymer resin having an alicyclic structure; and an antireflection film including one or more layers provided on a surface of the lens body facing to the optical information recording medium, wherein a refractive index of the antireflection film for a light flux having a wavelength of 405 nm is less than 1.7, wherein the polymer resin forming the lens body contains an alicyclic hydrocarbon copolymer having a weight average molecular weight (Mw) of 1,000 to 1,000,000, and wherein the copolymer contains:

repeat unit (a) having a alicyclic structure represented by Formula (1), and repeat unit (b) having a chain structure represented by Formula (2) or Formula (3), provided that:

a total weight of repeat units (a) and repeat units (b) is 90% by weight or more, and a total weight of repeat units (b) is 1% by weight or more and less than 10% by weight, and Formula (1)

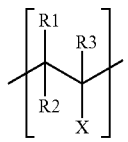

Formula (2)

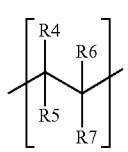

Formula (3)

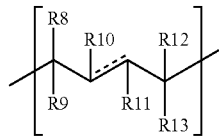

where in Formula (1), X represents an alicyclic hydrocarbon group, R1 through R13 in Formulae (1), (2) and (3) each independently represent a hydrogen atom, a chain hydrocarbon group, a halogen atom, an alkoxy group, a hydroxyl group, an ether group, an ester group, a cyano group, an amide group, an imide group, a silyl group and a chain hydrocarbon group substituted by a polar group (a halogen atom, an alkoxy group, a hydroxyl group, an ether group, an ester group, a cyano group, an amide group, an imino group or a silyl group), and in Formula (3), " . . . " represents a carbon-carbon saturated bond or a carbon-carbon unsaturated bond.

13. The objective lens of claim 12, wherein the polymer resin forming the lens body contains a block polymer containing:

polymer block [A] having repeat unit [1] represented by Formula (11), and polymer block [B] having repeat unit [1] represented by Formula (11), repeat unit [2] represented by Formula (12) and repeat unit [3] represented by Formula (13), Formula (11)

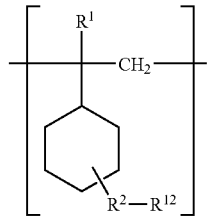

where, in Formula (11), $R^1$ represents a hydrogen atom or an alkyl group having a carbon number of 1 to 20, $R^2$ through $R^{12}$ each independently represent a hydrogen atom, an alkyl group having a carbon number of 1 to 20, a hydroxyl group, an alkoxy group having a carbon number of 1 to 20 or a halogen group, Formula (12)

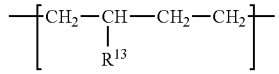

where, in Formula (12), $R^{13}$ represents a hydrogen atom or an alkyl group having a carbon number of 1 to 20, and Formula (13)

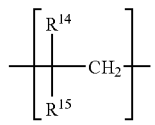

where, in Formula (13), $R^{14}$ and $R^{15}$ each independently represent a hydrogen atom or an alkyl group having a carbon number of 1 to 20.

14. An optical pickup apparatus comprising the objective lens of claim 12 and a light source emitting the monochromatic light having the specific wavelength in the range of 350 to 450 nm.

15. An objective lens for converging a monochromatic light flux having a specific wavelength in a range of 350 to 450 nm on an optical information recording medium while the objective lens in placed facing the optical information recording medium, the objective lens comprising:
   a lens body containing a polymer resin having an alicyclic structure; and
   an antireflection film including one or more layers provided on a surface of the lens body facing to the optical information recording medium,
   wherein a refractive index of the antireflection film for a light flux having a wavelength of 405 nm is less than 1.7,
   wherein the lens body comprises:
      a first optical element arranged at the light source side of the lens body, and
      a second optical element arranged at the optical information recording medium side of the lens body,
      wherein the second optical element has a positive paraxial power and the objective lens satisfies Formula (41) and Formula (42), $$|P1/P2| \leq 0.2 \qquad \text{Formula (41)}$$

$$0.8 \leq d_2/f_2 \leq 1.8 \qquad \text{Formula (42)}$$

wherein in Formula (41), P1 represents a paraxial power of the first optical element and P2 represents a paraxial power of the second optical element, and
   wherein in Formula (42), $d_2$ represents a thickness of the second optical element on an optical axis and $f_2$ represents a focal length of the second optical element.

16. An optical pickup apparatus comprising the objective lens of claim 15 and a light source emitting the monochromatic light having the specific wavelength in the range of 350 to 450 nm.

17. An objective lens for converging a monochromatic light flux having a specific wavelength in a range of 350 to 450 nm on an optical information recording medium while the objective lens in placed facing the optical information recording medium, the objective lens comprising:
   a lens body containing a polymer resin having an alicyclic structure; and
   an antireflection film including one or more layers provided on a surface of the lens body facing to the optical information recording medium,
   wherein a refractive index of the antireflection film for a light flux having a wavelength of 405 nm is less than 1.7,
   wherein the lens body comprises:
      a first optical element on a surface of the lens body facing a light source, and
      a second optical element on a surface of the lens body facing to the optical information recording medium,
      wherein the first optical element and the second optical element each has a positive paraxial power and the objective lens satisfies Formula (51) and Formula (52), $$0.8 \leq NA \qquad \text{Formula (51)}$$

$$0.2 \leq \beta \leq 0.5 \qquad \text{Formula (52)}$$

wherein in Formula (51), NA represents a numerical aperture on an image side, and
      wherein in Formula (52), $\beta$ represents a lens magnification of the second optical element.

18. An optical pickup apparatus comprising the objective lens of claim 17 and a light source emitting the monochromatic light having the specific wavelength in the range of 350 to 450 nm.

19. An objective lens for converging a monochromatic light flux having a specific wavelength in a range of 350 to 450 nm on an optical information recording medium while the objective lens in placed facing the optical information recording medium, the objective lens comprising:
   a lens body containing a polymer resin having an alicyclic structure; and
   an antireflection film including one or more layers provided on a surface of the lens body facing to the optical information recording medium,
   wherein a refractive index of the antireflection film for a light flux having a wavelength of 405 nm is less than 1.7, and
   wherein the lens body contains a single constituent, and the objective lens satisfies Formula (60), $$0.8 \leq d/f \leq 1.8 \qquad \text{Formula (60)}$$

where, in Formula (60), d represents a thickness of the objective lens on an optical axis, and f represents a focal length of the objective lens for a light flux having a wavelength of 405 nm.

20. An optical pickup apparatus comprising the objective lens of claim 19 and a light source emitting the monochromatic light having the specific wavelength in the range of 350 to 450 nm.

* * * * *